US005887430A

United States Patent [19]

Hirai et al.

[11] Patent Number: 5,887,430

[45] Date of Patent: Mar. 30, 1999

[54] HYDRAULIC SOURCE AND HYDRAULIC MACHINE

[75] Inventors: Junji Hirai, Fukuoka; Yoshio Aoyama, Aichi; Yoshiji Hiraga, Fukuoka; Hiroyuki Hamamoto, Fukuoka; Kenji Hirose, Fukuoka; Tatsuhiko Koba, Fukuoka; Hideaki Wakao, Fukuoka, all of Japan

[73] Assignee: Kabushiki Kaisha Yaskawa Denki, Japan

[21] Appl. No.: 556,922

[22] PCT Filed: Sep. 6, 1993

[86] PCT No.: PCT/JP93/01255

§ 371 Date: Apr. 29, 1996

§ 102(e) Date: Apr. 29, 1996

[87] PCT Pub. No.: WO94/28315

PCT Pub. Date: Dec. 8, 1994

[30] Foreign Application Priority Data

| | | | |
|---|---|---|---|
| Jun. 2, 1993 | [JP] | Japan | 5-132088 |
| Jul. 12, 1993 | [JP] | Japan | 5-171317 |
| Jul. 29, 1993 | [JP] | Japan | 5-188238 |

[51] Int. Cl.[6] .......... F16D 31/02

[52] U.S. Cl. .......... 60/433; 191/10; 417/411

[58] Field of Search .......... 191/10; 60/433; 303/114.1, 116.1, 116.2; 417/411

[56] References Cited

U.S. PATENT DOCUMENTS

| | | | |
|---|---|---|---|
| 4,836,344 | 6/1989 | Bolger | 191/10 |
| 5,190,358 | 3/1993 | Holzmann et al. | 303/116.1 |
| 5,197,787 | 3/1993 | Matsuda et al. | 303/113.1 |
| 5,207,304 | 5/1993 | Lechner et al. | 191/10 |

FOREIGN PATENT DOCUMENTS

| | | | |
|---|---|---|---|
| 54-10181 | 1/1979 | Japan . | |
| 56-140609 | 11/1981 | Japan . | |
| 57-21290 | 2/1982 | Japan . | |
| 60-99304 | 7/1985 | Japan . | |
| 62-158203 | 10/1987 | Japan . | |
| 419788 | 2/1992 | Japan . | |
| 4-88802 | 3/1992 | Japan | 191/10 |
| 4252883 | 9/1992 | Japan . | |
| 4345008 | 12/1992 | Japan . | |
| 92/01805 | 2/1993 | WIPO | 191/10 |

*Primary Examiner*—F. Daniel Lopez
*Attorney, Agent, or Firm*—Morrison Law Firm

[57] ABSTRACT

A hydraulic source(20) comprises a hydraulic pump(62) driven by a motor(61), which operates based on the power and control data from a non-contact power feeding apparatus (30); a hydraulic tank(63); a solenoid valve(64); a relief valve(65); a hydraulic pressure gauge(66); a pilot check valve(67) for clamping and a pilot check valve(68) for unlocking that are interposed between the solenoid valve (64) and hydraulic cylinders(41*a* to 41*d*); a pressure switch (69) for clamping which is inserted into a piping for connecting the pilot valve(67) and the hydraulic cylinders(41*a* to 41*d*); and an pressure switch(70) for unclamping which is inserted into a piping for connecting the pilot check valve (68) and the hydraudic cylinders(41*a* to 41*d*). This hydraulic source is combined with a hydraulic machine for applications where jig or jigs move freely to promote automation of machining, assembly and inspection of workpieces on a moving body.

9 Claims, 37 Drawing Sheets

HYDRAULIC SOURCE AND HYDRAULIC MACHINE

TECHNICAL FIELD

The present invention relates to a hydraulic source having a power feeding apparatus and a hydraulic source circuit for supplying hydraulic pressure to a hydraulic cylinder, in which the power feeding apparatus supplies high frequency voltage to a power receiving side of the hydraulic source circuit under non-contact condition. Further, the present invention relates to a working machine provided with the above-mentioned hydraulic source.

BACKGROUND ART

As a power source used in a mechanical field in which a large power is required while at work such as a machine tool field or a cargo handling machine field, conventionally there exists such a tendency that the power source has changed from hydraulic type to electric type with the advance of the times, from the standpoints of both high response speed and clean energy. However, in the case where the power source is used by placing great importance on large power generation and long power duration rather than response speed, hydraulic source is still used, in spite of the fact that there exists a problem with respect to piping arrangement and power intermission. This is because although the electric power source is superior to the hydraulic power source from the standpoint of easiness in wiring and power control, since a large-sized direct-driven type actuator and a large capacity storage function are both required to generate large power and to control the generated large power autonomically, the electric power source is inferior to a pressurized power source from the standpoints of size and stability at the present stage. Further, although it may be possible to consider to combine both merits of the hydraulic power source and the electric power source appropriately, such a power source as described above has been not yet reported.

In the field of machine tools, for instance, as a method of fixing an object to be machined (referred to as "workpiece", hereinafter) to a jig mounted on a table of the machine tool, it is general to fasten a workpiece manually by use of a screw or a cam (referred to as "clamping", hereinafter). However, a method of clamping a workpiece by use of a hydraulic cylinder has been adopted partially to automatize the fixing of the workpiece to the jig.

FIG. 43 is a diagrammatical structural view showing a first prior art machine tool, on which a hydraulic type workpiece clamping device for clamping the workpiece by use of a hydraulic cylinder is mounted.

In FIG. 43, a machine tool 100 includes a hydraulic source 104 composed of a first hydraulic cylinder 103*a* for clamping the right end of a workpiece 120, a second hydraulic cylinder 103*b* for clamping the left end of the same workpiece 120 both mounted on a pallet 101, a hydraulic pump 104*a*, a hydraulic tank 104*b*, a solenoid valve 104*c*, a hydraulic motor 104*d* for driving a hydraulic pump 104*a*, and a hydraulic switch (not shown), etc.; a first hydraulic pipe 106*a* for communication between the first hydraulic cylinder 103*a* and the hydraulic source 104; and a second hydraulic pipe 106*b* for communication between the second hydraulic cylinder 103*b* and the hydraulic source 104. In the machine tool 100, a hydraulic pressure can be generated by driving the hydraulic driving motor 104*a*, and the generated hydraulic force is transmitted through the first and second hydraulic pipes 106*a* and 106*b*, respectively to move two rods of the first and second hydraulic cylinders 103*a* and 103*b* in the downward direction in FIG. 43, respectively, that is, to clamp a workpiece 120.

In the above-mentioned machine tool 100, however, since hydraulic pressure is transmitted from the hydraulic source 104 to the first and second hydraulic cylinders 106*a* and 106*b*, respectively, the first and second hydraulic pipes 106*a* and 106*b* are indispensable, thus causing the following problems: (1) in the case of a pallet jig of a horizontal machining center and a jig of a transfer machine, since the jig is moved freely without relation to the movement of the machine tool, it is particularly difficult to arrange the hydraulic piping from the hydraulic source to the respective hydraulic cylinders. Accordingly, in the case of these machine tools, it is hardly possible to clamp workpiece by use of the hydraulic cylinders. (2) as a special example, there exists a method of using a hydraulic check valve for disconnecting hydraulic pressure between the hydraulic check valve and the hydraulic source by use of a hydraulic coupler. In this method, however, since a relatively large device is required to operate the hydraulic coupler automatically, this method is not practical and therefore not used widely.

On the other hand, such a method may be considered that a workpiece is clamped automatically by use of only electric energy (without use of the hydraulic pressure). In this method, however, as already explained, since the direct-driven type large-capacity actuator and a power storage unit (as an accumulator for maintaining the generated force) have been both not yet developed, this method is not yet put into practical use.

Accordingly, it is the object of the first and third inventions to provide a hydraulic source and a machine tool provided with the same hydraulic source which can be used even when a jig is movable freely.

Further, recently, in a workshop where machine tools are arranged and handled, the setup process of the machine tools has been automatized more and more securely, because of various social background such as the unclean working environment, lack of laborers, change in production mode to multi-model small-quantity production, etc. However, the hydraulic source has been mainly used as the power source for an actuator required to generate a large force, as in the case of a free-end tool of an automatic jig or an industrial robot. Further, in general, the hydraulic actuator is driven by a hydraulic pump pressurized by a motor. Therefore, the hydraulic piping and the electric wiring are both inevitably required. This causes a problem with respect to the connection and disconnection of the hydraulic piping and the electric wiring, when the automatic jig is moved autonomically or when the hydraulic actuator driving, means is moved autonomically or when the free-end tool of an industrial robot is exchanged. To overcome this problem, recently an automatic coupler has been put into practice.

Even when the hydraulic couplers are used, however, since there still exists a necessity of the hydraulic piping arrangement and the electric wiring between the hydraulic actuators and the driving means. In addition, the problem related to cutting lubricant leakage is not yet solved perfectly, and the automatization of the hydraulic coupler operation is rather difficult. Accordingly, when an autonomous movement of the hydraulic actuator relative to the driving means or when the exchange of the free-end tool of the industrial robot is considered, there still remains a problem with respect to the reliability. Further, there exists another problem in that since the number of couplers increases with increasing number of jig actuators, when data signals are not transmitted in parallel to each other, the reliability of the apparatus decreases and the size of the apparatus increases.

Accordingly, the object of the fourth to tenth inventions is to provide an universal hydraulic apparatus which can move the hydraulic actuator autonomically and enables the tool exchange, without causing any problems in the hydraulic piping arrangement and the electric wiring arrangement between the hydraulic actuator and the driving means, in spite of a simple construction; in other words, to provide a unit-type hydraulic source of the first to third inventions.

Further, in the fields of the machine tools and the cargo handling machines, the power source has been changed from the hydraulic method to the electric method with the advance of the times from the standpoints of the high response speed of the actuator and the clean energy. However, in general, as the power for driving the devices for directly handling workpiece such as a gripper, clamper, chuck, etc., pneumatic pressure is still used widely due to the simple mechanism, the easiness of torque and pressure control, etc. in spite of the fact that there exists a problem with respect to the piping arrangement and the power intermission. This is because although the electric actuator is superior to the pneumatic actuator-in the wiring and power connection and disconnection, since the electric actuator is of rotary type basically, a mechanism mounted on the end of the clamping and fastening devices is complicated and large-sized. For instance, when a workpiece is fixed to a jig mounted on a table of a machine tool, although, in general, the workpiece is clamped manually by use of a screw or a cam, a pneumatic clamping or a vacuum chucking is partially adopted for automatization of fixing the workpiece onto the jig. In this case, a compressor is generally mounted on the fixed side to compress air, and the compressed air is fed to a pneumatic actuator (i.e., cylinder) via a pressure regulator and an electromagnetic valve. Or else, a vacuum is generated by a vacuum generator to chuck the workpiece to the pallet by a pressure difference between the generated vacuum and the atmospheric pressure.

Accordingly, in any cases, the piping arrangement from the compressor to the damper or the suction unit is necessarily required. However, in the case of the pallet jig of the horizontal machining center or the jig of the transfer machine, since the pallet (jig) is moved, the above-mentioned piping is disabled. As a result, the pneumatic power has been not so far used to fix the workpiece. Further, when the griper clamps a workpiece and further moves as with the case of the direct-driven loader, the gripper pneumatic actuator or the vacuum pad must be connected to the fixed side pneumatic source through a piping disposed in a cable bear (support) movable together and in parallel to the movable portion. Such construction causes an increase of the initial investment for the supplementary equipment (e.g., duct) and a decrease in the long-term reliability of many-hour operation of the apparatus.

Further, when the clamping jig of the machining center is moved by use of pneumatic pressure, since the pressure is not required at places other than specific positions, after a workpiece has been once fixed, it is not necessarily to drive the compressor, as far as the pressure can be maintained. Therefore, when the power supplying unit for supplying power to the compressor driving motor is mounted on a specific position and further the electric power can be supplied automatically, it is possible to control the workpiece fixing unit (pallet) autonomically by a simple construction.

Accordingly, the object of the eleventh to fourteenth inventions of the present invention is to provide an autonomous pneumatic source obtained by developing the third invention hydraulic source horizontally to the pneumatic source, on the basis of a novel idea related to the pneumatic driving system such that electric power and data can be transmitted through a simple coupling, without use of any electrodes, which can be replaced with the conventional method such that the complicated piping is arranged and the pneumatic couplers and valves are operated manually.

Further, in the case of a rotary table, in particular of an index table (rotation indexing) used in the machine tool or the assembly process, the electric power and the data are transmitted through wires arranged between the fixed portion and the rotary portion, by limiting the moving range of the wires. Therefore, although the rotary table can be rotated in both forward and reverse directions to some extent, it is impossible to rotate the rotary table without any rotational limitation or at a high rotational speed, thus causing a problem in that the wires are disconnected due to fatigue. To overcome these problems, that is, to enable a multi-rotation rotary table to some extent, although a contact transmission method by use of springs has been so far adopted, in practice there still exists a problem in that the characteristics of the contact portions tend to deteriorate due to an unclean environment such that there exist moisture and chips, so that it has been impossible to increase the rotational speed of the table more than 10 to 50 r.p.m. In addition, when signals are transmitted, since contact noises are inevitably generated, the characteristics thereof have been improved by inserting filters or by severely selecting the contact material. Further, in the case where a rotary coupling as shown in FIG. 44 (described later) is used, in particular when a plurality of actuators (jig, motor, nozzle, etc.) are controlled independently and separately, since it is necessary to assemble a number of hydraulic circuits in correspondence to the number of actuators within a limited space in the rotary coupling, there exists a practical problem in that the hydraulic sealing is difficult in addition to an increase in size and therefore an increase in cost thereof.

Accordingly, the object of the fifteenth to sixteenth inventions of the present invention is to provide a rotary table on which the hydraulic source of the first to third inventions are mounted, which can solve the problems related to the above-mentioned power and data transmission, secure long-term reliability and stability, and improve the table rotational speed on the basis of signal transmission, without use of any electrical contacts, and further which can remove the complexity of the multi-circuit construction of the rotary coupling, by replacing the non-electromagnetic power control with the electric power (electromagnetic valve) control.

Further, FIG. 45 is a perspective view showing a second example of the prior art direct-driven type loader. As shown in FIG. 45, a movable unit 112 of the direct-driven type loader body is movably supported by two travel rails 111 arranged in an x-axis direction, and driven reciprocatingly in the x-axis direction by driving an x-axis servomotor (not shown) mounted inside the movable unit 112. At the lower end portion of the movable unit 112, a gripper 118 for gripping a workpiece driven by fluid pressure such as hydraulic or pneumatic pressure is disposed so as to be movable in a z-axis direction by a z-axis servomotor 113 and rotatable in a θ direction by a θ-rotation servomotor 116, respectively. Further, a power source for supplying power to the above-mentioned respective servomotors 113 and 116, a hydraulic pressure source for supplying a fluid pressure to the gripper 118, and a control unit for controlling the respective servomotors 113 and 116 and the gripper 118 are all disposed outside the movable unit 112. On the other hand, a cable duct 151 is disposed in parallel to the travel rails 111. Further, respective electric wires 155 electrically connected to the power source and the control unit to drive the respective servomotors 113 and 116, and fluid pipes 156 connected to a fluid pressure source to drive the gripper 118 are all mounted on a cable duct 151 under the condition that these are accommodated in a cable bear (support) together, in order to supply power and transmit data to the respective servomotors 113 and 116 and to supply fluid pressure to the gripper 118, respectively. However, in the second prior art example as described above, since the movable unit 112 is driven via the various electric wires connected to the power source and the control unit disposed outside the movable unit and via the fluid piping connected to the fluid pressure source disposed outside of the movable unit, the following problems arise: since the movable unit is moved together with the various electric wires and fluid pipes, when the movable distance is long, the weight of the cable bear is heavy, so that the a sufficient strength and a large driving power are required to support and move the cables and wires. In addition, since bending stress is applied to the various electric wires and the fluid pipes whenever the wires and cables moved reciprocatingly, the various electric wires and fluid pipes tend to be damaged or broken. In particular, when the loader is driven at a high speed (required recently, in particular), the electric wires and the fluid pipes are often damaged, thus causing a problem in that loss increases due to maintenance and operation stop whenever the wires and pipes are broken. To overcome these problems, although an electrode contact power feeding method (e.g., contactor, trolley, etc.) has been tried, not only the stable power feeding and stable data transmission cannot be realized, but also there arises a problem in that contact portions of the electrodes are worn away so that the stability deteriorates, under such an unclean environment that cutting lubricant and chips inevitably exist. Further, when the movable unit is moved by use of a rack and pinion mechanism, in particular, it is possible to mount a plurality of the movable units on the same travel rails and to drive the movable units simultaneously within a non-interference range (cooperation control) in principle. In practice, however, it has been difficult to realize this cooperation control due to the problem related to wires and pipes connected to the movable unit and the cable bear arrangement.

Accordingly, the object of the seventeenth to eighteenth embodiment of the present invention is to provide a direct-driven type loader which can improve the reliability and enables a cooperation control of a plurality of movable units, without laying the electric wires and the fluid pipes between the movable unit and external power source and control unit and without need of a large-scale installation; that is, a direct-driven type loader to which the first to third inventions are applied.

Further, in the prior art machine tool, there exists a problem with respect to means for aligning a workpiece. In more detail, in the machine tools such as a vertical lathe, gear hobbing machine, turning center, etc., a workpiece to be cut is first fixed on a table of the machine tool and then a cutter is pushed against the workpiece by turning the table to cut the fixed workpiece. In this case, prior to cutting, the cutting center of the cut workpiece must be aligned at a central position of the table at a high precision and then fixed to the table.

Conventionally, in this workpiece locating and fixing process, first the workpiece is fixed to the table temporarily; the table of the machine tool is turned; the cutting center position is measured by use of a measurement gage mounted on the spindle of the machine tool to calculate the misalignment rate relative to the center of the turntable; and then the misalignment rate is reduced by repeating the same operation manually by a worker. Therefore, a long time and an experiment has been so far required for the workpiece alignment.

However, there exists a need of eliminating, that is, automatizing this setup work due to the social background that the number of skilled worker has decreased and further been aged, and further a need of increasing the availability factor of the machine tool becomes strong.

In the case of the machining center in the machine tools, a pallet exchange apparatus composed of a pallet changer, a pallet pool, etc. has been widely used for automatization of the setup work (tool exchange work). In the case of the machine tools such as vertical lathe, the gear hobbing machine, turning center, etc., on the other hand, although the machining center position must be aligned with the center position of the turntable precisely, in the case of the locating and fixing method used for the pallet exchange (adopted for the general machining center), there exists a limit in precision of the alignment of both the central positions, even if the respective part machining precision of the machine tool and the pallet exchange apparatus are increased to the respective extreme situations.

Accordingly, the object of the nineteenth to twentieth inventions of the present invention are to provide a workpiece locating and clamping apparatus for locating a workpiece mounted and fixed onto the pallet, by clamping the workpiece periphery with the use of a plurality of actuators and by driving and controlling these actuators on the basis of fluid pressure such as hydraulic or pneumatic pressure caused by power feeding and data transmission through the hydraulic coupling from outside of the fixed portion or by non-contact high-frequency electromagnetic induction from outside of the turntable; that is, to provide a dependent invention related to the hydraulic source of the first to third inventions.

OBJECTS AND SUMMARY OF THE INVENTION

The present invention is a hydraulic source and an industrial machine having the same hydraulic source, which is used when a jig or jigs are moved freely. The hydraulic source comprises a hydraulic pump driving motor to which power is supplied from a non-contact power feeding apparatus; a hydraulic pump driven by the hydraulic pump driving motor; a hydraulic tank; a solenoid valve; a relief valve; a hydraulic pressure gauge; a clamping check valve and an unclamping pilot check valve interposed between the solenoid valve and respective hydraulic cylinders; a clamping pressure switch interposed in a piping for connecting the clamping pilot check valve with the respective hydraulic cylinders; and an unclamping pressure switch interposed in a piping for connecting the unclamping pilot check valve with the respective hydraulic cylinders.

Further, the present invention is a hydraulic source including a power feeding unit and a hydraulic source circuit, so that the hydraulic actuator can be moved autonomically or exchanged in a simplified structure, without use of any hydraulic piping and electric wiring between the hydraulic actuator and the actuated section. Here, the power feeding unit comprises a primary side power transmit section and a primary side data transmit section to which a high frequency voltage is supplied from a high frequency inverter and a power feeding side control section. Further, the hydraulic source unit is of air-tight structure, which comprises a hydraulic source circuit (having a hydraulic pump, a solenoid valve, and a check valve, etc.), a hydraulic cylinder controlled by the hydraulic source circuit, a secondary side power transmit section and a secondary side data transmit section to which power and data signals are supplied from the primary side power transmit section, respectively on the basis of high frequency electromagnetic induction under non-contact condition.

Further, the present invention is an autonomous pneumatic pressure generating apparatus obtained by developing the non-contact power feeding hydraulic source to pneumatic pressure.

Further, the present invention is an autonomous pneumatic pressure generating apparatus for continuously transmitting power and data signals, to generate pneumatic pressure on the turntable or a moving body, by use of a non-contact power apparatus and a non-contact data transmitting apparatus, respectively on the basis of the high frequency electromagnetic induction of rotary corresponding type for the pneumatic control of the multi-rotation turntable and of straight movement corresponding type for the pneumatic control of the straight moving body, so that the a series of works (such as vacuum suction, actuator driving, etc.) can be freely effected pneumatically on the rotary body or the moving body.

Further, the present invention is a multi-rotation turntable on which the hydraulic source of non-contact power feeding type is mounted.

Further, the present invention is a direct-driven loader to which the hydraulic source of non-contact power feeding type is applied.

Furthermore, the present invention is a locating and clamping apparatus for aligning and driving the hydraulic source of non-contact power feeding type and a unit type thereof.

DETAILED DESCRIPTION OF THE PREFERRED EMBODIMENTS

Figure 1:
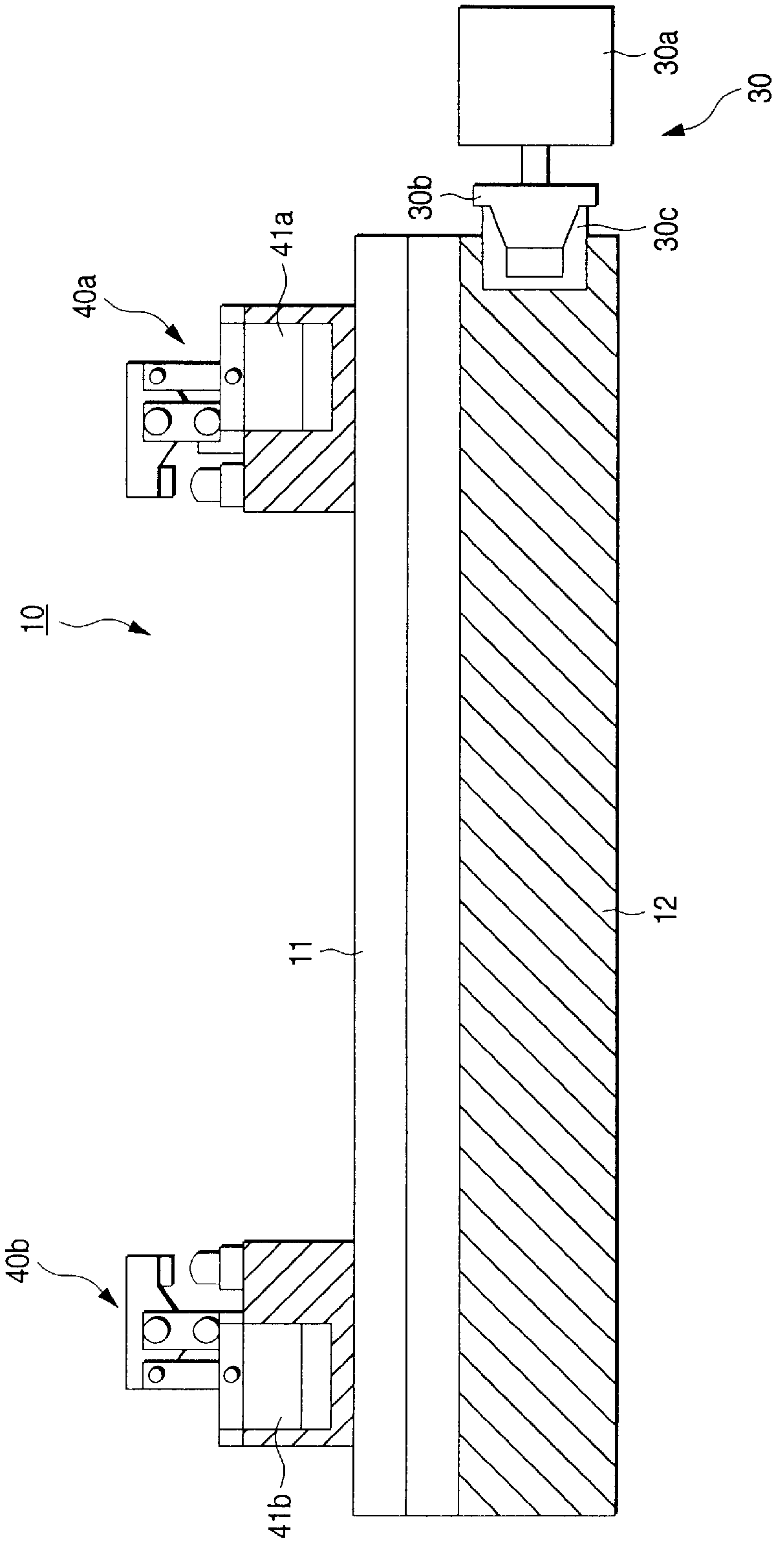
FIG. 1 is a side, partially cross-sectional, view showing a first embodiment according to the present invention, in a workpiece clamping apparatus is shown.

The present invention will be described in detail hereinbelow with reference to the attached drawings.

In the attached drawings, same reference numerals in the respective drawings are to denote the same or corresponding elements or members.

FIG. 1 is a side, partially cross-sectional, view showing the construction of a first embodiment of a workpiece clamping apparatus, which is related to a first to third inventions according to the present invention.

A workpiece clamping apparatus 10 comprises a work pallet 11; a subsidiary pallet 12; a hydraulic source composed of an autonomous hydraulic circuit (See FIG. 2) and a non-contact power feeding apparatus 30; a first clamping arm mechanism **40*a* having a first hydraulic cylinder 41*a* therein; a second clamping arm mechanism 40*b* having a second hydraulic cylinder 41*b* therein; a third clamping arm mechanism 40*c* (See FIG. 2) having a third hydraulic cylinder 41*c* therein; a fourth clamping arm mechanism 40*d* having a fourth hydraulic cylinder 41*d*** therein.

Here, the hydraulic source of the workpiece clamping apparatus 10 is provided with the following features.

In a jig of a machining center, it is unnecessary to drive the hydraulic pump, after a workpiece has been clamped or unclamped, as far as the hydraulic pressure can be maintained. In other words, it is unnecessary to always connect the electric power feeding apparatus to the hydraulic pump driving motor of the hydraulic source circuit. In the present embodiment, therefore, an autonomous hydraulic source circuit 20 is interposed in the jig to maintain the hydraulic pressure even after the workpiece has been clamped. Further, power is supplied to the hydraulic source circuit 20 from the non-contact power feeding apparatus 30 without use of any electrode contacts. That is, only when the workpiece is started to be clamped or unclamped, the non-contact power feeding apparatus 30 is moved to near the hydraulic source circuit 20 to supply power from the non-contact power feeding apparatus 30 to the hydraulic source circuit 20, while separating the non-contact power feeding apparatus 30 away from the hydraulic source circuit 20 when power is not supplied, with the result that the jig can be moved freely.

Further, it may be possible to consider a combination of the autonomous hydraulic source circuit 20 with another power feeding apparatus for supplying power to the hydraulic source circuit 20 with the use of electrode contacts. In the case of the workshop (work site) of the machine tools, however, since short circuit due to chips or mal-conduction due to cutting lubricant easily occurs, this combination method has a problem with respect to the power feeding stability.

In contrast with this, when a non-contact power feeding apparatus 30 using a high frequency electromagnetic induction (whose principle will be explained later with reference to FIG. 4), for instance, it is possible to solve not only the short circuit due to chips or the mal-conduction due to cutting lubricant, but also the intermission of the power feeding due to mal-fitting in the non-contact power feeding apparatus (which is a serious problem in the case of the non-contact power feeding apparatus). Here, when the non-contact power feeding apparatus is used, although the efficiency of power transmission is of course lowered, since the hydraulic pump driving motor (as a load) is kept operated for a short time, there exists no practical problem with respect to a reduction of the power transmission efficiency.

The respective composing elements of the workpiece clamping apparatus 10 will be described hereinbelow in detail.

(1) The working pallet 11 and the subsidiary pallet 12 are as follows:

The working pallet 11 is mounted on the upper surface of the subsidiary pallet 12. The first clamping arm **40*a* is mounted on the right side end on the upper surface of the working pallet 11, and the second clamping arm 40***b* is mounted on the left side end on the upper surface of the working pallet 11. Further, although not shown, the third clamping arm 40*c* is mounted on the front side end of the working pallet 11, and the fourth clamping arm 40*c* is mounted on the rear side end of the working pallet 11. Although not shown in FIG. 1, the subsidiary pallet 11 is provided with the hydraulic source circuit 20 therein. Further, on the right side surface of the subsidiary pallet 12, a power receive side transformer 30*c* of the non-contact power feeding apparatus 30 (described later) is mounted.

Figure 2:
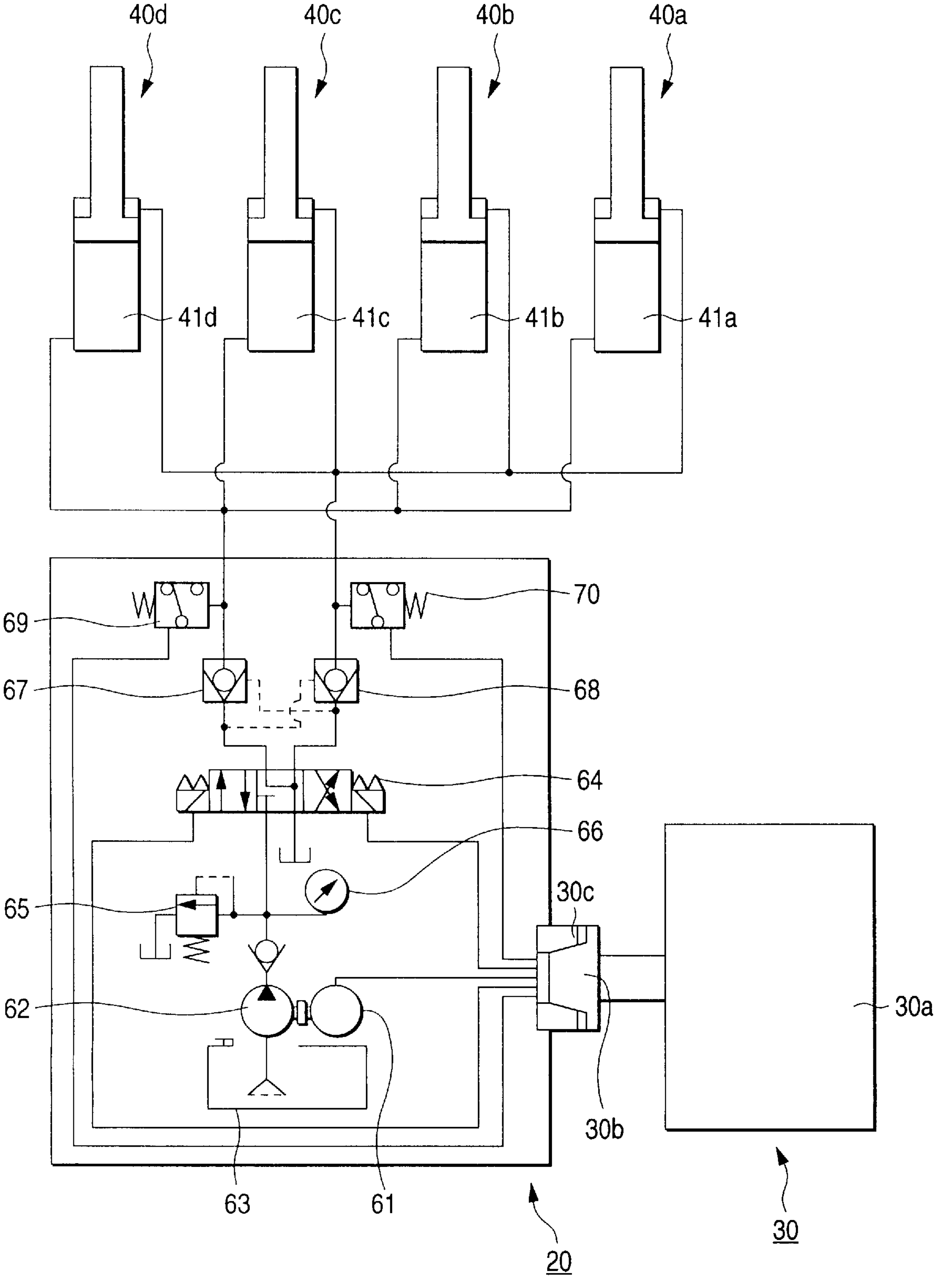
FIG. 2 is a diagrammatical block diagram showing a mechanical construction of the hydraulic source installed in a subsidiary pallet shown in FIG. 1.

(2) The hydraulic source circuit 20 is as follows:

As shown in FIG. 2, the hydraulic source circuit 20 comprises, in mechanical construction, a hydraulic pump driving motor 61 driven and controlled on the basis of power and control data supplied by the non-contact power feeding apparatus 30; a hydraulic pump 62 driven by the hydraulic pump driving motor 61; a hydraulic tank 63; a solenoid valve 64; a relief valve 65 and a hydraulic pressure gage 66 both interposed in a piping communicating between the hydraulic pump 62 and the solenoid valve 64; a clamping pilot check valve 67 and an unclamping pilot check valve 68 both interposed between the solenoid valve 64 and respective hydraulic cylinders 41*a* to 41*d*; a clamping pressure switch 69 interposed in a piping communicating between the clamping pilot check valve 68 and the respective hydraulic cylinders 41*a* to 41*d*; and an unclamping pressure switch 70 interposed in a piping communicating between the unclamping pilot check valve 68 and the respective hydraulic cylinders 41*a* to 41*d*.

Figure 3:
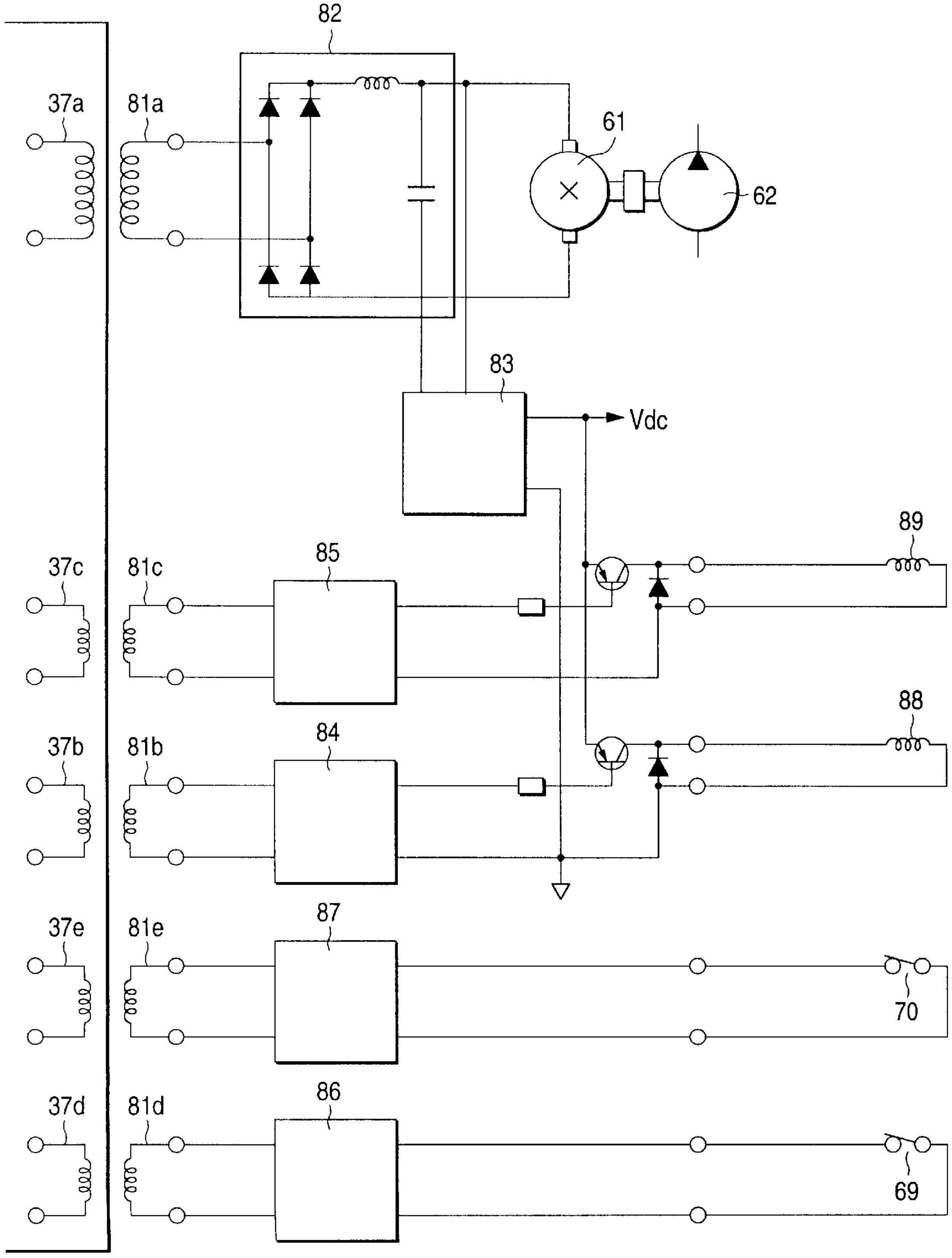
FIG. 3 is a block diagram showing an electric circuit construction of the hydraulic source circuit shown in FIG. 2.

As shown in FIG. 3, the hydraulic source circuit 20 comprises, in electrical circuit construction, a rectify and smooth circuit 82, a DC/DC converter 83, a clamp valve turn-on signal receive circuit 84, an unclamp valve turn-on signal receive circuit 85, a clamp pressure switch turn-on confirm signal transmit circuit 86, and an unclamp pressure switch turn-on confirm signal transmit circuit 87.

The rectify and smooth circuit 82 rectifies the high frequency power HP transmitted by a power feeding apparatus 30*a* of the non-contact power feeding apparatus 30 via a power feeding side power feeding transformer 37a and a power receiving side power feeding transformer 81*a* (described later), and outputs the rectified power HP to the hydraulic pump driving motor 61 and the DC/DC converter 83. The DC/DC converter 83 converts the voltage value of the dc voltage transmitted by the rectify and smooth circuit 82 into a predetermined voltage value.

The clamp valve turn-on signal receive circuit 84 receives a clamp valve turn-on signal CO transmitted from the non-contact power feeding apparatus 30 via a power feeding side clamp valve turn-on signal transmit transformer 37*b* and a power receiving side clamp valve turn-on signal transmit transformer 81*b* (described later), and energizes a clamp side energize coil 88 of the solenoid valve 64. The unclamp valve turn-on signal receive circuit 85 receives an unclamp valve turn-on signal AO transmitted from the non-contact power feeding apparatus 30 via a power feeding side unclamp valve turn-on signal transmit transformer 37*c* and a power receiving side unclamp valve turn-on signal transmit transformer 81*c* (described later), and energizes an unclamp side energize coil 89 of the solenoid valve 64.

The clamp pressure switch turn-on confirm signal transmit circuit 86 receives a clamp pressure switch turn-on confirm signal PC transmitted from the clamp pressure switch 69, and outputs the received signal PC to the non-contact power feeding apparatus 30 via a power receiving side clamp pressure switch turn-on confirm signal transmit transformer Bid and a power feeding side clamp pressure switch turn-on confirm signal transmit transformer 37*d* (described later). The unclamp pressure switch turn-on confirm signal transmit circuit 87 receives an unclamp pressure switch turn-on confirm signal PA transmitted from the unclamp pressure switch 70, and outputs the received signal PA to the non-contact power feeding apparatus 30 via a power receiving side unclamp pressure switch turn-on confirm signal transmit transformer 81*e* and a power feeding side unclamp pressure switch turn-on confirm signal transmit transformer 37*e* (described later).

(3) The non-contact power feeding apparatus 30 is as follows:

The non-contact power feeding apparatus 30 utilizes a high frequency electromagnetic induction already proposed by one of the Inventors in Japanese Published Unexamined (Kokai) Patent Application (JP-A) No. 4-345008. As shown in FIGS. 4(A) and 4(B), a power feeding side transformer 30*b* of the non-contact power feeding apparatus 30 includes a support member 31, a power feeding side core 32 formed with four teeth projecting radially outward from the left side surface of a supporting member 31, and a power feeding side wiring 33 wound around each of the teeth of the power feeding side core 32. Further, a power receiving side transformer 30*c* of the non-contact power feeding apparatus 30 includes a frame 34, a power receiving side core 35 formed with four teeth projecting radially inward formed on an inner surface of the frame 34, and a power receiving side wiring 36 wound around each of the teeth of the power receiving side core 35.

Figure 4:
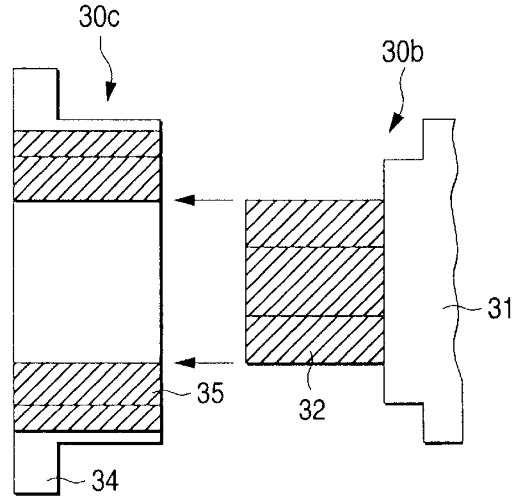
FIG. 4 shows the construction of a power feeding side transformer and a power receiving side transformer of the non-contact power feeding apparatus shown in FIG. 1, in which (A) is a side, partially cross-sectional, view and (B) is an illustration for assistance in explaining the fitting state of the power feeding side core and the power receiving side core.
Figure 4:
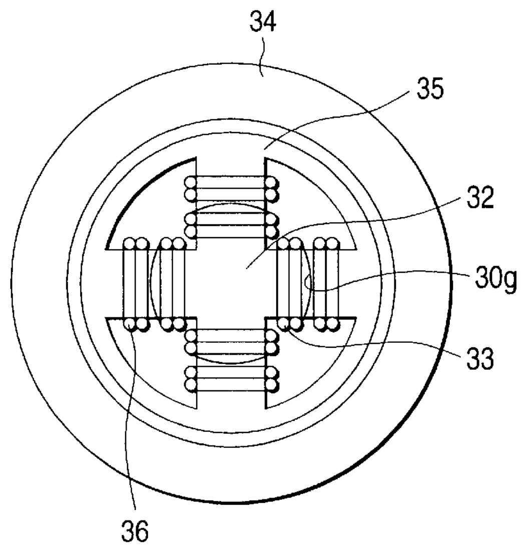
Figure 5:
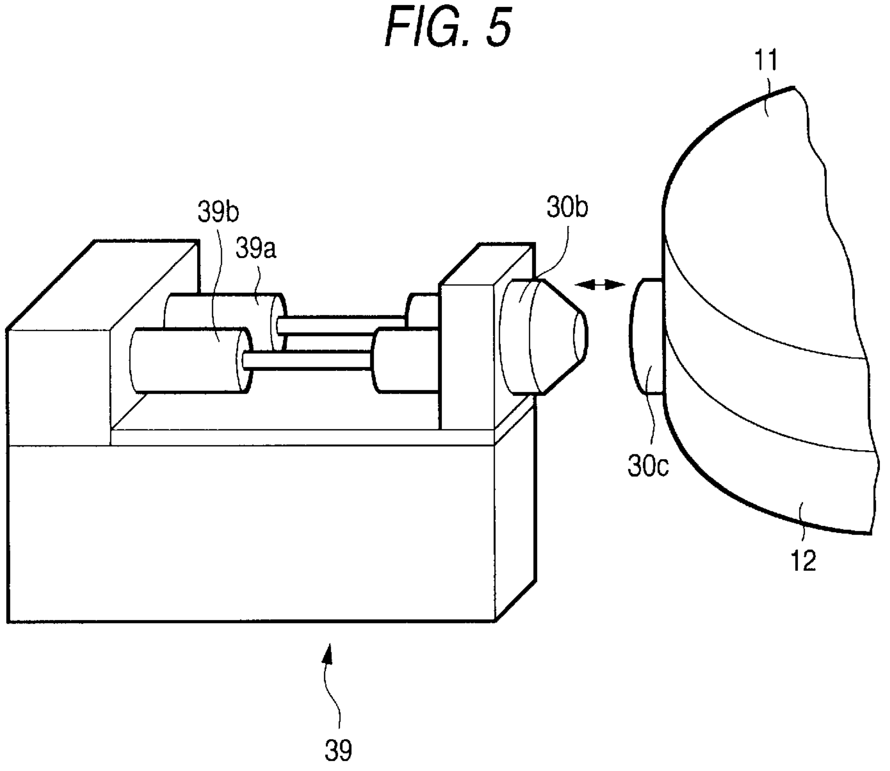
FIG. 5 is a diagrammatical perspective view showing a slide device for engaging and disengaging the power feeding side core with and from the power receiving side core shown in FIG. 3.

In the non-contact power feeding apparatus 30, in the case of power feeding, as shown in FIG. 4(B), the power feeding side core 32 is fitted to the power receiving side core 35 in such a way that each tooth end surface of the power feeding side core 32 is opposed to each tooth end surface of the power receiving side core 35 in the circumferential surface thereof via a gap 30*g*, respectively for enabling the engagement and disengagement between the two cores. Further, as shown in FIG. 5, the power feeding side core 32 is moved to and from the power receiving side core 35 by a slide apparatus 39 having two air cylinders 39*a* and 39*b* provided on the opposite side of the power feeding side core 32 of the support member 31 of the power feeding side transformer 30*b*. Further, although not shown, the non-contact power feeding apparatus 30 is provided with a spring mechanism and an alignment mechanism for confirming the fitting precision of the power feeding side core 32 into the power receiving side core 35, respectively.

In the power feeding side transformer 30*b* of the non-contact power feeding apparatus 30, there are assembled the power feeding side power feeding transformer 37*a*, the power feeding side clamp valve turn-on signal transmit transformer 37*b*, the power feeding side unclamp valve turn-on signal transmit transformer 37*c*, the power feeding side clamp pressure switch turn-on confirm signal transmit transformer 37*d*, and the power feeding side unclamp pressure switch turn-on confirm signal transmit transformer 37*e*, respectively all shown in FIG. 3.

Further, in the power receiving side transformer 30*c* of the non-contact power feeding apparatus 30, there are assembled the power receiving side power feeding transformer 81*a*, the power receiving side clamp valve turn-on signal transmit transformer 81*b*, the power receiving side unclamp valve turn-on signal transmit transformer 81*c*, the power receiving side clamp pressure switch turn-on confirm signal transmit transformer 81*d*, and the power receiving side unclamp pressure switch turn-on confirm signal transmit transformer 81$e$, respectively, all as shown in FIG. 3.

(4) The first to fourth clamping arm mechanisms 40$a$ to 40$b$ are as follows:

As shown in FIG. 6(A), the first clamping arm mechanism 40$a$ includes a first hydraulic cylinder 41$a$, a clamping arm 42$b$, a link member 43$a$, and a link 44$a$. The first hydraulic cylinder 41$a$ includes a piston 45$a$, a rod 46$a$, and a body 47$a$ formed with a lower side hole 48$a$ on the lower side thereof and an upper side hole 48$b$ formed on the upper side thereof. Here, the hole 48$a$ formed on the lower side of the body 47$a$ is used for communication between the inside of the body 47$a$ and the clamping pilot check valve 67 through a pipe; and the hole 48$b$ formed on the upper side of the body 47$a$ is used for communication between the inside of the body 47$a$ and the unclamping pilot check valve 68 through a pipe. The link member 43$a$ is fixed to the upper end of the rod 46$a$ with a screw. The right end portion of the clamping arm 42$a$ is pivotally supported by the link member 43$a$, and the portion slightly to the right of the middle of clamping arm 42$a$ is linked with the body 47$a$ of the hydraulic cylinder 41$a$ via a link 44$a$. Therefore, when the piston 45$a$ of the first hydraulic cylinder 41$a$ of the hydraulic source circuit 20 is moved upward, it is possible to clamp a workpiece by an end 42$a_1$, of the clamping arm 42$a$, as shown in FIG. 6(A). Further, when the piston 45$a$of the first hydraulic cylinder 41$a$ of the hydraulic source circuit 20 is moved downward, it is possible to unclamp the workpiece by an end 42$a_1$ of the clamping arm 42$a$, as shown in FIG. 6(B).

The same as above can be applied to the remaining second to fourth clamping arm mechanisms 40$b$ to 40$d$.

Figure 7:
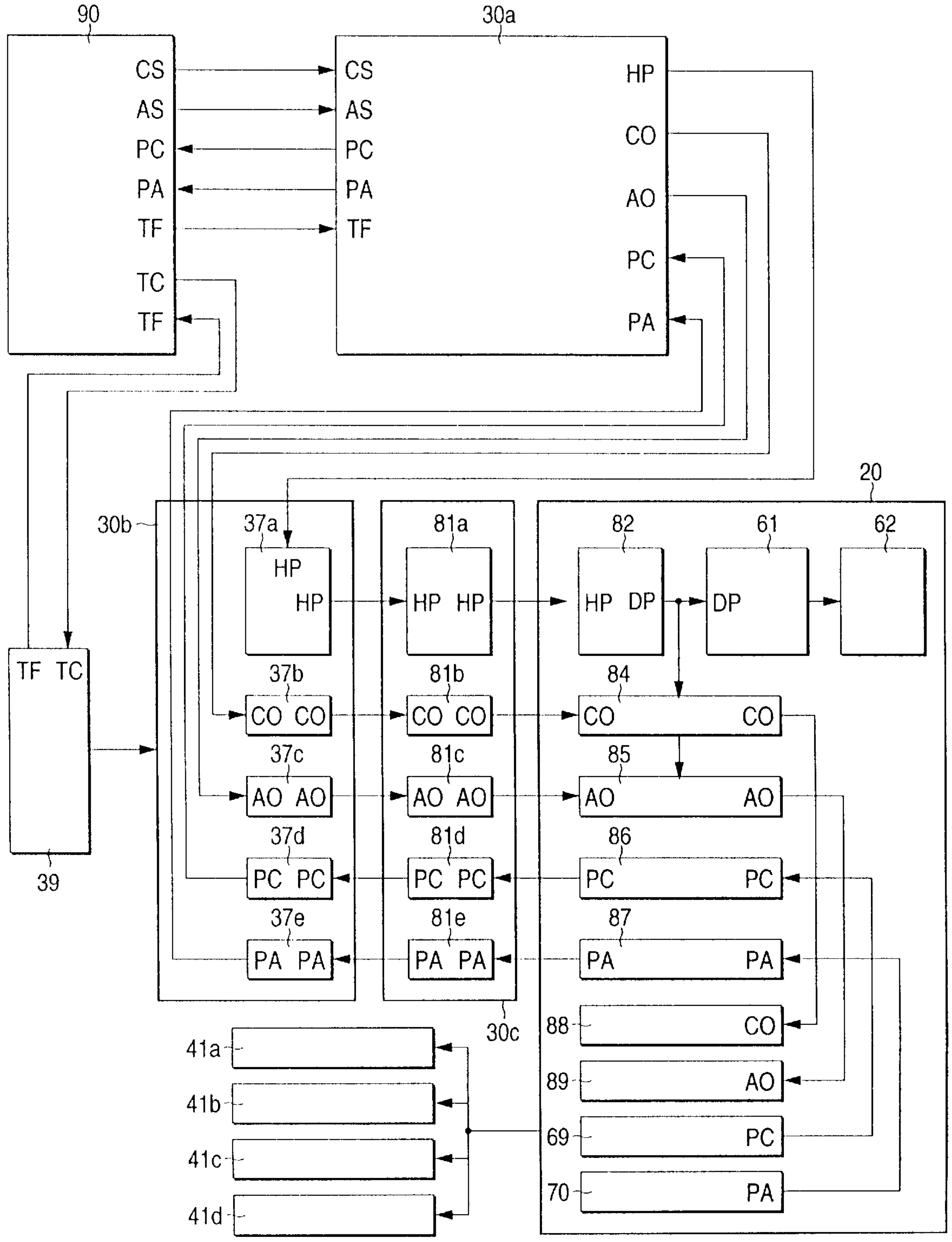
FIG. 7 is an electric block diagram for assistance in explaining the clamping operation and the unclamping operation of the workpiece clamping device shown in FIG. 1.

The clamping operation and unclamping operation of the work clamping apparatus 10 shown in FIG. 1 will be explained with reference to FIG. 7.

(a) The clamping operation is as follows:

Prior to the clamping of the workpiece 1 with the workpiece clamping apparatus 10, the alignment work of the workpiece 1 is performed by the worker. Further, the work pallet 11 and the subsidiary pallet 12 are rotated and located by the worker, so that the power feeding side transformer 30$b$ and the power receiving side transformer 30$c$ can be located in position.

After that, a sequencer 90 (a host controller) transmits a clamp start signal CS to the non-contact power feeding apparatus 30, and a transformer coupling command signal TC to the slide apparatus 39, respectively. Then, in response to the transformer coupling command signal TC, the slide apparatus 39 actuates the two air cylinders 39$a$ and 39$b$ (See FIG. 5) to fit the power feeding side transformer 30$b$ to the power receiving side transformer 30$c$. At this time, the fitting of the power feeding side transformer 30$b$ to the power receiving side transformer 30$c$ is confirmed by use of a limit switch or an optical detection unit, and a transformer coupling end signal TF is transmitted from the slide apparatus 39 to the sequencer 90 and the power feeding apparatus 30$a$. In response to the clamp start signal CS and the transformer coupling signal TF, the power feeding apparatus 30$a$ starts to feed the high frequency power HP to the power feeding side power feeding transformer 37$a$. Therefore, the high frequency power HP is supplied from the power feeding side power feeding transformer 37$a$ to the rectify and smooth circuit 82 of the hydraulic source circuit 20 through the power receiving side power feeding transformer 81$a$, so that the high frequency power HP is converted into a dc power DP by the rectify and smooth circuit 82. Since the dc power DP is supplied from the rectify and smooth circuit 82 to the hydraulic pump driving motor 61, the hydraulic pump driving motor 61 starts rotating to actuate the hydraulic pump 62.

After a predetermined time has elapsed after the start of the hydraulic pump driving motor 61, the hydraulic pressure begins to rise. Then, the clamp side valve of the solenoid valve 64 (See FIG. 2) is turned on, so that hydraulic pressure is supplied to the respective hydraulic cylinders 41$a$ to 41$d$ to start the upward operation of the hydraulic cylinders 41$a$ to 41$d$. Therefore, since the clamp side valve of the solenoid valve 64 is turned on, the clamp valve turn-on signal CO is generated by a timer (not shown), after a predetermined time has elapsed after the start of the power feeding. The generated signal CO is transmitted to a clamp valve turn-on signal receive circuit 84 of the hydraulic source circuit 29 via the power feeding side clamp valve turn-on signal transmit transformer 37$b$ and the power receiving side clamp valve turn-on signal transmit transformer 81$b$. Here, the clamp side valve of the solenoid valve 64 is turned on when current is supplied to the clamp side valve energizing coil 88 of the solenoid valve 64 on the basis of the dc power transmitted from the rectify and smooth circuit 82 via the DC/DC converter 83 and in response to the clamp valve turn-on signal CO transmitted by the clamp valve turn-on signal receive circuit 84.

Figure 6:
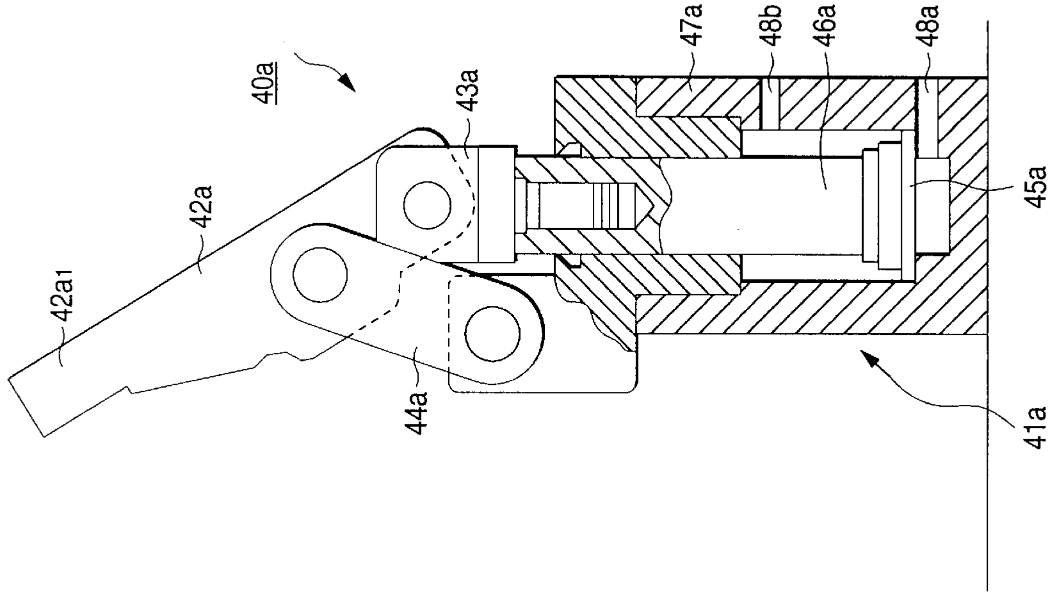
FIG. 6(A) is a side, partially cross-sectional, view showing the clamping state of the first clamping arm
FIG. 6(B) is a side, partially cross-sectional, view showing the unclamping state of the first clamping arm shown in FIG. 1.
Figure 6:
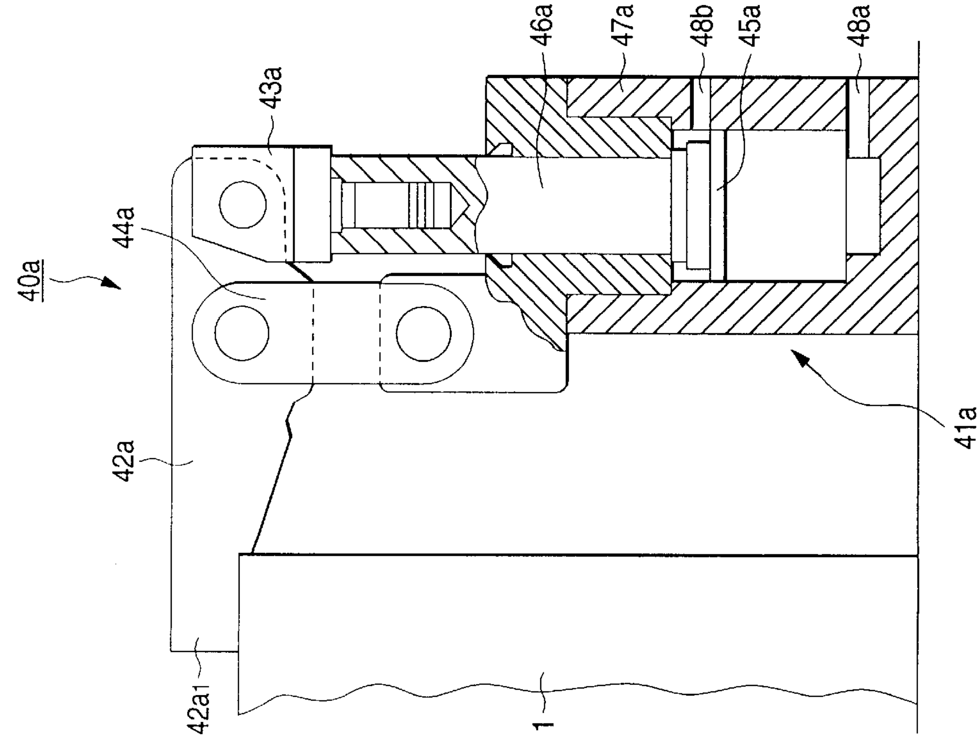

As shown in FIG. 6, when the respective hydraulic cylinders 41$a$ to 41$d$ continue to move upward, the workpiece 1 is clamped by the respective clamping arm mechanisms 40$a$ to 40$d$. Further, the uppermost positions of the respective hydraulic cylinders 41$a$ to 41$d$ can be confirmed by the clamping pressure switch 69 of the hydraulic source circuit 20. When the clamping pressure switch 69 (See FIGS. 2 and 3) is closed, a clamping pressure switch confirm signal PC is transmitted from a clamp pressure switch turn-on confirm signal transmit circuit 86 to the power feeding apparatus 30$a$ via the power receiving side clamping pressure switch turn-on confirm signal transmit transformer 81$d$ and the power feeding side clamping pressure switch turn-on confirm signal transmit transformer 37$d$. In response to the clamping pressure switch turn-on confirm signal PC, the power feeding apparatus 30$a$ turns off the clamp side valve of the solenoid valve 64. At this time, however, since the increased pressure of the respective hydraulic cylinders 41$a$ to 41$d$ can be maintained by the clamping pilot check valve 67, even if the hydraulic pump 62 is stopped, so that it is possible to maintain the clamping condition. Therefore, after that, even if the power feeding side transformer 30$b$ is disconnected from the power receiving side transformer 30$c$, since the workpiece 1 can be kept clamped, it is possible to disconnect the working pallet 11 and the subsidiary pallet 12 from the non-contact power feeding apparatus 30, and further to carry the clamped workpiece 1 to a machining position by use of a carrying apparatus (not shown). In other words, it is possible to move the hydraulic source circuit 20 under autonomous control.

(b) The unclamping operation is as follows:

After the workpiece 1 has been machined, the work pallet 11 and the subsidiary pallet 12 are carried to a predetermined position by use of the carrying apparatus. Further, the work pallet 11 and the subsidiary pallet 12 are rotated and located by the worker, so that the power feeding side transformer 30$b$ and the power receiving transformer 30$c$ can be located in position.

After that, the sequencer 90 (a host controller) transmits an unclamp start signal AS to the power feeding apparatus 30$a$, and a transformer coupling command signal TC to the slide apparatus 39, respectively. Then, in response to the transformer coupling command signal TC, the slide apparatus 39 actuates the two air cylinders 39*a* and 39*b* to fit the power feeding side transformer 30*b* to the power receiving side transformer 30*c*. At this time, the fitting of the power feeding side transformer 30*b* to the power receiving side transformer 30*c* is confirmed by use of a limit switch or an optical detection unit, and a transformer coupling end signal TF is transmitted from the slide apparatus 39 to the power feeding apparatus 30*a*. In response to the unclamp start signal AS and the transformer coupling end signal TF, the power feeding apparatus 30*a* starts to feed the high frequency power HP to the power feeding side power feeding transformer 37*a*. Therefore, the high frequency power HP is supplied from the power feeding side power feeding transformer 37*a* to the rectify and smooth circuit 82 of the hydraulic source circuit 20 through the power receiving side power feeding transformer 81*a*, so that the high frequency power DP is supplied from the rectify and smooth circuit 82 to the hydraulic pump driving motor 61. Therefore, the hydraulic pump driving motor 61 starts rotating to actuate the hydraulic pump 62.

After a predetermined time has elapsed after the start of the hydraulic pump driving motor 61, the unclamp side valve of the solenoid valve 64 is turned on, so that the unclamp valve turn-on signal AO is generated. The generated signal AO is transmitted to the unclamp valve turn-on signal receive circuit 85 of the hydraulic source circuit 29 via the power feeding side unclamp valve turn-on signal transmit transformer 37*c* and the power receiving side unclamp valve turn-on signal transmit transformer 81*c*. Here, the unclamp side valve of the solenoid valve 64 is turned on when current is supplied to the unclamp side valve energizing coil 89 of the solenoid valve 64 on the basis of the dc power transmitted from the rectify and smooth circuit 82 via the DC/DC converter 83 and in response to the unclamp valve turn-on signal AO transmitted by the unclamp valve turn-on signal receive circuit 85.

Therefore, the respective hydraulic cylinders 41*a* to 41*d* begin to move downward, so that the workpiece 1 is unclamped by the respective clamping arm mechanisms 40*a* to 40*d*. Further, the lowermost positions of the respectively hydraulic cylinders 41*a* to 41*d* can be confirmed by the unclamping pressure switch 70 of the hydraulic source circuit 20. When the clamping pressure switch 70 (See FIGS. 2 and 3) is closed, an unclamping pressure switch confirm signal PA is transmitted from an unclamp pressure switch turn-on confirm signal transmit circuit 87 to the power feeding apparatus 30*a* via the receiving side unclamp pressure switch turn-on confirm signal transmit transformer 81*e* and the power feeding side unclamp pressure switch turn-on confirm signal transmit transformer 37*e*. In response to the unclamping pressure switch turn-on confirm signal PA, the power feeding apparatus 30*a* turns off the unclamp side valve of the solenoid valve 64. At this time, however, since the decreased pressure of the respective hydraulic cylinders 41*a* to 41*d* can be maintained by the unclamping pilot check valve 68 (See FIG. 2), even if the hydraulic pump 62 is stopped, so that it is possible to maintain the clamping state. Therefore, after that, the hydraulic pump driving motor 61 is stopped, and further the work pallet 11 and the subsidiary pallet 12 are disconnected from the non-contact power feeding apparatus 30, thus completing the unclamping operation.

Figure 8:
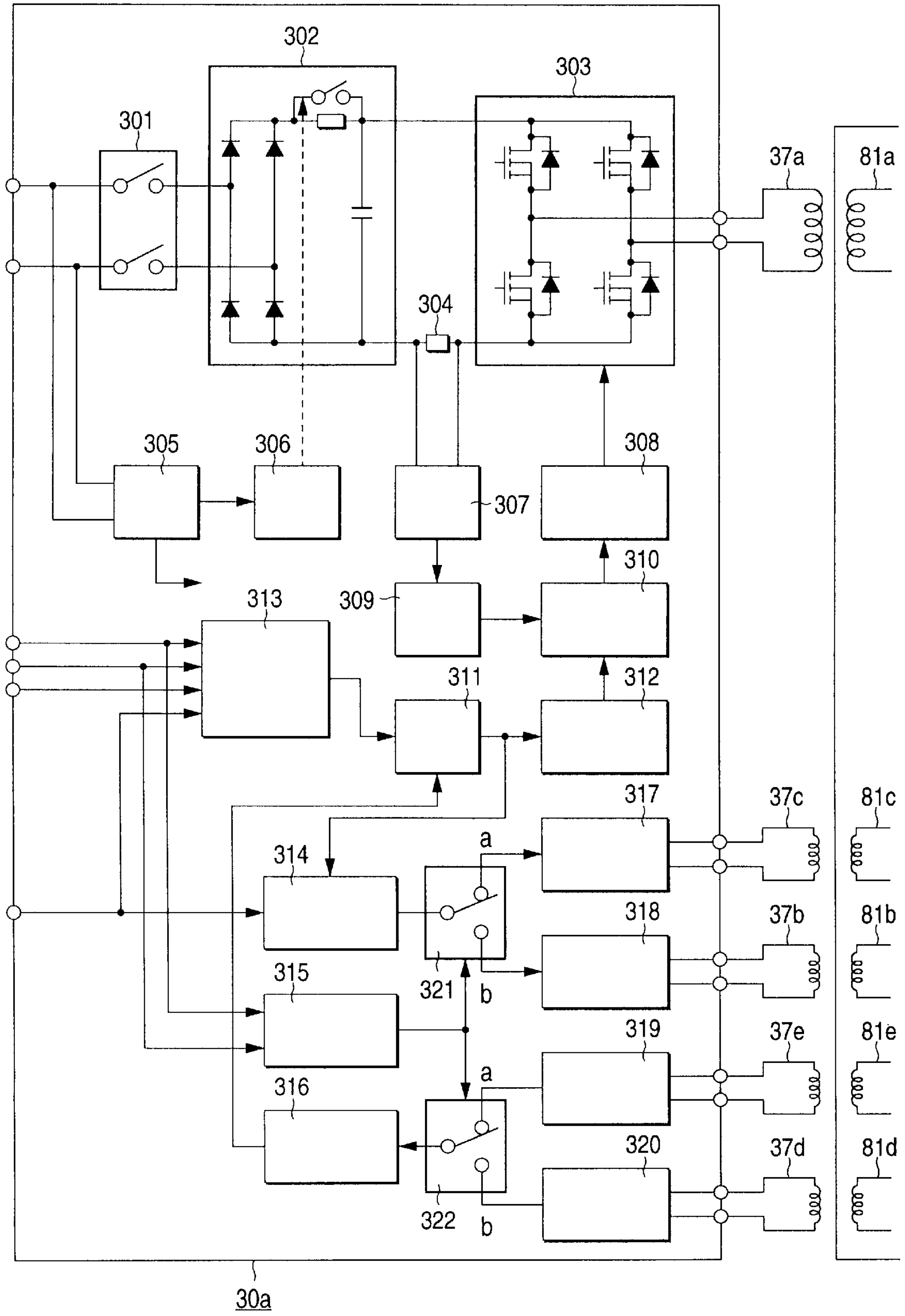
FIG. 8 is a block diagram showing a circuit construction of the power feeding apparatus shown in FIG. 1.

Further, for reference, FIG. 8 shows an example of the power feeding apparatus 30*a*.

The power feeding apparatus 30*a* shown in FIG. 8 is composed of a high frequency power generating section and a signal processing section. Here, the high frequency power generating section is made up of a circuit protector 301, a rectify and smooth circuit 302, an inverter circuit 303, an over-current detect resistor 304, a control power source 305, a relay drive circuit 306, an over-current detect circuit 307, a gate drive circuit 308, a protect circuit 309, and a pulse width modulate circuit 310. Further, the signal processing section is made up of a power feed start command circuit 311, a software start circuit 312, an interface circuit 313, a first delay circuit 314, a select circuit 315, a second delay circuit 316, an unclamp valve turn-on signal transmit circuit 317, a clamp valve turn-on signal transmit circuit 318, an unclamp pressure switch turn-on confirm signal receive circuit 319, a clamp pressure turn-on confirm signal receive circuit 320, a first switch circuit 321, and a second switch circuit 322.

Figure 9:
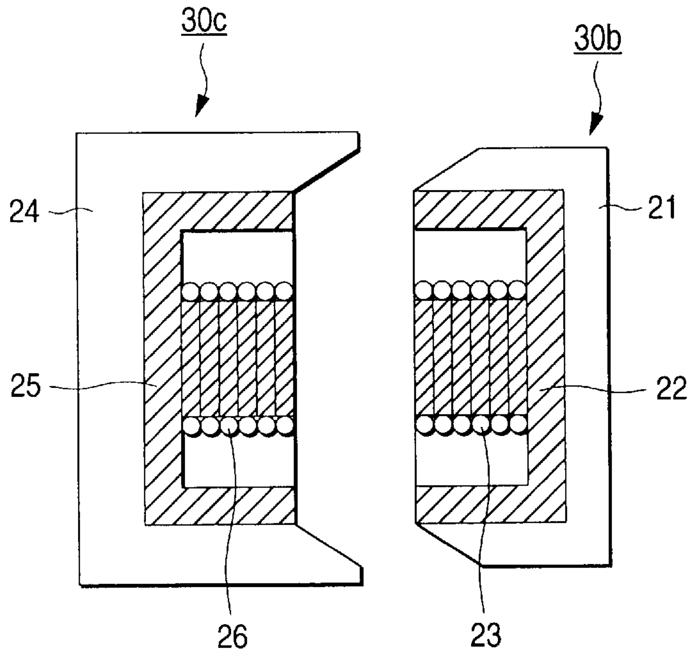
FIGS. 9(A) and (B) are a side cross-sectional view and a front view showing the construction of another embodiment of the non-contact power feeding apparatus, respectively.
Figure 9:
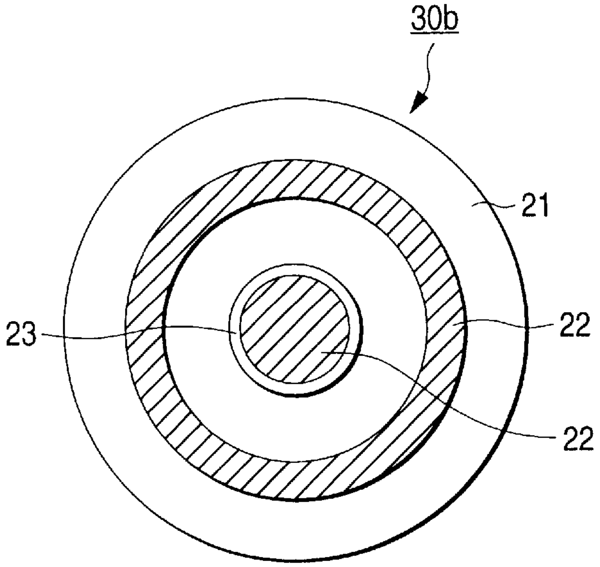

In the above-mentioned description, the non-contact power feeding apparatus 30 having the power feeding side transformer 30*b* and the power receiving side transformer 30*c* has been used. Without being limited only thereto, other non-contact power feeding apparatus can be for the hydraulic source according to the present invention. For instance, a well-known non-contact power feeding apparatus of axial gap type having a power feeding side transformer 30*b* and a power receiving side transformer 30*c*, as shown in FIG. 9, can be used.

Further, the clamp valve turn-on signal CO, the unclamp valve turn-off signal AO, the clamp pressure switch turn-on confirm signal PC, and the unclamp pressure switch turn-on confirm signal PA are transmitted between the power feeding apparatus 30*a* and the hydraulic source circuit 20 under non-contact condition by means of a magnetic medium. Without being limited thereto, it is possible to use an optical medium instead of the magnetic medium.

Further, although the slide apparatus 39 shown in FIG. 5 has two air cylinders 39*a* and 39*b*, the number of the cylinders is not limited only two, so that it is of course possible to one or three or more air cylinders.

Further, although the uppermost and lowermost positions of the respective hydraulic cylinders 41*a* to 41*d* have been confirmed by use of the clamp pressure switch 69 and the unclamp pressure switch 70, it is possible to confirm the position of the clamp arm 42*a* by use of a limit switch.

As the examples of the work machine provided with the hydraulic source according to the present invention, there exist a load moving and handling machine such as hydraulic lift, in addition to the machine tool having the clamping apparatus 10 shown in FIG. 1. In other words, the same effect as described above can be obtained by operating a load loading and unloading arm by use of the hydraulic source according to the present invention and further by holding the load carrying arm by use of the hydraulic source according to the present invention.

The fourth to tenth inventions according to the present invention will be described hereinbelow with reference to the attached drawings in sequence.

Figure 10:
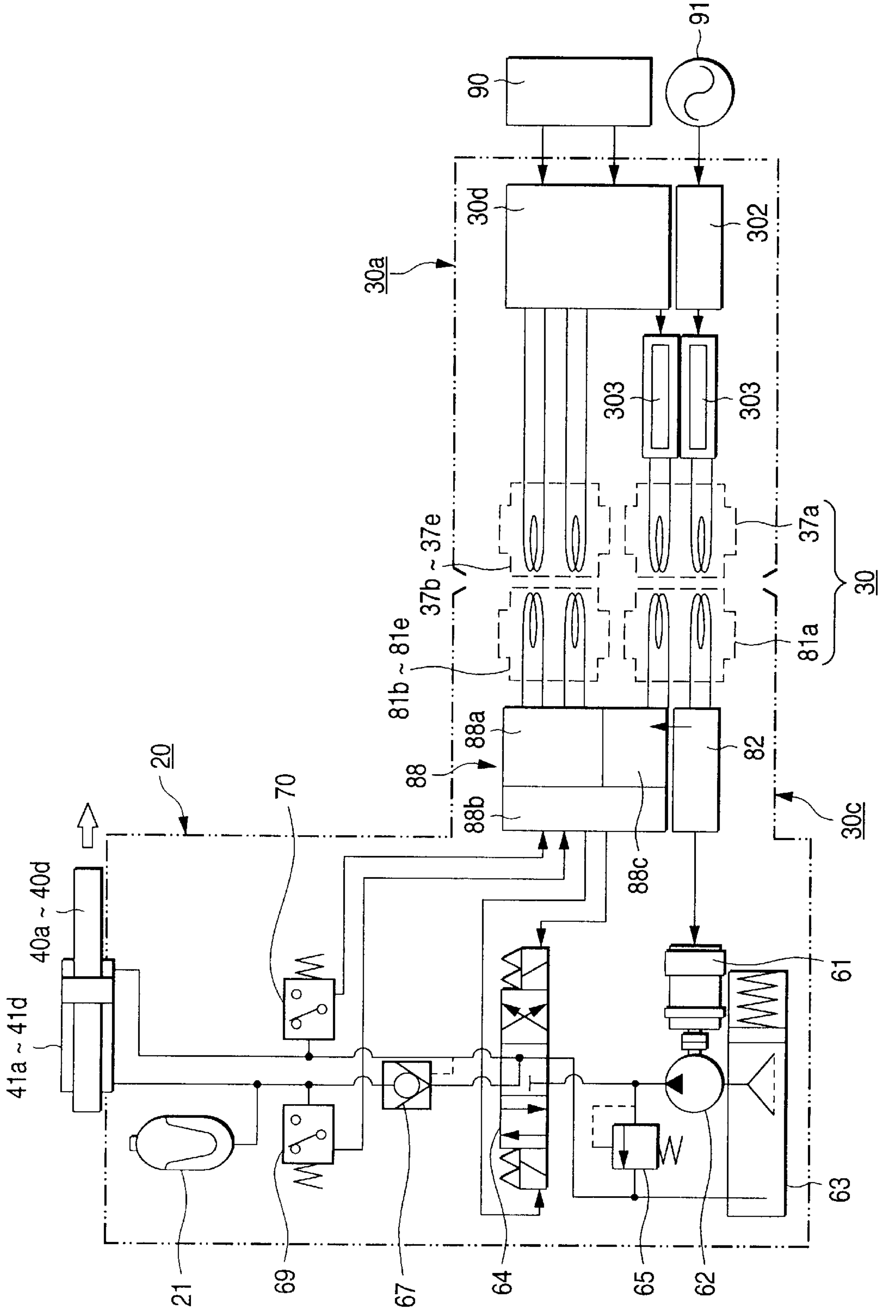
FIG. 10 is a schematic circuit block diagram showing a second embodiment of a universal hydraulic source according to the present invention.

FIG. 10 is a diagrammatical block diagram showing a second embodiment of the present invention related to a universal hydraulic apparatus. As shown in FIG. 10, this universal hydraulic apparatus can be divided into roughly a hydraulic source unit 20 and a power feeding unit 30 separable from the hydraulic source unit 20.

First, the hydraulic source unit 20 is roughly similar to that shown in FIG. 2, except that an accumulator 21 is additionally provided to absorb change in the amount of oil due to temperature change when the hydraulic circuit is accommodated in an airtight structure, that is, to prevent the hydraulic source characteristics from being changed. Here, a forward (clamp) pressure switch 69 and a backward (unclamp) pressure switch 70 can be substituted for a proximity switch such as a micro-switch, respectively. Further, the power feeding unit 30*a* is composed of a power feeding side control section 30*d* for receiving signals transmitted by a host controller (sequencer) 90, a rectify and smooth circuit 302 for rectifying ac voltage supplied from an ac power source 91, and a high frequency inverter 303 for converting the dc voltage supplied by the power feeding side control section 30d and the rectify and smooth circuit 302 into a high frequency voltage. The data signals transmitted through secondary side data signal transmit sections 81*b* to 81*e* for converting the high frequency voltage induced from the primary side to the secondly side into dc voltage are inputted to a CPU (central processing unit) 88*a* disposed on the power receiving side control section 88 for controlling the received signals. On the basis of the data signals, the control section 88 controls the solenoid valve 64 via an I/O (input/output) interface 88*d* or feedbacks the confirm signals of the respective pressure switches 69 and 70 to the power feeding unit 30 via the secondary side signal transmit sections 81*b* to 81*e*. Further, when the number of data signals is small, it is possible to transmit the data signals in parallel by providing high frequency couplings (whose number is the same as that of the signals), without depending upon the serial communications under control of the CPU 88*a* of the control section 88. On the other hand, the high frequency voltage transmitted through the secondary side power transmit section 81*a* is supplied to a power circuit 88*c* of the power receiving side control section 88, converted into dc voltage through the rectify and smooth circuit 82, and then supplied to a hydraulic pump driving motor 61. Further, part of the dc voltage generated by the rectify and smooth circuit 82 is supplied to the power source circuit 88*c* of the power receiving side control section 88, as occasion demands.

By the way, in the same way as with the case of the first embodiment, after the movements of the rods 40*a* to 40*d* of the hydraulic cylinders 41*a* to 41*d* to the forward ends have been confirmed, respectively, the solenoid valve 64 is turned off so that the hydraulic pressure of the hydraulic cylinders 41*a* to 41*d* can be held on the basis of the operation of the check valve 67 and further released at need. Therefore, the hydraulic unit 20 can keep functioning as a strong member such as a support, jack, chuck, vice or clamping device, so that it is possible to realize an autonomous jig having no hydraulic piping and electric wiring arrangement. Owing to the construction as described above, since the hydraulic source unit can move together with a workpiece or a supported object, it is possible to construct a universal and effective supporting device.

Figure 11:
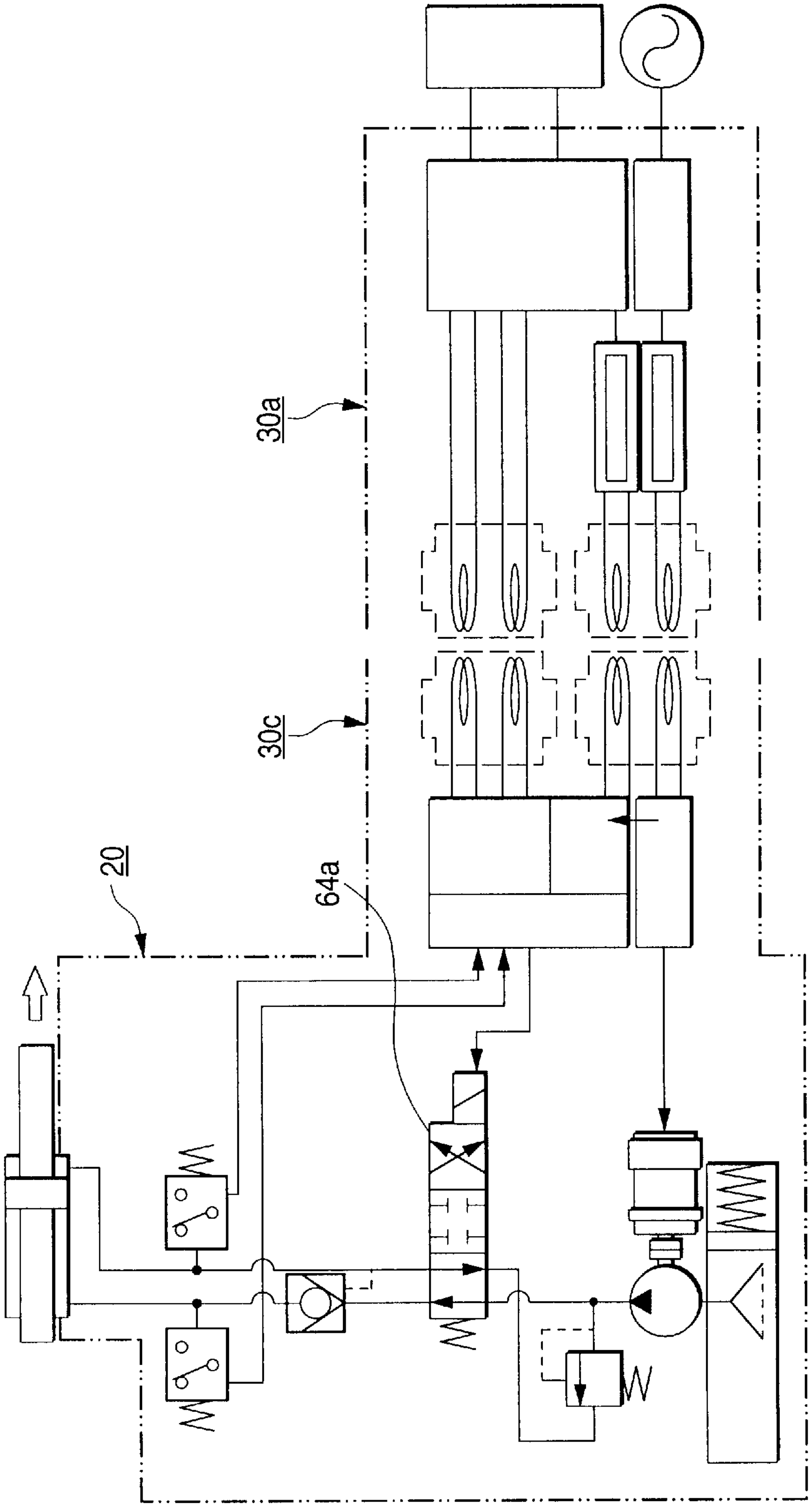
FIG. 11 is a schematic circuit block diagram showing a simplified example of the universal hydraulic source apparatus shown in FIG. 10.

FIG. 11 shows another case, in which a single solenoid valve 64*a* is provided instead of the solenoid valve 64 and further the solenoid can be operated alone by a reaction force of a spring for simplifying the control. Further, the accumulator 21 (as shown in FIG. 10) is also omitted.

In the present embodiment, although the hydraulic pump driving motor 61 and the solenoid valve 64 (or single solenoid valve 64*a*) are controlled on the basis of the high frequency electromagnetic induction in the same way as with the case of the power supply, it is effective to superpose data signals upon the supplied power for simplifying the apparatus construction.

Figure 12:
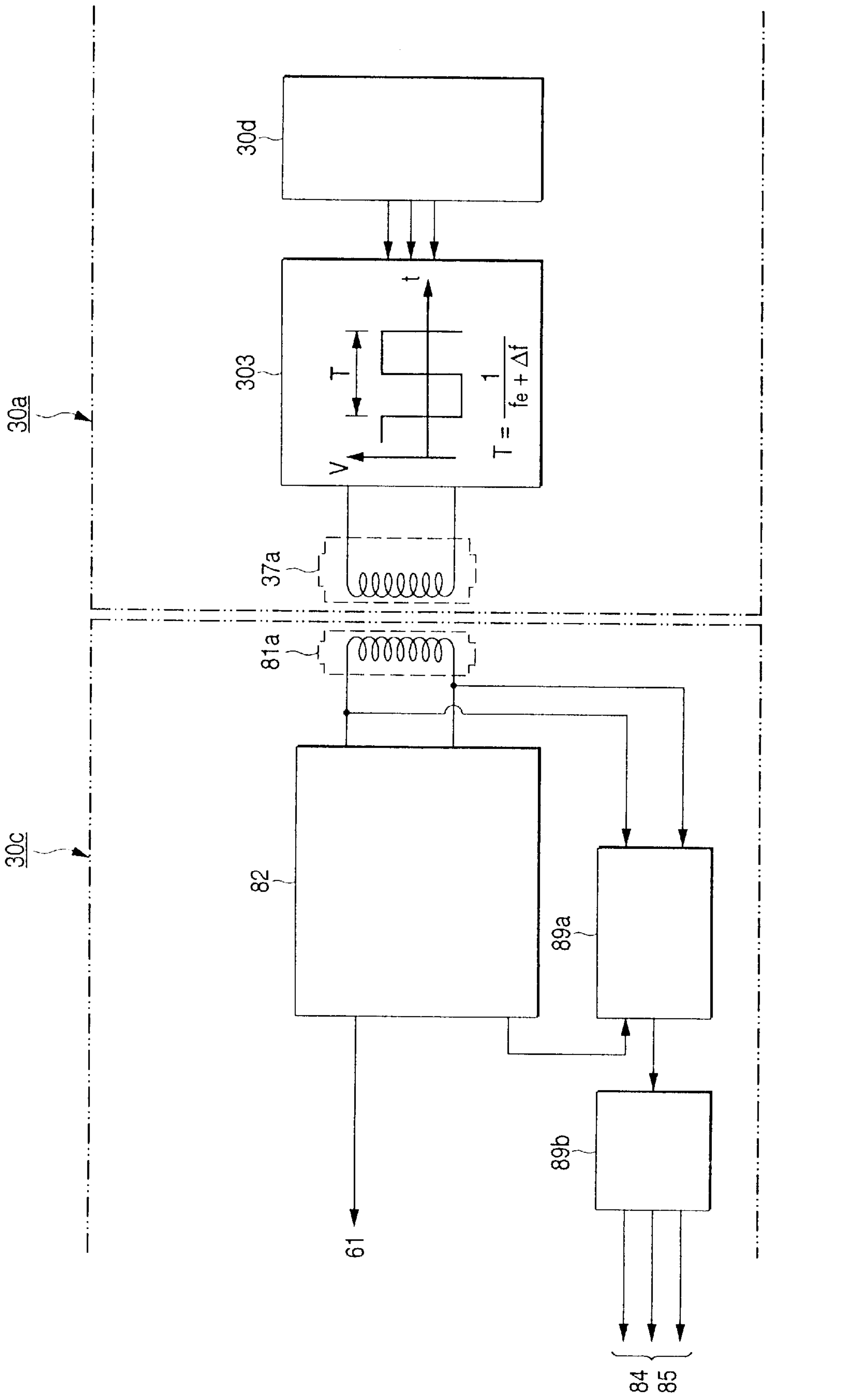
FIG. 12 is a block diagram showing an essential portion for superposing data signals upon the power supplied in the universal hydraulic source.

With reference to FIG. 12, a method of superposing data signal upon supplied power will be explained hereinbelow. FIG. 12 is a block diagram showing an essential portion for superposing data signals upon the supplied power in the universal hydraulic apparatus shown in FIG. 10. In FIG. 12, however, the hydraulic circuit is not shown. In the drawing, the power feeding unit 30*a* comprises a sequence switch panel 30*d*, a high frequency inverter 303 for generating a high frequency voltage having a predetermined frequency on the basis of a command applied by the sequence switch panel 30*d*, and a primary side transmit section 37*a*. On the other hand, the hydraulic source unit 20 comprises a secondary side transmit section 81*a*, a rectify and smooth circuit 82 for converting the high frequency voltage generated by the secondary side transmit section 81*a* into dc voltage, and frequency measure circuit 89a driven by the signal power source obtained by the rectify and smooth circuit 82, and a decoder 89*b*.

On the basis of the above-mentioned construction, the data signals can be superposed upon the supplied power within a range where the transmit characteristics of the power transmit frequency will not change. In more detail, a value of n ($n=0, \pm1, \pm2, \ldots \pm k$) is designated by the sequence switch panel 30*d*. On the basis of this value n, the high frequency inverter 303 can form a pulse waveform having a frequency $f_0+n\Delta f$ (where $f_0$ is an inverter central frequency and $\Delta f$ is a frequency sufficiently lower than $f_0$). For instance, in this embodiment, since it is sufficient that the sequence command is about three bits (eight commands), the high frequency exciting frequency are changed into eight frequencies in a range where the supply power dc-converted by the rectify and smooth circuit 82 will not change. Further, the frequency of the divided high frequency exciting voltage is measured by the frequency measure circuit 89a, and the command sequence signals 84 and 85 (applied to the clamp valve turn-on signal receive circuit and the unclamp valve turn-on signal receive circuit) corresponding to-the frequencies are generated by the decoder 89*b*, so that the data signals can be superposed upon the supplied power and further transmitted.

On the other hand, the sequence feedback as to whether the power is supplied correctly or whether the hydraulic cylinders 41*a* to 41*d* are actuated correctly can be confirmed by another non-contact transmit unit in the same principle as the power supply. However, when the visual confirmation by the operator is sufficient, some LED displays well seen from the outside can be used.

In the present embodiment, an example in which the check valve 67 is provided between the solenoid valve 64 and the hydraulic cylinders 41*a* to 41*d* as shown in FIG. 10 has been explained. However, in the case where the hydraulic cylinders 41*a* to 41*d* are used as a gripper (in which it is unnecessary to hold the hydraulic force after the gripping function has been released), the pressure holding function such as the check valve is not required.

Figure 13:
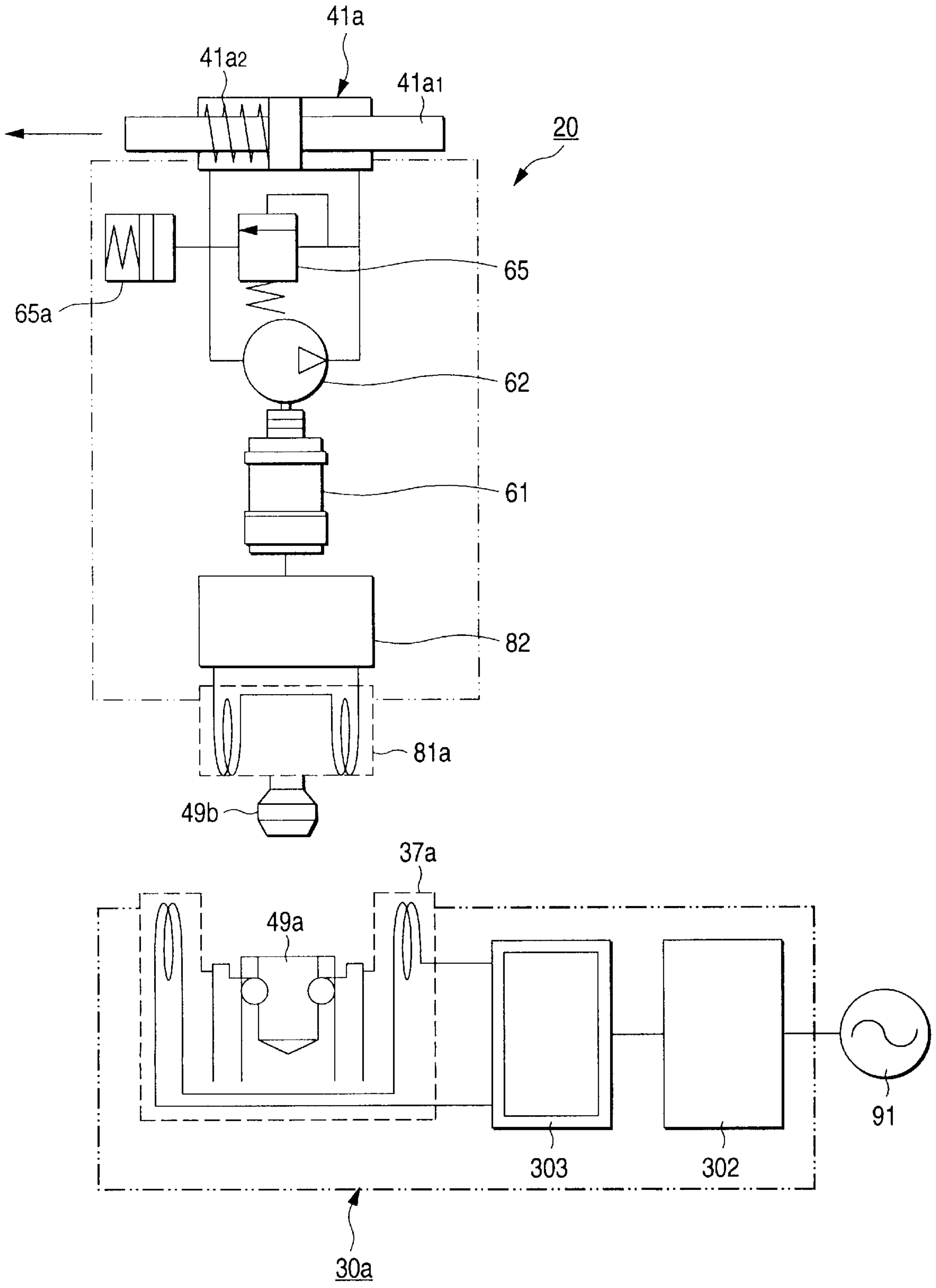
FIG. 13 is a schematic block diagram showing a third embodiment of the universal hydraulic source according to the present invention.

FIG. 13 is a diagrammatical structural diagram showing a third embodiment of the universal hydraulic source according to the present invention. The universal hydraulic source according to the present invention is considered as being applied to tools corresponding to an ATC (automatic toll change) or to an AHC (automatic head exchange) mechanism mounted on a free end of a robot. The hydraulic source unit 20 includes a secondary power transmit section 81*a*, a rectify and smooth circuit 82, a hydraulic pump driving motor 61, a hydraulic cylinder 41*a* having a spring $41a_2$ for urging a rod 41*a* backward (in the rightward in FIG. 13), a relief valve 65 35 interposed between the hydraulic cylinder 41*a* and a hydraulic pump 62, and a reservoir tank 65*a* for adjusting the amount of oil. Therefore, oil is circulated between the oil pump 62 and the hydraulic cylinder 41*a*, so that any hydraulic tank is not used in this construction. Further, being different from the second embodiment used for the clamp jig and the gripper, the construction is such that the hydraulic pressure is required to be generated, only when the hydraulic cylinder 41*a* is being moved (as when used for pressure contact or cutting), without holding the force at a constant position of the hydraulic cylinder 41*a*.

Further, the hydraulic source unit 20 and the power feeding unit 30*a* are constructed in such a way as to be coupled to or decoupled from each other via a pull-stud type chuck. In more detail, a stud portion 49*b* is formed integral with the secondary power transmit section 81*a*; on the other hand, a socket portion 49*a* with and from which the stud portion 49*b* can be engaged or disengaged is formed integral with the primary side power transmit section 37*a* of the power feeding unit 30*a*. Therefore, when the stud portion 49*b* is engaged with the socket portion 49*b*, the secondary power transmit section 81*a* can be located facing the inner circumferential surface of the primary side power transmit section 37*a* via a gap.

When the operation of the universal hydraulic source is started, although the rod 41*a*, of the hydraulic cylinder 41*a* is positioned at the rear end (on the right side in FIG. 13) by an elastic force of the spring 41$a_2$, after the engagement between the stud portion 49*b* and the socket 49*a* has been confirmed, the high frequency voltage generated by the power feeding unit 30*a* is supplied to the hydraulic source unit 20 on the basis of the high frequency electromagnetic induction generated between the primary side power transmit section 37*a* and the secondary power transmit section 81*a*. The high frequency voltage supplied to the hydraulic source unit 20 is converted into dc voltage by the rectify and smooth circuit 82 to drive the hydraulic pump drive motor 61. Therefore, the oil in the hydraulic pump 62 is compressed and then supplied into the hydraulic cylinder 41*a*. When the hydraulic cylinder 41*a* is filled with oil, the rod 41$a_1$ begins to advance in the arrow direction in FIG. 13 against an elastic force of the spring 41$a_2$ to the forward end. By use of this forward movement of the rod 41$a_1$, it is possible to compress or cut a workpiece.

Further, in this embodiment, since no hydraulic force holding function is provided, it is necessary to keep driving the hydraulic pressure pump driving motor 61 even after the relief valve 65 has been released in order to keep generating the pressure of the hydraulic cylinder 41*a*. In this case, when there exists a possibility that the hydraulic pump drive motor 61 reaches an overload condition, this overload condition can be detected by monitoring the magnitude of the current and the current duration time on the side of the power feeding unit 30*a*, in order to stop the voltage from being supplied to the primary side power transmit section 37*a*. When the hydraulic pump driving motor 61 is stopped, since the hydraulic pressure of the hydraulic cylinder 41*a* can be released through a gap in the hydraulic pressure pop 62, the hydraulic pressure of the hydraulic actuator is reduced down to zero.

Figure 14:
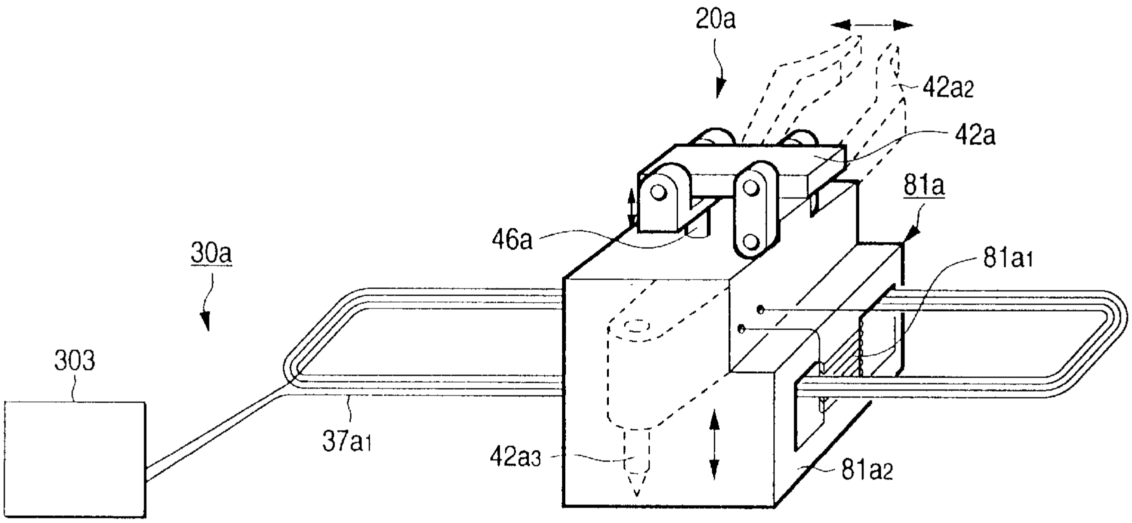
FIG. 14 is a schematic block diagram showing a fourth embodiment of the universal hydraulic source according to the present invention.

FIG. 14 is a diagrammatical perspective view showing a fourth embodiment of the universal hydraulic source according to the present invention. In this embodiment, the power feeding unit 30*a* includes a high frequency inverter 303, and a primary side winding 37$a_1$ connected to the high frequency inverter 303 and wound into a long and narrow shape. On the other hand, the hydraulic source unit 20*a* includes a primary side winding 37$a_1$ and a secondary side winding 81$a_1$. The secondary side winding 81$a_1$ is wound around an intermediate core portion of secondary side core 81*a*. The primary side winding 37$a_1$ is wound being opposed to the secondary side winding 81*a*, and passing through two hollow portions (to which the primary side winding 37$a_1$ is loosely fitted) of the secondary side core 81*a*, in such a way that the secondary side core 81*a* can be moved straight in-the longitudinal direction of the primary side winding 37$a_1$ mounted on the table (not shown). Therefore, the secondary side transmit section is constructed by these secondary side core 81$a_2$ and the secondary side winding 81$a_1$. Further, inside the hydraulic source unit 20, the hydraulic cylinders 41*a* to 41*d* (not shown) actuated by the hydraulic pressure supplied by the hydraulic source circuit 20 shown in FIG. 10 or FIG. 11 are provided. Further, a damper 42*a* driven by the rods 40*a* to 40*d* of the cylinders 41*a* to 41*d* in both forward and rearward directions is mounted on the hydraulic source unit 20. Further, the hydraulic circuit of the hydraulic source unit 20 is controlled by data signals superposed upon the power supplied by the power feeding unit 30*a*, by use of the circuit shown in FIG. 12.

By the construction as described above, it is possible to transmit power and the data signals from the power feeding unit 30*a* to the hydraulic source unit 20 in non-contact condition at any positions, as far as a range in which the hydraulic source unit 20 is movable, so that an universal jig can be constructed in such a way that the workpiece clamping position can be adjusted according to the size and the shape of a workpiece. Further, in order to fix the hydraulic source unit 20 onto the table, it is possible to provide a fixing actuator (locker 42$a_3$) for striking a wedge by use of the hydraulic pressure generated by the hydraulic source unit 20. Further, when the gripper 42$a_2$ opened or closed in linkage with the operation of the rod 46*a* is mounted on the hydraulic source unit 20, it is possible to construct the apparatus for carrying a workpiece under clamping condition.

Figure 15:
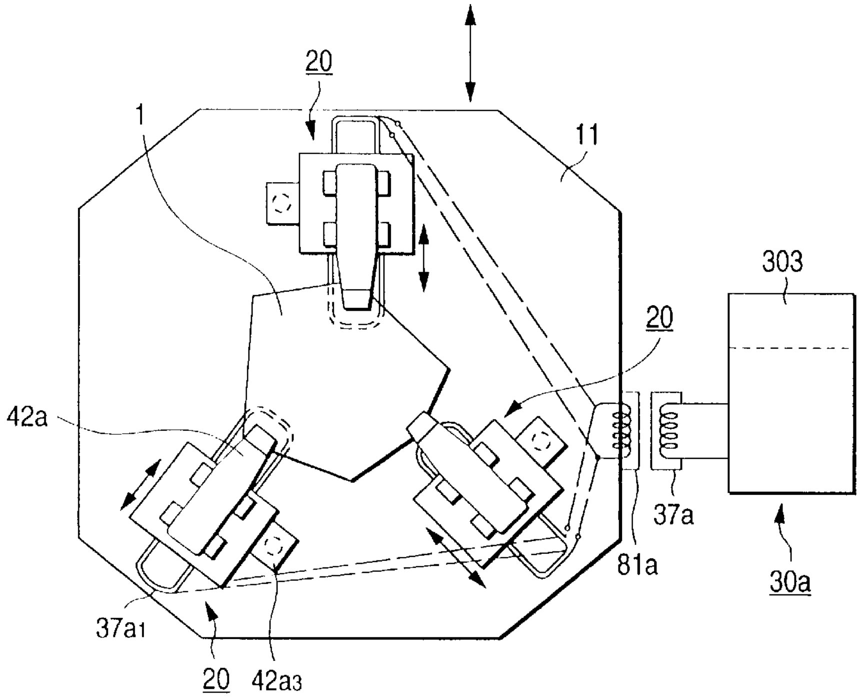
FIG. 15 is a diagrammatical plane view showing an application example of the universal hydraulic source shown in FIG. 14.

Further, as shown in FIG. 15, it is also possible to arrange three primary side windings 37$a_1$ electrically connected in parallel to each other and extending in three different radial directions of the pallet 11 and further to provide three hydraulic source units 20 each having a clamper 42*a* and a locker 42$a_3$ so as to be movable along each primary side winding 37$a_1$. In this case, high frequency voltage is applied from the power feeding unit 30*a* (the same as shown in FIG. 12) to each of the respective primary side windings 37$a_1$ via an additional primary transmit section 36*a* and an additional secondary transmit section 81*a*, respectively under non-contact condition. By the above-mentioned construction, the pallet 11 can be moved under the condition that the workpiece 1 is fixed to the pallet 11, so that a flexible jig pallet suitable for an FMS (flexible manufacturing system) can be constructed.

The moving mechanism of the hydraulic source unit 20 shown in FIGS. 14 and 15 will be explained with reference to FIG. 16.

Figure 16:
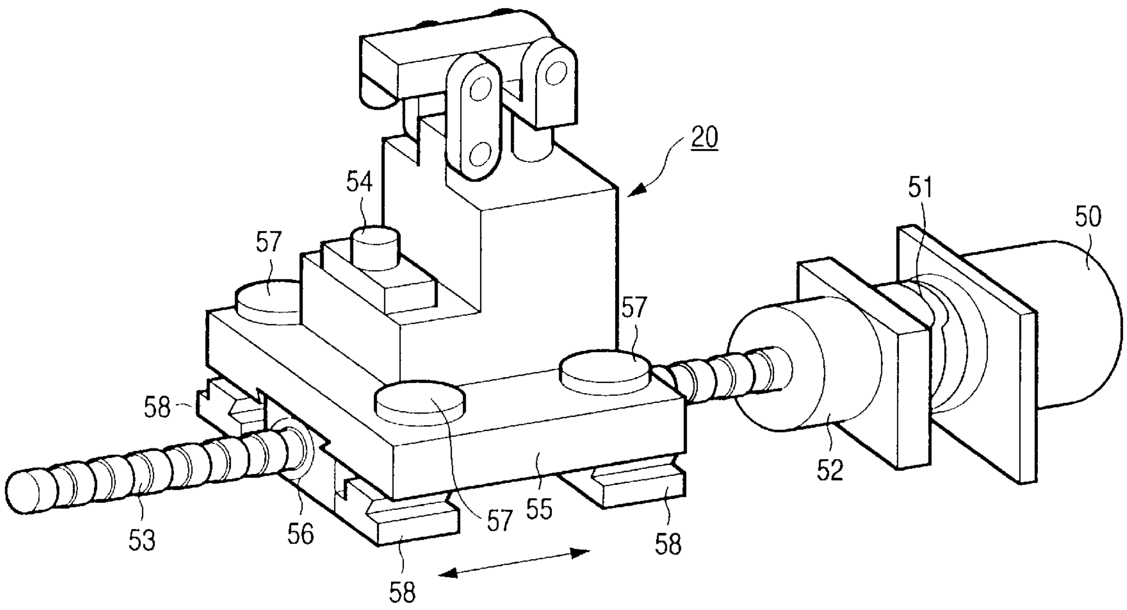
FIG. 16 is a diagrammatical perspective view showing a movement mechanism of the unit-type hydraulic source circuit shown in FIGS. 14 and 15.

FIG. 16 is a diagrammatical perspective view showing the moving mechanism of the hydraulic source unit 20 shown in FIGS. 14 and 15. In FIG. 16, a servomotor 50 is attached to a ball screw 53 via a coupling 51 and a support bearing 52 in sequence. On the other hand, the hydraulic source unit 20 is mounted on a movable clamp base 55 to which a ball screw nut 56 engaged with the ball screw 53 is fixed. Therefore, when the servomotor 50 is driven to rotate the ball screw 53, the hydraulic source unit 20 can be moved reciprocatingly in the arrow directions. Further, although not shown in FIGS. 15 and 16, the hydraulic source unit is provided with a workpiece base surface on which the workpiece 1 (not shown) is mounted.

Further, in FIGS. 14 and 15, the hydraulic source unit 20 is fixed by use of the locker 42$a_3$. FIG. 16 shows an example where two T-nut type clamps 58 are used instead of the fixing bolt, after location. This will be described in further detail hereinbelow. There are provided four T-nut type clamp cylinders 57 which use part of the hydraulic pressure generated on the movement clamp base 55 as the driving source. Each T-nut type clamp piece 58 is linked with each T-nut clamp cylinder 57. The T-nut type clamp pieces 58 are slidably fitted to grooves (not shown) formed along the movement direction of the hydraulic source unit 20. After the hydraulic source unit 20 has been located in position precisely by the servomotor 50, the T-nut type clamp pieces 58 are pushed against the grooves of the pallet 11 by use of part of the hydraulic pressure generated by the hydraulic source unit 20, so that the hydraulic source unit 20 can be fixed. As described above, when the T-nut type clamp is used, it is possible to fix the hydraulic source unit 20 securely.

In FIG. 16, although the power feeding method to the hydraulic source unit 20 is not shown, it is possible to adopt the direct-driven type non-contact power feeding method by moving the hydraulic source unit continuously in the movement stroke range as shown in FIG. 14, or by fixing the hydraulic source unit at a fixed position as shown in FIG. 15. The data signals can be transmitted in the same way.

Further, it is possible to control the actuator mounted on the rotary table (not shown), by mounting the hydraulic source unit 20 on a turntable and by driving the hydraulic source unit 20 in combination with the rotary power feeding apparatus, without use of any external hydraulic source or the conventional rotary coupler so far used to supply hydraulic pressure to a rotary body.

Figure 17:
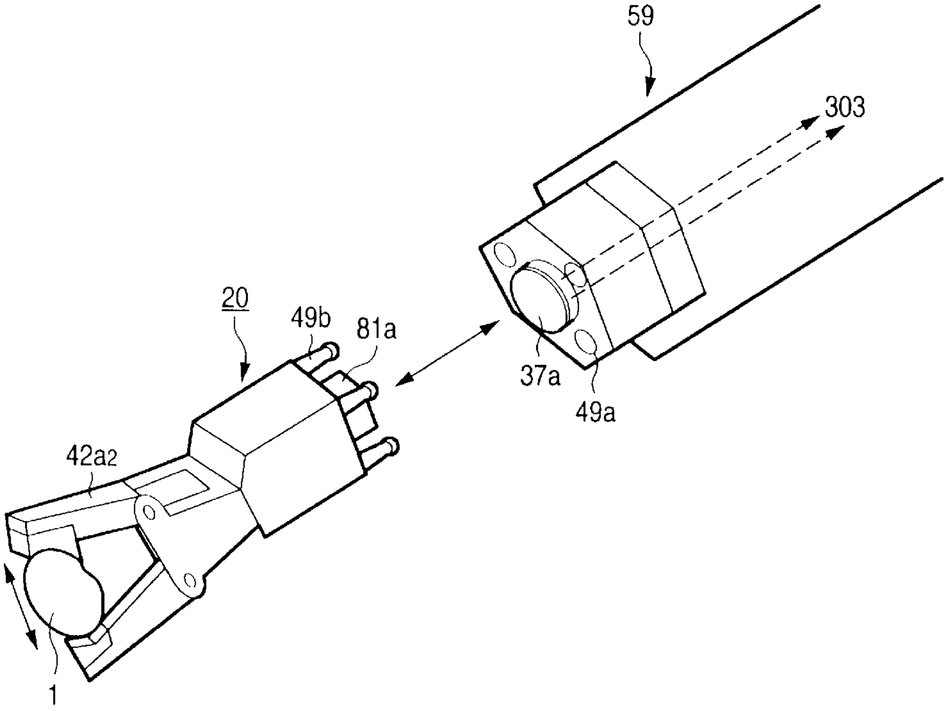
FIG. 17 is a schematic block diagram showing a fifth embodiment of the universal hydraulic source according to the present invention.

FIG. 17 is a perspective view showing a fifth embodiment of the universal hydraulic source according to the present invention, in which the hydraulic source is applied to a gripper for use with the ATC (automatic tool change) at the free end of a robot. In FIG. 17, the hydraulic source unit 20 is composed of a hydraulic circuit similar to that shown in FIG. 13 and a gripper 42$a_2$ for clamping a workpiece 1 in linkage with the hydraulic cylinders (not shown) provided therein. On the other hand, the power feeding unit is also similar in construction to that shown in FIG. 13, and the primary side transmit section 37*a* is provided at an end of the robot arm 59.

Further, the hydraulic source unit 20 and the robot arm 59 are coupled with each other by use of the pull-stud chuck. That is, two stud portions 49*b* are formed integral with the secondary side transmit section 81*a* and two socket portions 49*a* are formed integral with the primary side transmit section 37*a* so as to be engaged with and disengaged from the stud portions 49*a*. Therefore, when the stud portions 49*b* are engaged with the socket portions 49*a*, the secondary side transmit section 81*a* can be positioned so as to face the inner circumferential surface of the primary side transmit section 37*a* via a gap.

In the construction as described above, since there exist no hydraulic piping and no electric wiring between the gripper 42$a_2$ and the robot arm 59, it is possible to construct the tool (gripper) by which arm end tolls can be exchanged freely.

Figure 18:
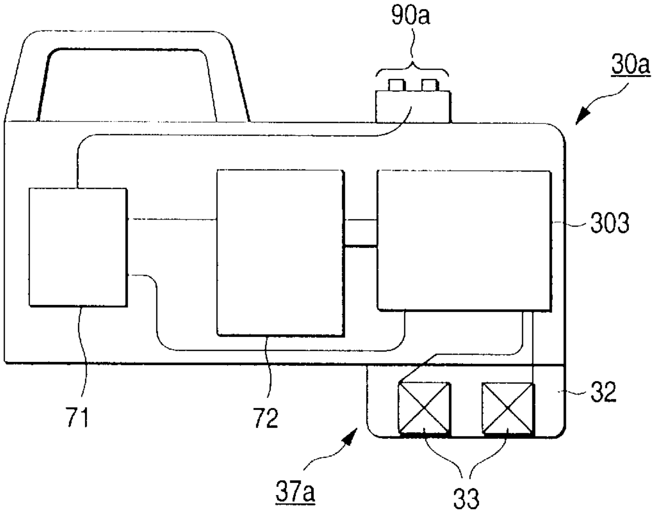
FIG. 18 is a schematic block diagram showing a sixth embodiment of the universal hydraulic source according to the present invention.

FIG. 18 is a diagrammatical view showing a power feeding unit of a sixth embodiment of the universal hydraulic source according to the present invention. The power feeding unit 30*a* includes a high frequency oscillate circuit 71 for oscillating a high frequency voltage of a predetermined frequency on the basis of a command applied by a sequence command switch 90*a*, a high frequency inverter 72, and a primary side transmit section 37*a* composed of a primary side core 32 and a primary side winding 33 made of high frequency magnetic material. Further, a battery is housed therein to supply power to the high frequency oscillate circuit 71 and another high frequency inverter 303, so that the power feeding unit can be constructed as being portable.

Figure 19:
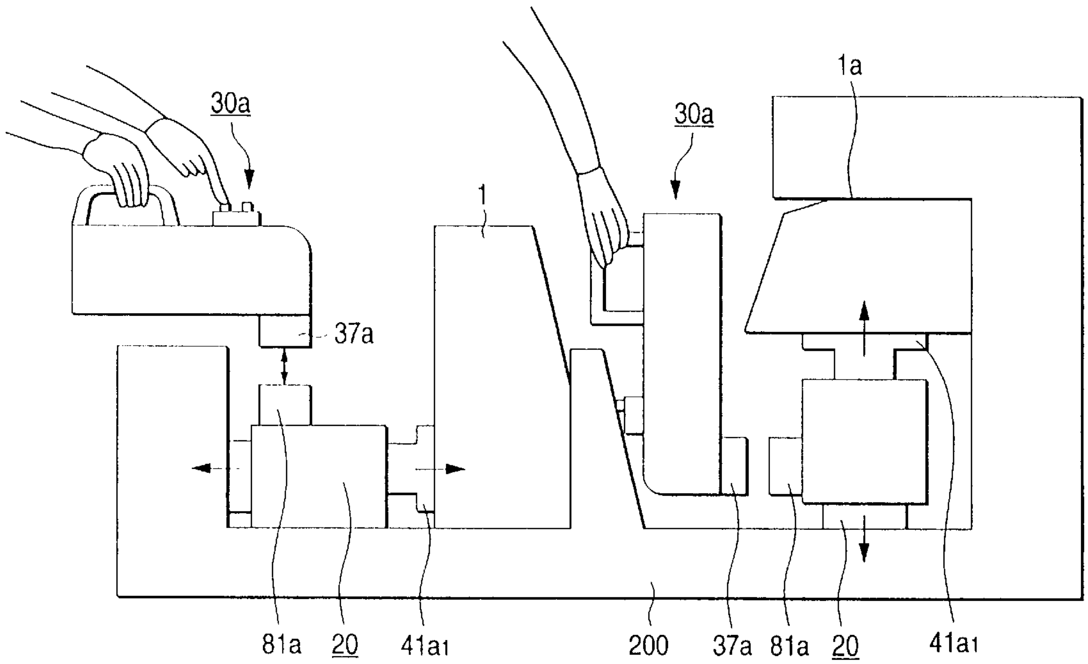
FIG. 19 is a diagrammatical side view showing an example of the state where the unit-type hydraulic source circuit shown in FIG. 18 is being used.

Therefore, as shown in FIG. 19, it is possible to hold a workpiece la at a predetermined position on a base 200 by the hydraulic source units 20 and the power feeding unit 30*a*. In holding the workpiece 1*a*, the primary side transmit section 37*a* of the power feeding unit 30*a* is positioned so as to be opposed to the secondary side transmit section 81*a* of the hydraulic source unit 20, so that power can be supplied and data signals can be transmitted to the hydraulic source unit 20 without use of any hydraulic piping and any electric wiring, to actuate the hydraulic actuator 41$a_1$. Further, the hydraulic source unit 20 includes the frequency measure circuit 89*a* and the decoder 89*b* both shown in FIG. 12, and the data signals are superposed upon the supplied power. Further, since the power feeding unit 30*a* is of portable type, it is possible to supply power and to transmit data signal to the hydraulic source unit 20, irrespective of the position and direction of the hydraulic source unit 20. Therefore, it is very effective when a large torque is required to be generated or to build up a strong member at a short time, at the setup process of machine tool processing or in the assembly of heavy objects such as vehicle or vessel or the building spot where no hydraulic piping and no electric wiring are arranged.

Figure 20:
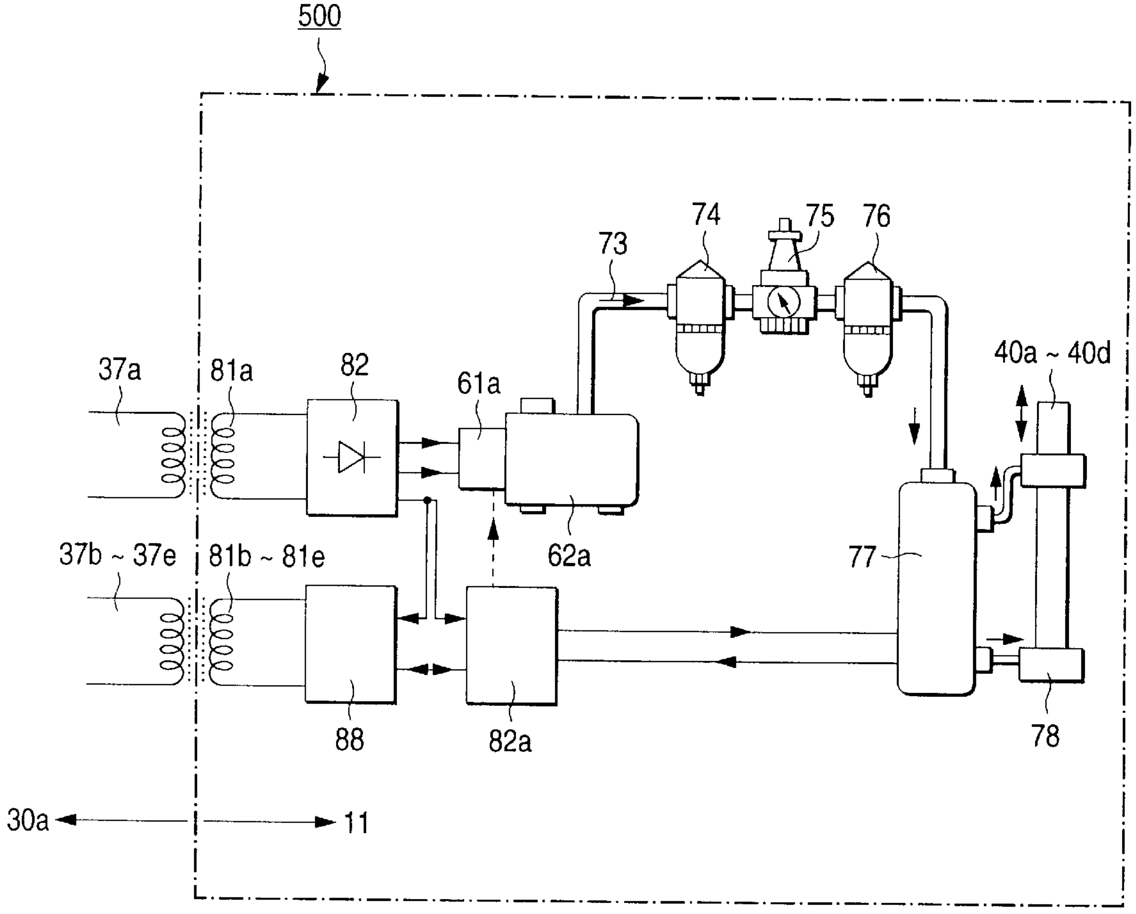
FIG. 20 is a diagrammatical block diagram showing a seventh embodiment according to the present invention, in which an autonomous pneumatic source is shown.

FIG. 20 is a diagrammatical view showing a seventh embodiment of the autonomous pneumatic pressure source according to the present invention, in which the principle of the autonomous control of the pneumatic source is shown.

A pneumatic source compressor 62*a* is of small-sized and light-weight portable type, in which a driving motor and an electromagnetic solenoid controller 82*a* are driven by power and data transmitted in non-contact condition. Compressed air 71 pressurized by the compression operation of the compressor 62*a* is cleaned by a filter 72 to remove moisture and dust, and further the pressure thereof is adjusted through a pressure regulator 73. Further, atomized oil is fed into the pipe through a lubricator 74 at need. The flow path of the pneumatic pressure of the compressed air 71 passed through the lubricator 74 is switched by an electromagnetic solenoid 75, to control the pneumatic cylinders 76 reciprocatingly, for instance.

Figure 21:
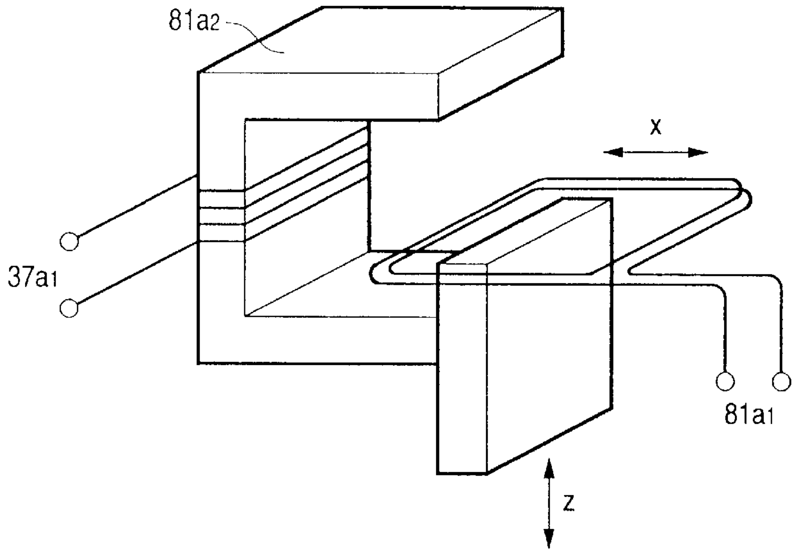
FIG. 21(A) is a perspective view showing a coupled/decoupled type split transformer composed of magnetic path open/close type high frequency cores.
FIG. 21(B) is an illustration for assistance in explaining the automatic clamping on the jig pallet of the machining center.
Figure 21:
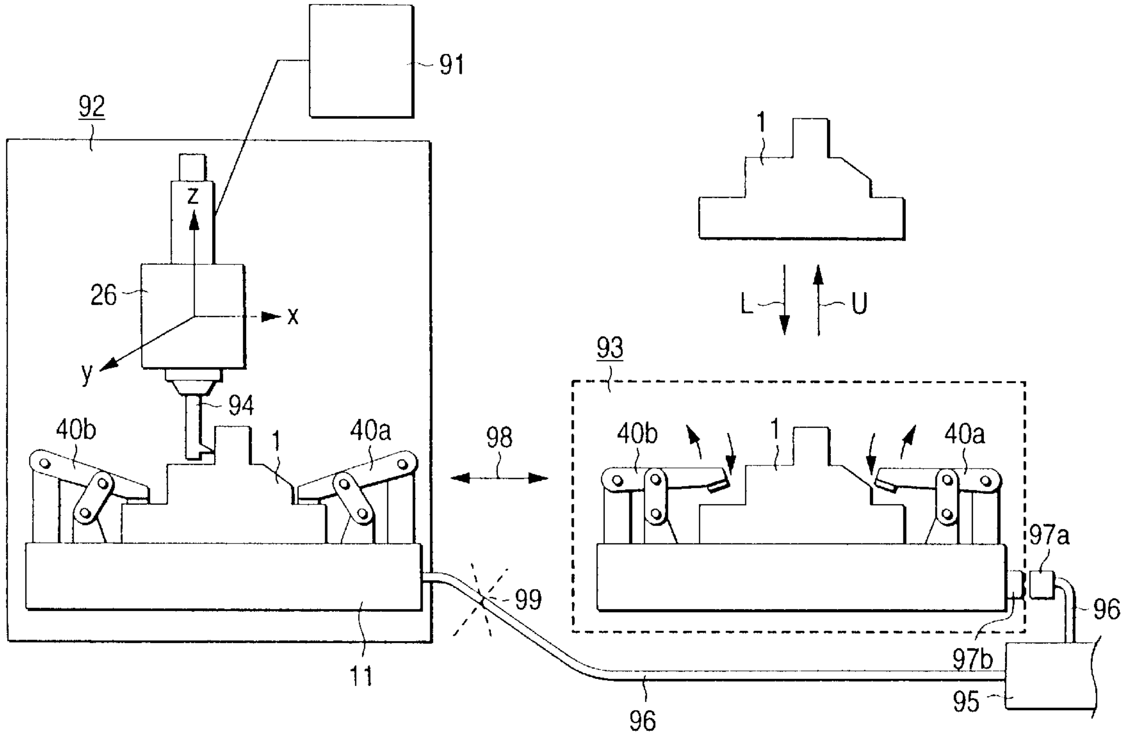

Here, although it is possible to consider to supply power and transmit data by use of contacts according to the environment. However, at least in the machine tool shop (machining processing site), power and data cannot be transmitted stably due to problems with respect to chips and cutting lubricant. In contrast with this, when the transmitting means based upon the high frequency electromagnetic induction using split type transformers is adopted, it is possible to solve the problem caused by short circuit by chips or mal-conduction due to cutting lubricant or power intermission due to mal-coupling, etc. Here, the transmitting means based upon the high frequency electromagnetic induction using split type transformers is formed, in principle, by confronting two E-type high frequency magnetic substance cores with each other via a narrow gap and by winding coils around the middle leg portions of the E-type cores, respectively, as the primary side transmit section and the secondary side transmit section. In this case, each core is formed of high frequency magnetic substance. Further, various power and data transmitting means based upon the high frequency electromagnetic induction can be considered as follows: the rotary corresponding type as shown in FIGS. 4 and 9, the direct-driven corresponding type as shown in FIG. 14, or a coupled/decoupled type using a split transformer. In the case of the coupled/decoupled split type transformer, as shown in FIG. 21(A), wire is wound around a part of the primary side transmit section of a C-shaped magnetic path open/close high frequency magnetic substance core, and one side of the multi-turn wiring of the secondary side transmit section is inserted into the cut-out portion of the C-type core and further moved straight in the x-direction movement (along the insertion direction) further moved in the z-direction movement (along the vertical direction inside the C-type core perpendicular to x-direction). In this case, any one of the core or winding is fixed or moved. By the way, in the power transmission, although the transmission efficiency is lower than that of the contact method, since the compressor motor 61*a* (as a load) is operated only for a short time period, there exists no practical problem with respect to the deterioration in the power transmission efficiency and the transmitted power density.

According to the above-mentioned non-contact power and data transmission modes (rotary corresponding, direct-driven corresponding, coupled/decoupled type), the pneumatic driving control can be realized on a multi-rotation turntable, on the direct-driven movement body such as a linear loader, on the decoupled movement body such as pallet. In this case of the rotary corresponding transmission and the direct-driven corresponding transmission, since a continuous transmission is enabled physically, it is possible to generate pneumatic pressure or vacuum (for suction) continuously within a rated range of the compressor 62*a*.

On the other hand, in the case of the coupled/decoupled type transmission, since power and data transmission can be intermitted when the movable body is moved away from the fixed portion, some consideration must be taken with respect to the method of generating pneumatic pressure or holding the generated pressure. For instance, in the case where pneumatic pressure is used for automatic clamping on the machining center jig pallet as shown in FIG. 21(B), it is impossible to supply power to the compressor driving motor when the jig pallet is being moved. For instance, when a workpiece 1 is carried by a workpiece carry loading L and then clamped to a pallet 11 (an object 93 to be controlled automatically) by the clamps 40*a*, 40*b*, . . . , pneumatic pressure can be transmitted from the fixed side clamp power source to the automatic controlled object 93 through a piping 96 and via ring couplings 97*a* 97*b*. However, after the workpiece has been clamped and the ring couplings 97*a* and 97*b* have been decoupled, in the case where the controlled object 93 is moved at a distance 98 and then the workpiece 1 is cut with a tool 94 attached to the spindle 26 of the machine tool on the basis of the machining control commands applied by an NC control console 91 of the machining center 92, since the fixed side clamp driving power source 94 is fixed, it is impossible to supply power to the machining center 92 through a piping 96. In other words, it is impossible to arrange pneumatic piping and electric wiring at the power supply point 99. Further, after the workpiece has been machined, when the workpiece 1 is unclamped from the pallet 11 and then carried out by the workpiece carry unloading (U) along the reverse route, the same problem occurs. To overcome this problem, although it is possible to consider that the pressure can be maintained by use of a check valve, in the case of pneumatic pressure, the same effect as with the case of the hydraulic control cannot be expected.

Figure 22:
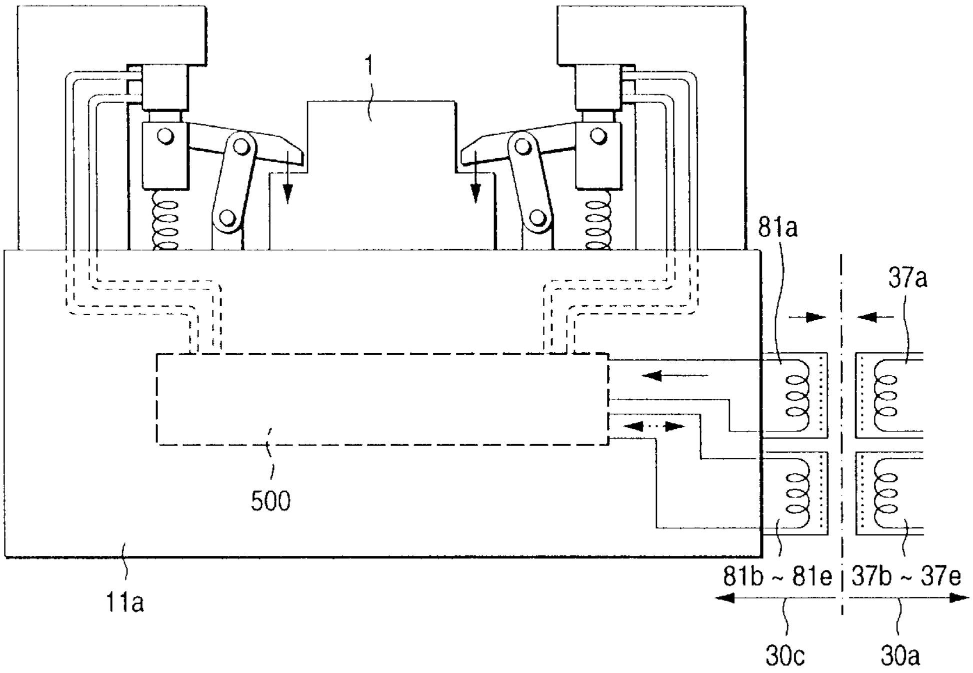
FIG. 22 (A–C) is an illustration for assistance in explaining the automatic clamping by use of the pneumatic pressure and spring force shown in FIG. 20.
Figure 22:
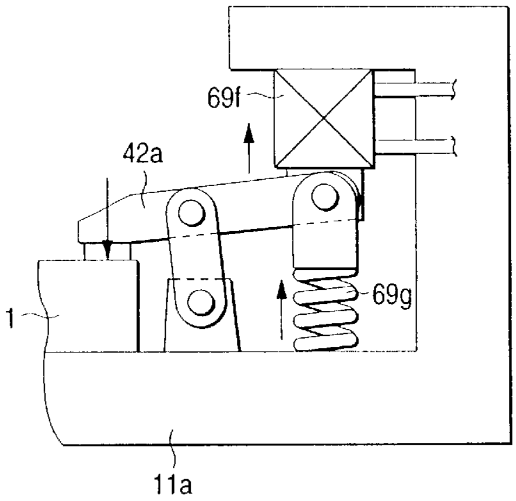
Figure 22:
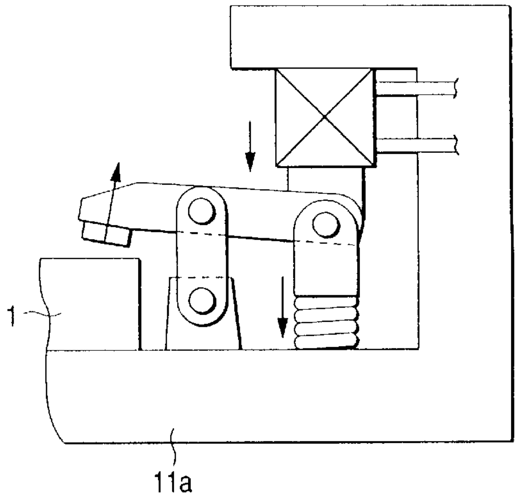

Accordingly, in the automatic clamping means on the machining center jig pallet as shown in FIG. 22, under the condition that the compressor 62*a* (See FIG. 20) is not operating (when being moved or machining), the workpiece 1 is clamped onto the pallet 11*a* by an elastic force of a spring 69*g*. That is, when the workpiece 1 is clamped (fixed) and unclamped (removed), a clamp arm 42*a* is moved up and down against an elastic force of the spring. Here, an autonomous pneumatic source circuit as shown in FIG. 20 is mounted inside the pallet 11*a*, and the coupled/decoupled type corresponding power and data transmitting apparatus as shown in FIG. 21(A) is mounted on the outer wall of the pallet 11*a*.

The procedure of the automatized clamping and unclamping in the automatic clamping construction by use of the pneumatic pressure and the reactive spring force as shown in FIG. 22 is as follows:

Here, the pallet 11*a* is assumed to be located in position for power feeding. The clamping work can be executed automatically on the basis of commands of the host controller (e.g., sequencer 90) as shown by an automatic clamping and unclamping system shown in FIG. 23.

In the fixed side transmitting apparatus 30*a*, on the bass of a clamp start signal applied by the sequencer 90, the coupled/decoupled type corresponding type power and data transmitting apparatus shown in FIGS. 21(A) and 22 is coupled by a push-out mechanism 39 using a slider (SL). After the coupling has been confirmed by a limit switch or an optical detection, the high frequency energization of the primary windings 37*a*, 37*b*, . . . 37*e* of the transmitting apparatus 30*a* is started. The high frequency power is transmitted to the pallet side by the high frequency electromagnetic induction transmission. After being converted into dc power through the rectify and smooth circuit 82 shown in FIG. 23, the dc power is supplied to the compressor driving motor 61*a*. After the compressor 62*a* has been started, the pneumatic pressure 73 begins to rise after a time has elapsed. Here, when an electromagnetic valve 77 is further turned on by data transmission from the fixed side, the cylinder 78 raises (L) the clamp arms 40*a* to 40*d* against an elastic force of the spring, respectively. Under these conditions, a workpiece 1 is fixed onto the pallet 11*a* and further aligned. Here, the electromagnetic valve 77 is driven by part of the above-mentioned rectified high frequency power. After alignment, the electromagnetic valve 77 is switched to actuate the cylinder 78 in the direction that the clamp arm 42*a* (See FIG. 22) is lowered, so that the workpiece 1 has been clamped (R) by an elastic force of the spring 69 (See FIG. 22). After the completion of the clamping has been confirmed by the sensor data on the pallet by the fixed side transmitting apparatus 30*a*, the mechanical coupling of the power and data transmission is released. As described above, since the whole automatic pallet section 77 is separated and decoupled from the fixed side apparatus 30 under the condition that the workpiece 1 is kept clamped by the spring; that is, since an autonomous movement is enabled, it is possible to carry the workpiece to a position for the machining process by use of a carrying apparatus.

On the other hand, in the case of the unclamping work, after the pallet 77 has been returned to a predetermined position after machining, the power and data transmitting apparatus is first coupled, in the same-way as with the case of the clamping work. The operation of the unclamping work is the same as the operation of the clamping operation effected prior to the alignment work of the workpiece 1.

Figure 23:
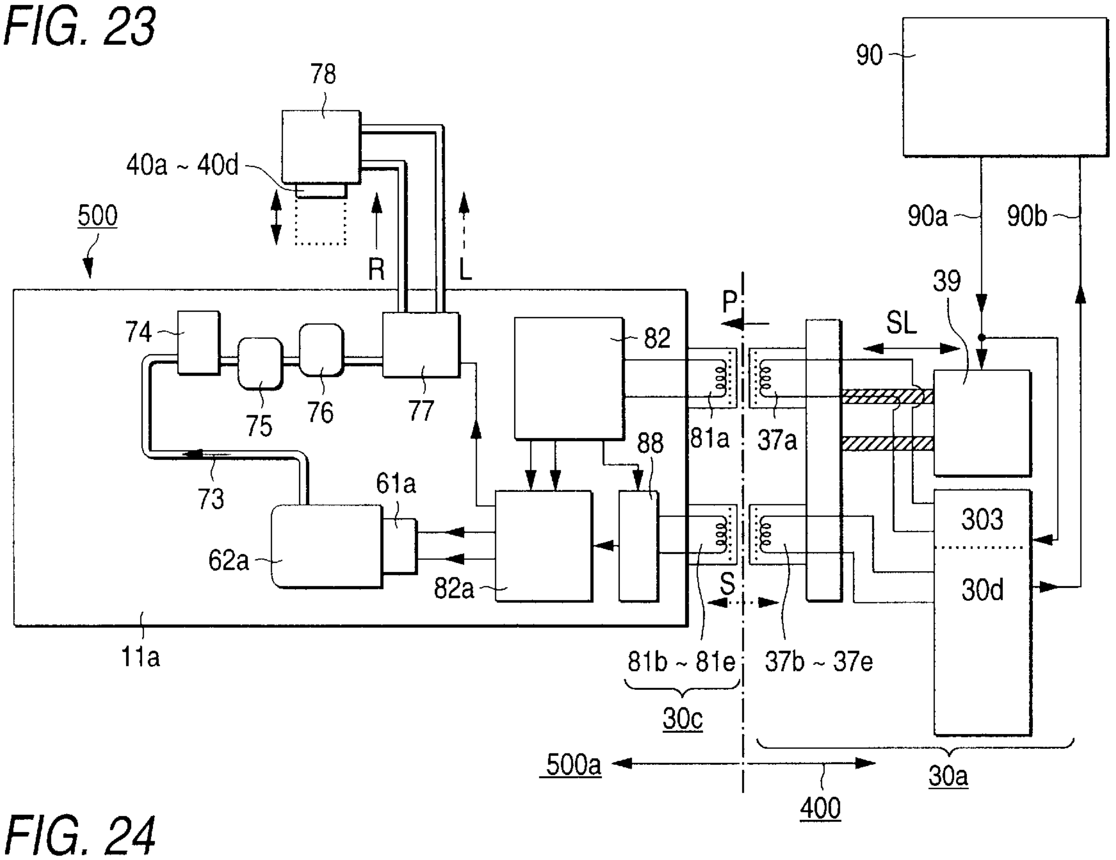
FIG. 23 is an illustration for assistance in explaining the automatic unclamping by use of the pneumatic pressure and spring force shown in FIG. 20.
Figure 24:
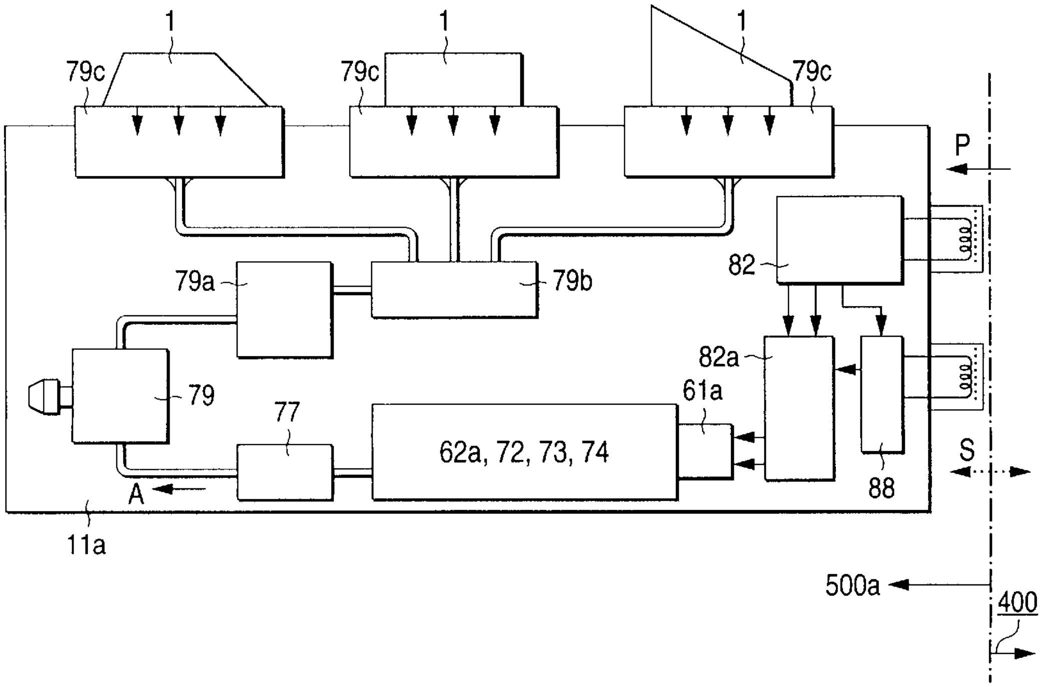
FIG. 24 is an illustration for assistance in explaining the clamping of a workpiece onto a pallet by vacuum suction in FIG. 20.

When the movement and machining time is short and thereby the pressure (or vacuum suction) can be maintained by use of a check valve, it is possible to construct a work clamping apparatus using a vacuum suction on the pallet section 11*a*, as shown in FIG. 24. Here, a plurality of vacuum suction units 79*c* connected to air branch pipes 79*b* are mounted on the upper surface of the work pallet section 11*a*. Inside the work pallet section 11*a*, an autonomous vacuum suction circuit composed of various elements 62*a*, 72, 73, and 74 for automatizing the clamping work is disposed. Therefore, pneumatic pressure A is supplied from the autonomous vacuum suction circuit to the vacuum suction units 79*c* by way of an electromagnetic valve (solenoid) 77, a vacuum generating apparatus 79, a vacuum holding apparatus (check valve) 79*a*, and the pneumatic branch pipe 79*b*. In other words, the autonomous vacuum suction circuit is roughly the same in construction as that shown in FIG. 20, except the vacuum generating section 79 and the vacuum holding apparatus (check valve) 79*a* are provided. In this construction, the procedure for automatizing the workpiece clamping and unclamping work on and from the work pallet section 11*a* is the same as with the case where the reactive force of the spring is used as shown in FIGS. 22(B) and 23.

Here, the means explained in the seventh embodiment of the present invention can be defined as an autonomous pneumatic source for actuating various devices and further various autonomous movable bodies, without installing external piping from the fixed side. Here, the various devices are a free end of a robot hand or a machine tool spindle, an end of a direct-driven loader, a pneumatic actuator, a vacuum pad, a vacuum chuck, an air blow, etc.; and the autonomous movable bodies are a workpiece clamp, a chuck, etc. mounted on the pallet.

Figure 25:
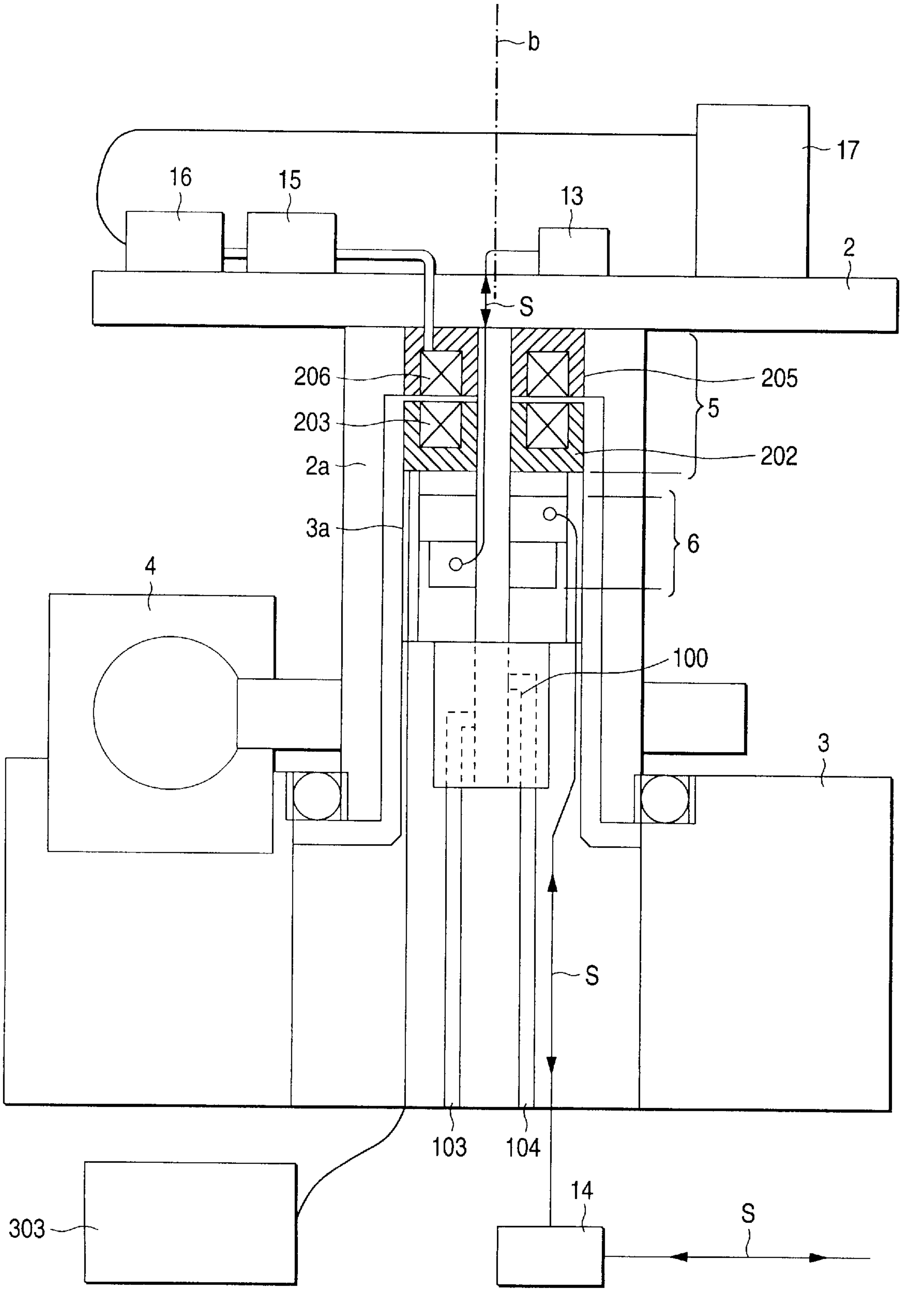
FIG. 25 is a partial side cross-sectional view showing an eighth embodiment according to the present invention, in which a multi-rotation turntable is shown.

FIG. 25 is a side, partially broken, view showing an eighth embodiment of a multi-rotation turntable, in which the first invention (See FIG. 2) according to the present invention is mounted on a turntable.

A table 2 is indexed around an axial center of a rotary shaft 3*a* under location control by a servomotor 4 or by a non-electric motor. Further, a split transformer 5 and a signal transmitting apparatus 6 are mounted coaxially with a rotary shaft 3*a*. Here, the power is transmitted on the basis of the high frequency electromagnetic induction by use of a split transformer 5. In other words, power is transmitted from the fixed portion (static portion) to a rotary portion 2*a* (table 2) by the primary and secondary coupling of two split pot cores 202 and 205 arranged on the rotation indexing axis. A primary winding 203 of the fixed side pot core 202 is connected to a high frequency inverter 303 for high frequency energization, and a secondary winding 206 of the rotary side pot core 205 is connected to a lead wire for applying voltage to the table. As described above, a magnetic path is formed in the split pot cores 202 and 205 via a narrow magnetic pole gap formed between the fixed side and rotary side pot cores 202 and 205, so that voltage can be generated in the secondary winding 206 due to the high frequency electromagnetic induction. As a result, power can be transmitted under non-contact condition. As shown in FIG. 9, the shape of the fixed side and rotary side split pot core 202 or 205 is symmetrical around an axial center b with respect to any rotation. Therefore, the power transmission characteristics will not vary according to the rotational angle or angular position. Further, the frequency of the high frequency excitation is determined as 10 KHz or higher, so that the electromagnetic field is not disturbed by the rotational speed range in which the table is rotated. The-high frequency power transmitted to the rotary side is converted into dc output P via a rectify and smooth circuit 15 or a stabilize circuit 16 (disposed where necessary) and used as a driving power for the motor or the electric load 17 mounted on the rotary section and further as the power for the control circuit and the detectors (described later). On the other hand, a digital electromagnetic or optical pulse signal S is transmitted by a signal transmitting apparatus 6 disposed coaxially with the rotary axis 3*a*. In particular, it is necessary to transmit the command signals (position, speed, torque, etc.) and feedback signals (e.g, rotary encoder pulse signals) at high speed in real time. Therefore, the pulse signals are transmitted through the optical coupling signal transmitting apparatus 6 using electricity-light transducing elements such as LED or laser as the light emitting elements and light-electricity transducing elements such as photodiodes or photo-transistors as the light receiving elements. The signal transmitting apparatus 6 is constructed in such a way that there exists no transmission directivity with respect to the rotational positions, to prevent the signals from being interrupted due to rotation or to prevent the phases and amplitudes thereof from being varied.

Figure 26:
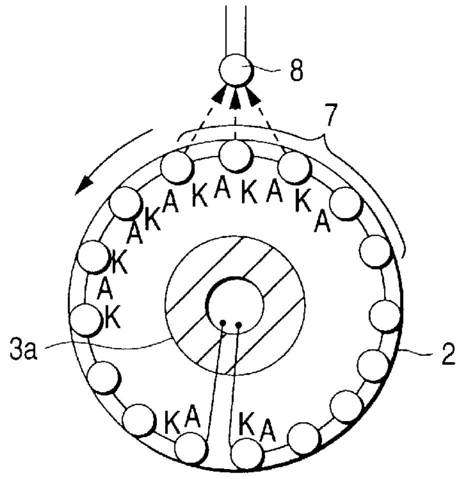
FIG. 26 shows an example of the arrangement of the light emitting element group and the light receiving element of the optical coupling signal transmitting apparatus shown in FIG. 25, in which (A) is the arrangement in which electric signals are transmitted from the table to the fixed section, and (B) is the arrangement in which electric signals are transmitted from the fixed section to the table.
Figure 26:
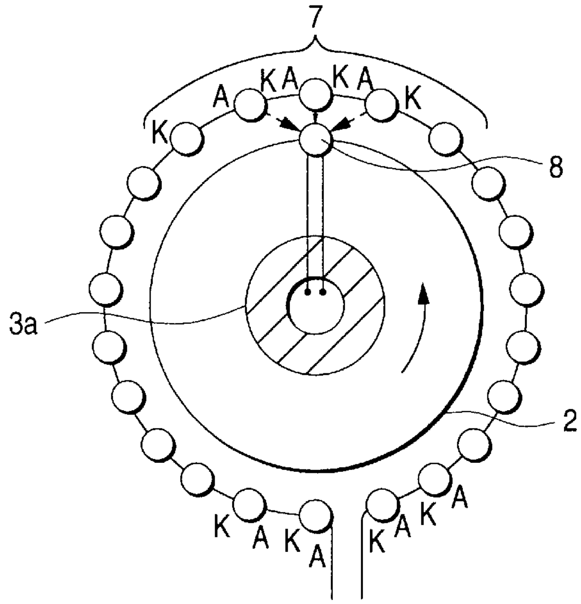

FIG. 26 shows an example of the arrangement of the light emitting element group and the light receiving element group of the optical coupling signal transmitting apparatus 6 according to the present invention, in which (A) shows the arrangement for transmitting signals from the turntable to the fixed portion and (B) shows the arrangement for transmitting the signals from the fixed portion to the turntable. In either case, the electricity-light transducing element group for transducing the electric signals to the optical signals are arranged on the transmission side, and fixed symmetrically with respect to the axial center b of the rotary shaft. On the other hand, the light-electricity transducing element group for transducing the optical signals to the electric signals are arranged on the receiving side. In the example shown in FIG. 26(A), 16 LEDs are connected in series at regular intervals in the circumferential direction in a plane perpendicular to the axis b, and in the example shown in FIG. 26(B), 22 LEDs are arranged in the same way. Both ends of the series-connected LEDs are connected to a digital signal source to be transmitted. On the other hand, the photo-diode 8 as the light-electricity transducing element is arranged on the same plane slightly radially away from the LEDs. In FIG. 26, optical signals emitted from three LEDs are received by a single photodiode 8. As the respective elements for constituting the electricity-light transducing element group 7, the elements having the similar response characteristics are selected.

Figure 27:
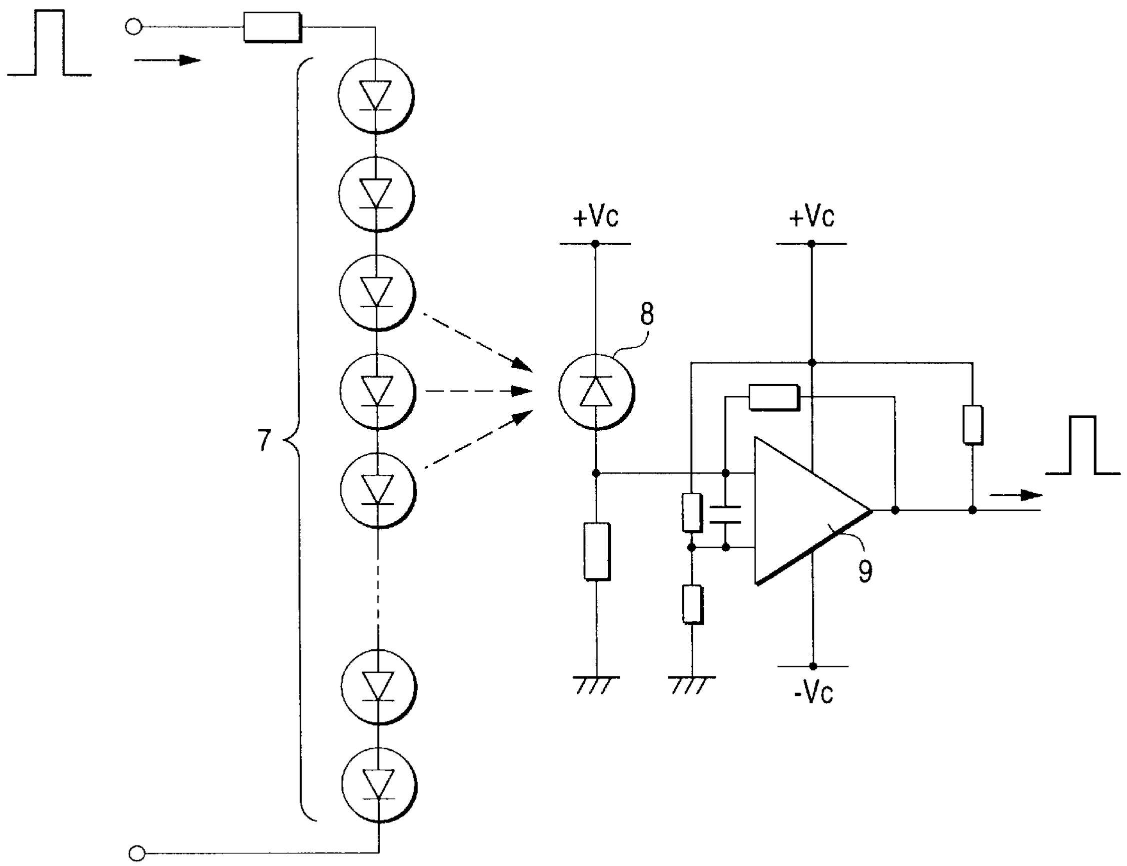
FIG. 27 is a waveform generating circuit for generating output waveform of the light receiving element.
Figure 44:
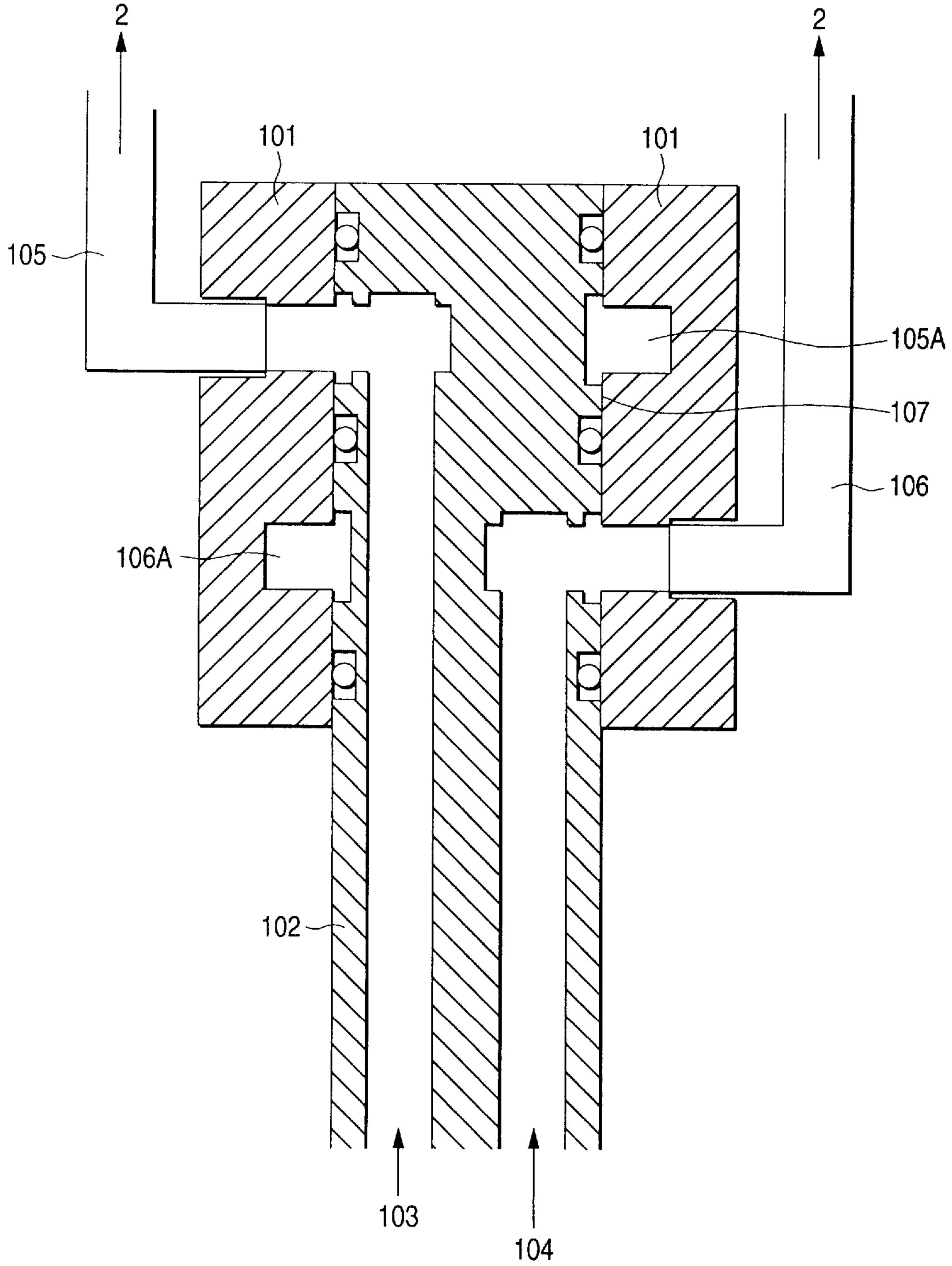
FIG. 44 PRIOR ART
FIG. 44 is a cross-sectional view showing an example of a coaxial coupling for the non-electromagnetic power transmission.
Figure 45:
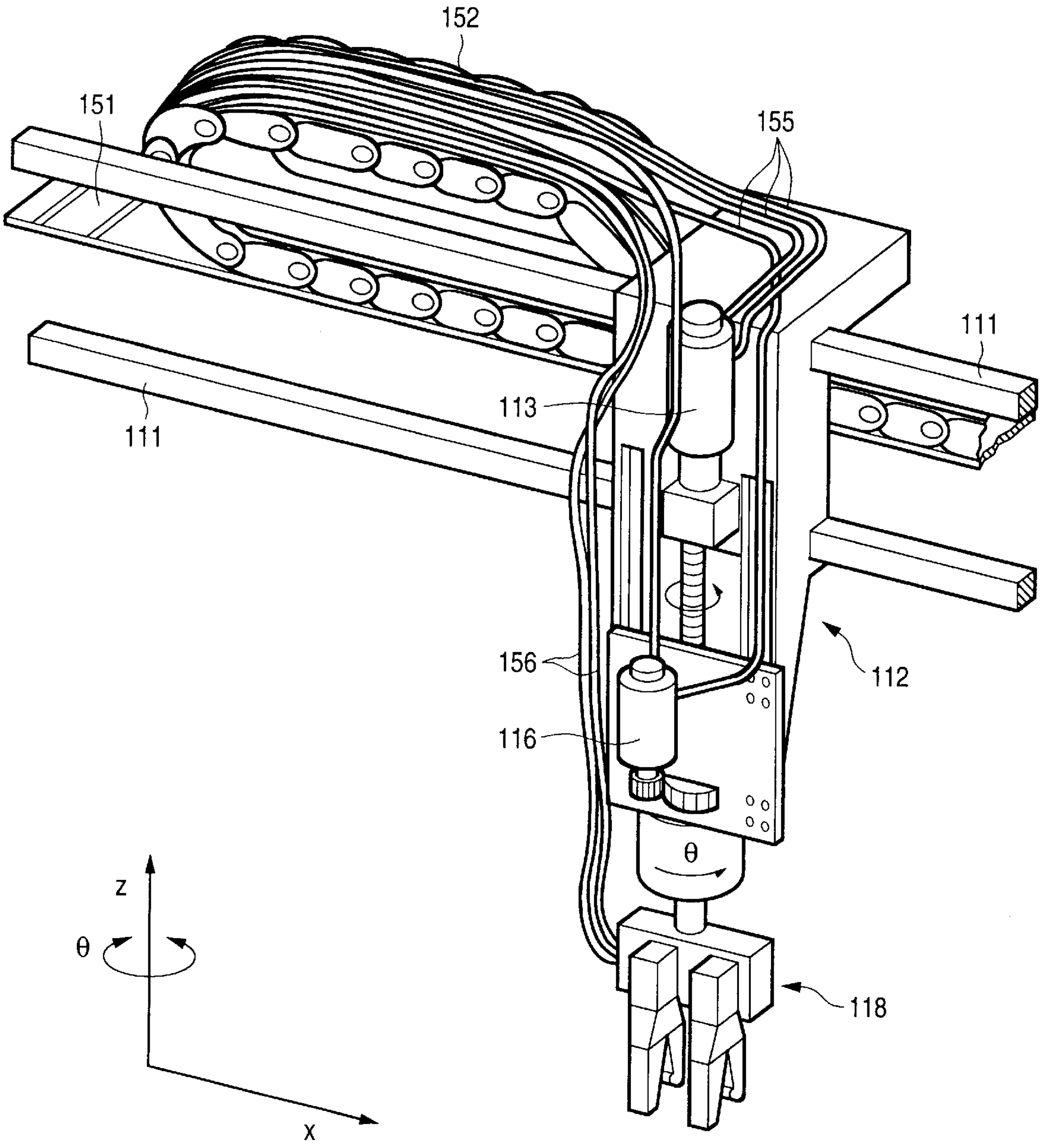
FIG. 45 PRIOR ART
FIG. 45 is a perspective view showing a second prior art example of the direct-driven type loader.

FIG. 27 is a waveform shaping circuit for forming the output pulse waveform of the optical transducing elements. The output of the photodiode 8 is inputted to a comparator 9. The comparator outputs a logical "1" signal when the output level thereof is higher than a threshold of the comparator 9, and a logical "0" when lower than the threshold thereof. Further, +Vc and −Vc denote the positive and negative dc constant power sources, respectively. As described above, the signal transmitting apparatus 6 outputs a binary signal according to the logical value of the digital signals inputted to the electricity-light transducing element on the transmit side. On the other hand, since the sequence signals such as the limit switch signals and the electro magnetic valve control signals are not required to be transmitted at high speed, being different from the control signals, it is practical to transmit these signals through a parallel-serial signal convert circuit 13 mounted on the table and a parallel-serial signal convert circuit 14 mounted on the fixed portion as shown in FIG. 25, by use of only one channel path of the signal transmitting apparatus 6 shown in FIG. 26 or FIG. 27. The power source for the parallel-serial signal convert circuit 13 mounted on the table is supplied from the stabilize circuit 16. Further, as shown in FIG. 44, the non-electromagnetic power such as hydraulic pressure or pneumatic pressure is supplied from the fixed portion 102 to the rotary portion 101 via a conventional rotary coupling 100 (See FIG. 25) arranged coaxially with the axial center b. Further, in FIG. 44, the reference numerals 103 and 104 denote two fluid paths of the fixed portion 102; 105 and 106 denote two fluid paths of the rotary portion 101; 105A and 106A denote two grooves; and 107 denotes a seal for preventing fluid from being leaked through a contact surface between the rotary portion 101 and the fixed section 102.

As described above, in the multi-rotation turntable according to the present embodiment, it is possible to supply power, control signals and non-electric power (hydraulic or pneumatic) to the multi-rotation turntable under non-contact condition, without use of any wiring and piping. In addition, all the signals obtained by detectors or switches mounted on the table can be transmitted to the fixed portion. As a result, it is possible to drive and control the multi-rotation rotary body in combination of these power and data, freely without any restriction of the rotary body. The practical examples will be described hereinbelow.

Figure 28:
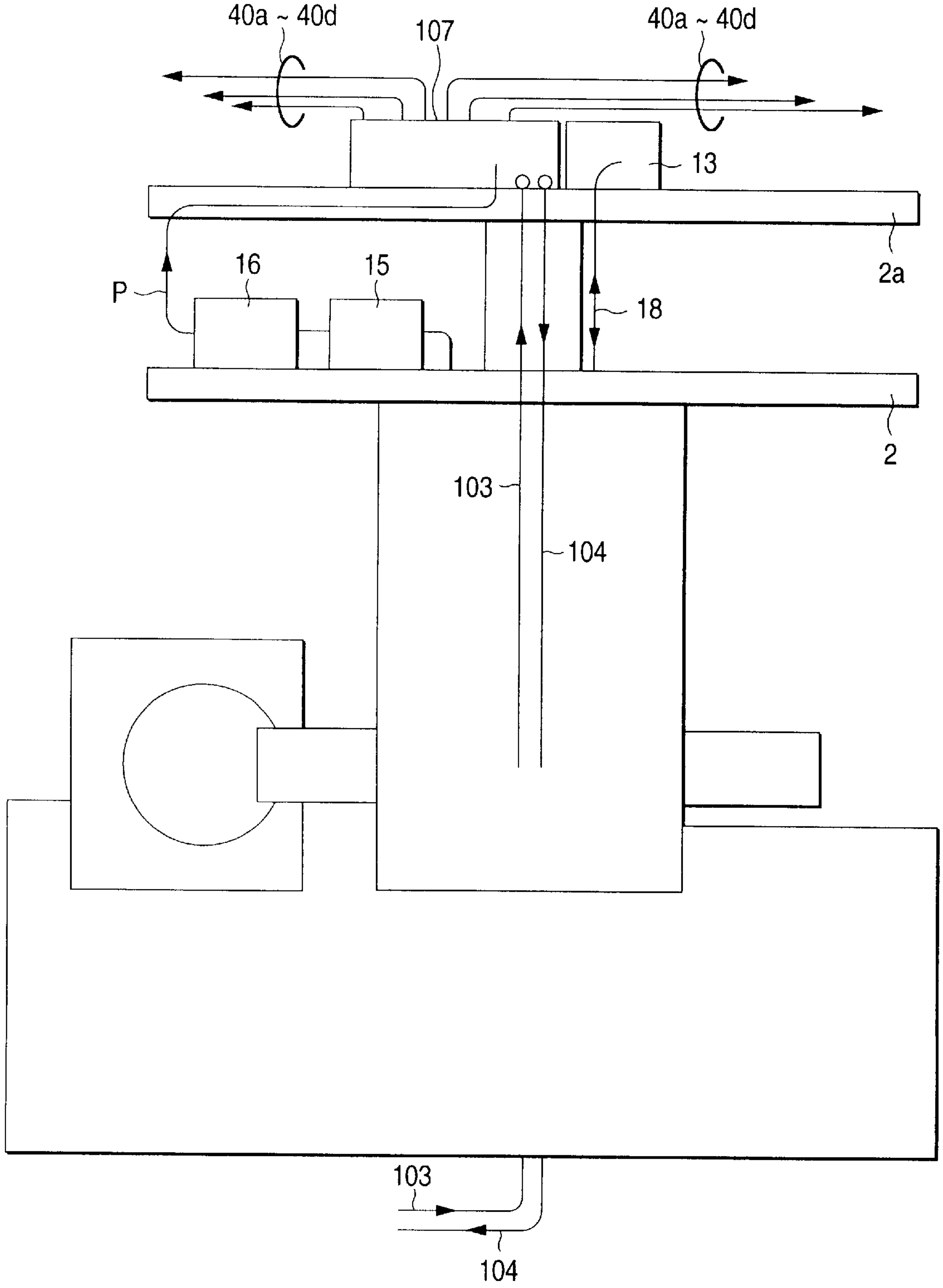
FIG. 28 is a side view showing an example for controlling a plurality of non-electromagnetic force actuators on the multi-rotation turntable.

FIG. 28 is a side view showing an example in which an electromagnetic valve is operated to control a plurality of non-electromagnetic power (hydraulic or pneumatic) actuators independently on a multi-rotation turntable, on the basis of power and data transmitted via the rotary portion (table 2) as described above. The non-electromagnetic power source fluid (e.g., air, oil) is supplied from the fixed portion to the rotary table via a rotary coupling disposed in a hollow portion of the index shaft. Conventionally, when a plurality of actuators mounted on a rotary body are controlled independently (e.g., a plurality of workpiece clamping jigs), a rotary coupling having a plurality of independent fluid paths whose number is the same or a multiple number of the actuators has been required. In the application examples according to the present invention, however, since a manifold and an electromagnetic valve (an electromagnetic manifold 107) for distributing the fluid paths are mounted on the table 2 and further the fluid paths are distributed on a function table 2_a_, it is sufficient when two fluid paths 103 and 104 at the maximum are provided as the rotary coupling. The electromagnetic valve is controlled by converting the close/open control signals transmitted from the host unit of the fixed portion from serial signals to parallel signals or vice versa through serial communications 18. The parallel sequence signals from the actuator are converted into serial signals and then feed-backed to the host unit of the fixed portion. In general, since the coupling becomes difficult to manufacture with increasing number of the fluid paths, the coupling having many fluid paths decreases in reliability and increases in cost. In contrast with this, since there exists a tendency that the electromagnetic valve is reduced in size and weight, the construction of the above-mentioned application example is effective, as far as the number of the valves is not limited by the table dimension.

Figure 29:
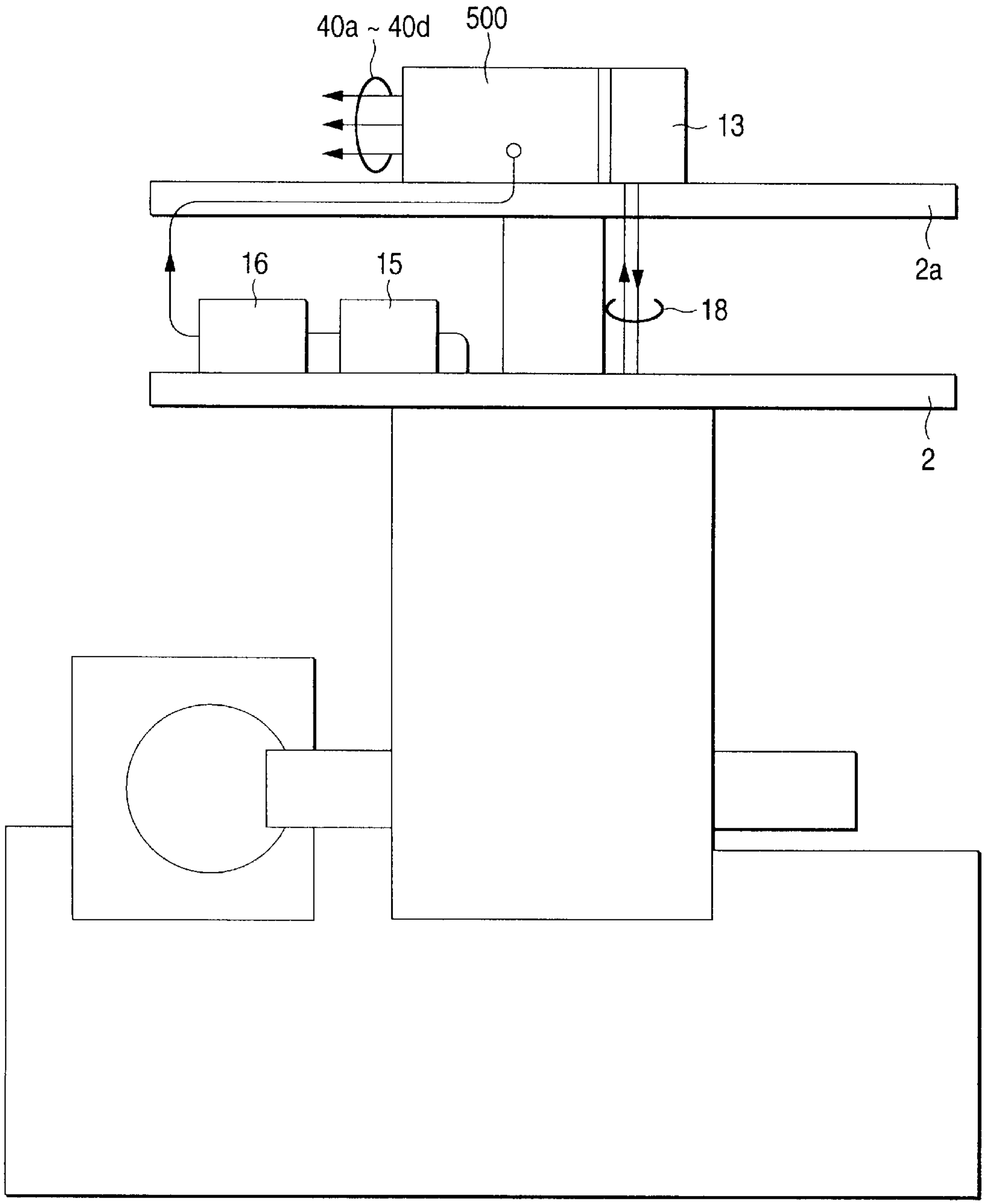
FIG. 29 is a side view showing an application example for controlling the non-electromagnetic force actuator on the multi-rotation turntable.

FIG. 29 is an application example, to which the present invention is applied to control the non-electromagnetic power on the multi-rotation turntable, in which the autonomous hydraulic source circuit 20 is mounted on the rotary body. The autonomous hydraulic source circuit 500 is a hydraulic source circuit for supplying hydraulic pressure to an external actuator, which has been already explained in detail with reference to FIG. 2 as the hydraulic source circuit 20. Therefore, although the detailed description thereof is omitted herein, in brief, power and data are transmitted and received by high frequency induction transmission under non-contact condition, without need of any hydraulic pressure apparatus and rotary couplings at the external (fixed) portion; and the open/close controls of the electromagnetic valves and the check valves are executed on the basis of the control signals transmitted through the serial-parallel convert circuits 13 and 14 (not shown) in both commanding operation and feed-backing operation.

In the above-mentioned embodiments, although the optical coupling signal transmit apparatus composed of electricity-light transducing elements and the light-electricity transducing elements is used as the data signal transmitting apparatus, an excellent result can be obtained by use of the split core type pulse transformers in the same way as with the case of the power transmission. In this case, the winding (transmitting side winding) of the transmit side pot core is connected to a pulse signal source, and the winding (receiving side winding) of the receive side pot core is connected to a pulse signal processing circuit. Further, in the above-mentioned embodiments, although only a single light-electricity transducing element is used for the optical coupling signal transmitting apparatus, it is of course possible to use a plurality of light-electricity transducing elements according to the object of the signal processing. Further, when a plurality of independent optical coupling signal transmitting apparatus are arranged, it is of course necessary to shut off the light of each signal transmitting apparatus from each other, where necessary.

Figure 30:
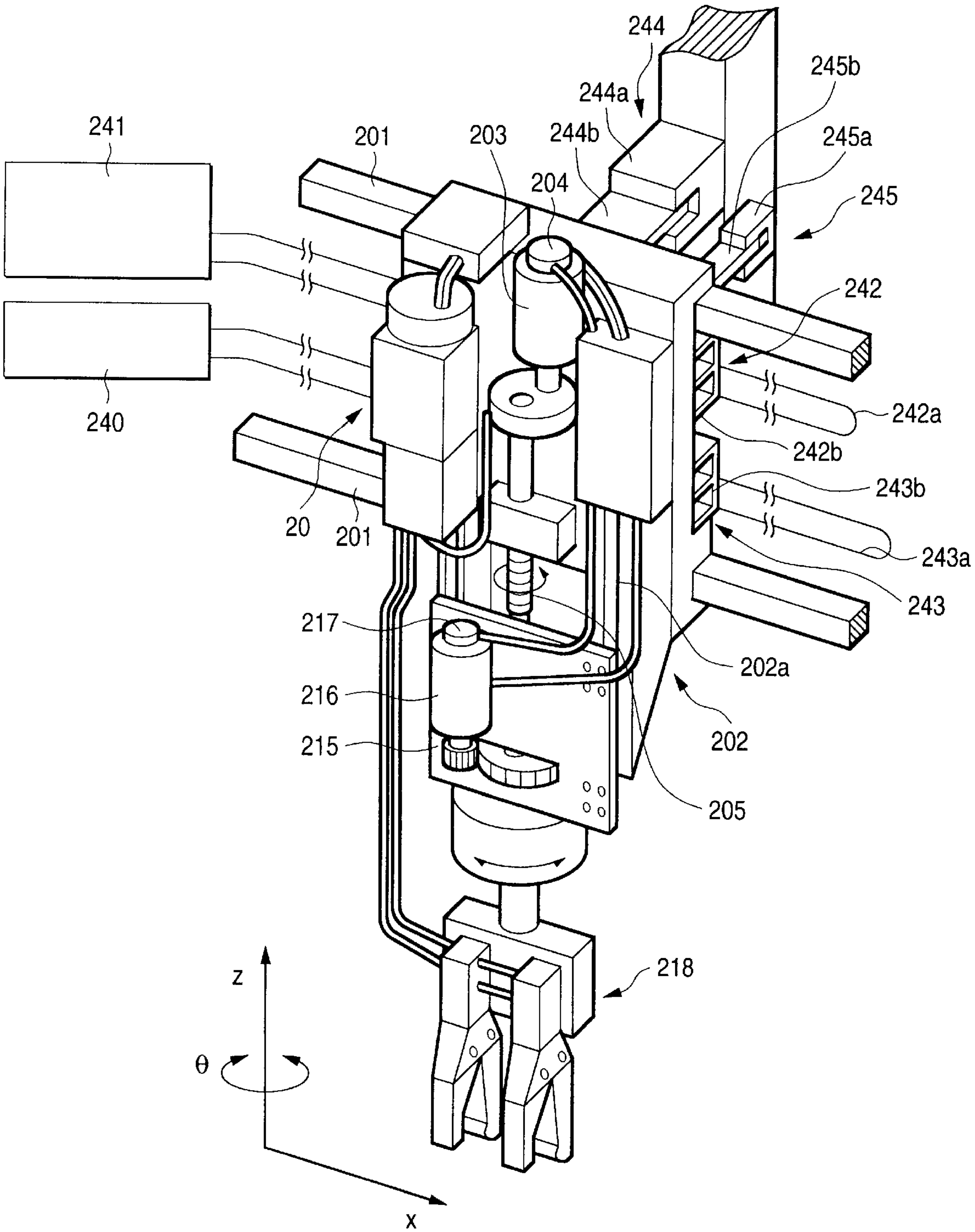
FIG. 30 is a diagrammatical perspective view showing a ninth embodiment according to the present invention, in which a direct-driven type loader is shown.

Further, FIG. 30 is a diagrammatical perspective view showing a ninth embodiment according to the present invention, in which the first embodiment (shown in FIG. 2) of the present invention is applied to the direct-driven type loader.

As shown in FIG. 30, a movable unit 202 used as the body of the direct-driven type loader is slidably supported by two travel rails 201 arranged in parallel to each other and extending in the x-axis direction, and provided with a ball nut (not shown) engaged with a ball screw 205 rotated by a z-axis servomotor 203. Therefore, when the z-axis servomotor 203 is driven, a gripper support member 215 is moved reciprocatingly in the z-axis direction being guided by each guide groove 202_a_. Further, a θ-rotation servomotor 216 is fixed to the gripper support member 215, and further a gripper 218 driven by hydraulic power rotatably in the θ direction is provided for the gripper support member 215. The gripper 218 and the θ-rotation servomotor 216 are linked with each other via a reduction gear. Therefore, when the θ-rotation servomotor 216 is driven, the gripper 218 is rotate in the θ direction. Further, the hydraulic pressure supplied to the gripper 218 is supplied from the hydraulic source 202 provided on the movable unit 202 through a hydraulic piping. As understood from the above-mentioned description, the z-axis servomotor 203 and the θ-rotation servomotor 216 constitute gripper moving means.

Figure 31:
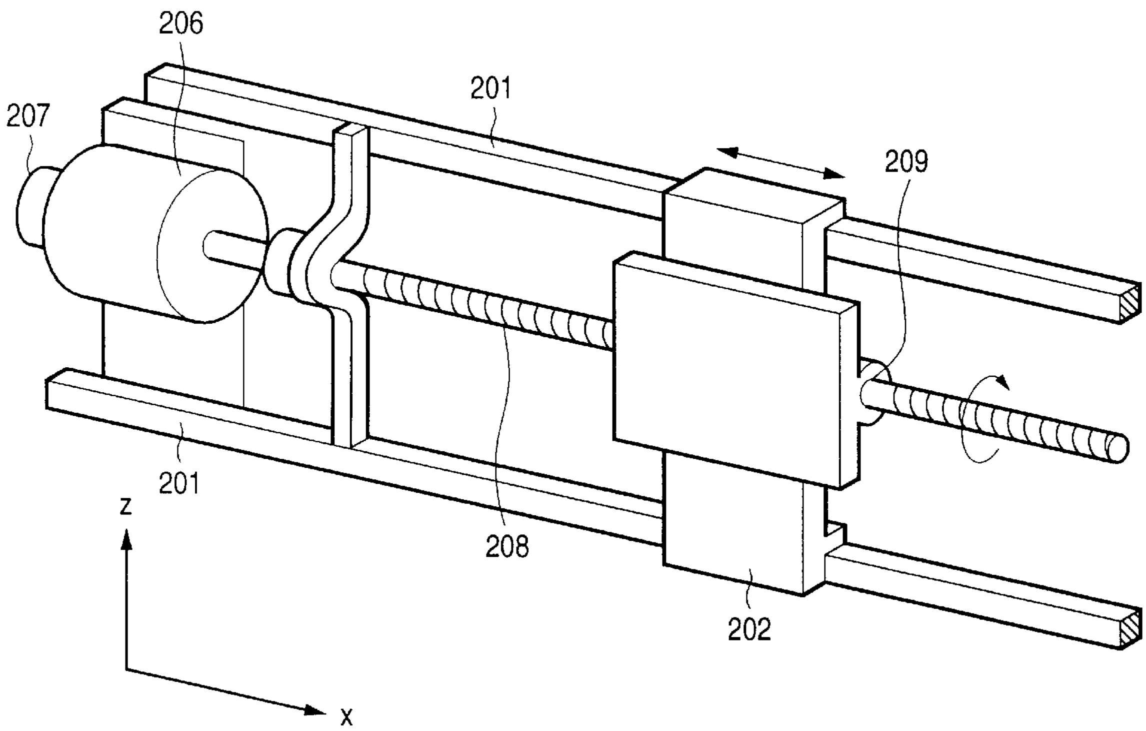
FIG. 31 shows an x-axis movement mechanism of the movable unit of the direct-driven type loader shown in FIG. 30, in which (A) is a perspective view showing a ball-screw mechanism, and (B) is a perspective view showing a lack-pinion mechanism.
Figure 31:
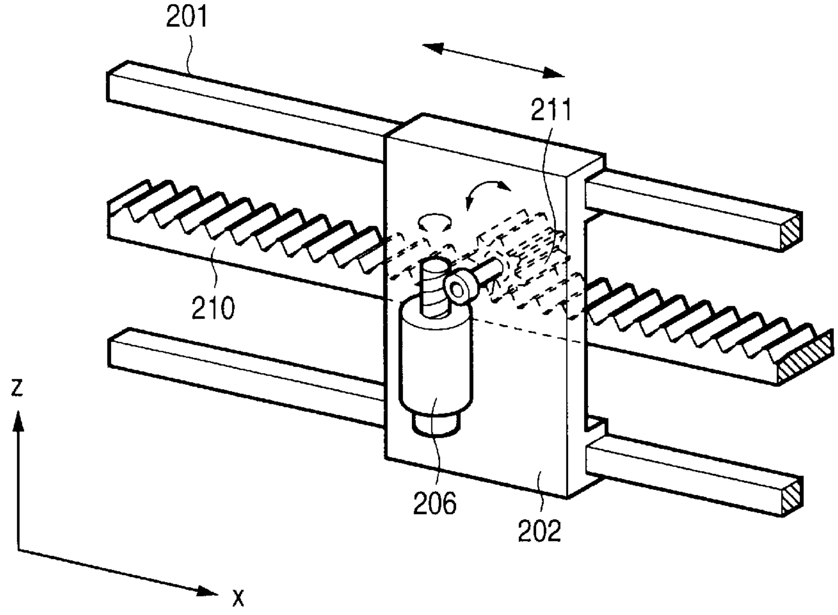

Here, the x-axis movement mechanism will be explained hereinbelow with reference to FIG. 31. The x-axis movement mechanism moves the movable unit by rotating the x-axis servomotor (as the moving unit moving means). FIG. 31 shows two examples of the x-axis movement mechanism, in which a ball-screw mechanism and a lack-pinion mechanism are shown. Further, in FIG. 31, the movable unit is simplified for brevity.

First, in the ball screw mechanism, as shown in FIG. 31(A), a ball screw 208 is disposed in parallel to the two travel rails 201, and an x-axis servomotor 206 fixed between the two travel rails 201 is linked with one end of the ball screw 208. On the other hand, a ball nut 209 screwed with the ball screw 208 is fixed to the movable unit 202. Therefore, when the x-axis servomotor 206 is driven, the movable unit 202 is moved in the x-axis direction. Further, in the lack-pinion mechanism shown in FIG. 31(B), a rack 210 is fixed in parallel to the travel rails 201, and a pinion gear 211 in mesh with the lack 210 and an x-axis servomotor 206 for rotating this pinion gear 211 are mounted on the movable unit 202. Therefore, when the x-axis motor 206 is driven to rotate the pinion gear 211, the movable unit 202 is moved in the x-axis direction. In this embodiment, this lack-pinion mechanism is adopted.

The power is supplied and the data signals are transmitted to the above-mentioned respective servomotors 203, 206 and 216 externally from the movable unit 202, under non-contact condition, without being connected to the movable unit 202. The means will be explained hereinbelow with reference to FIGS. 30 to 32.

Figure 32:
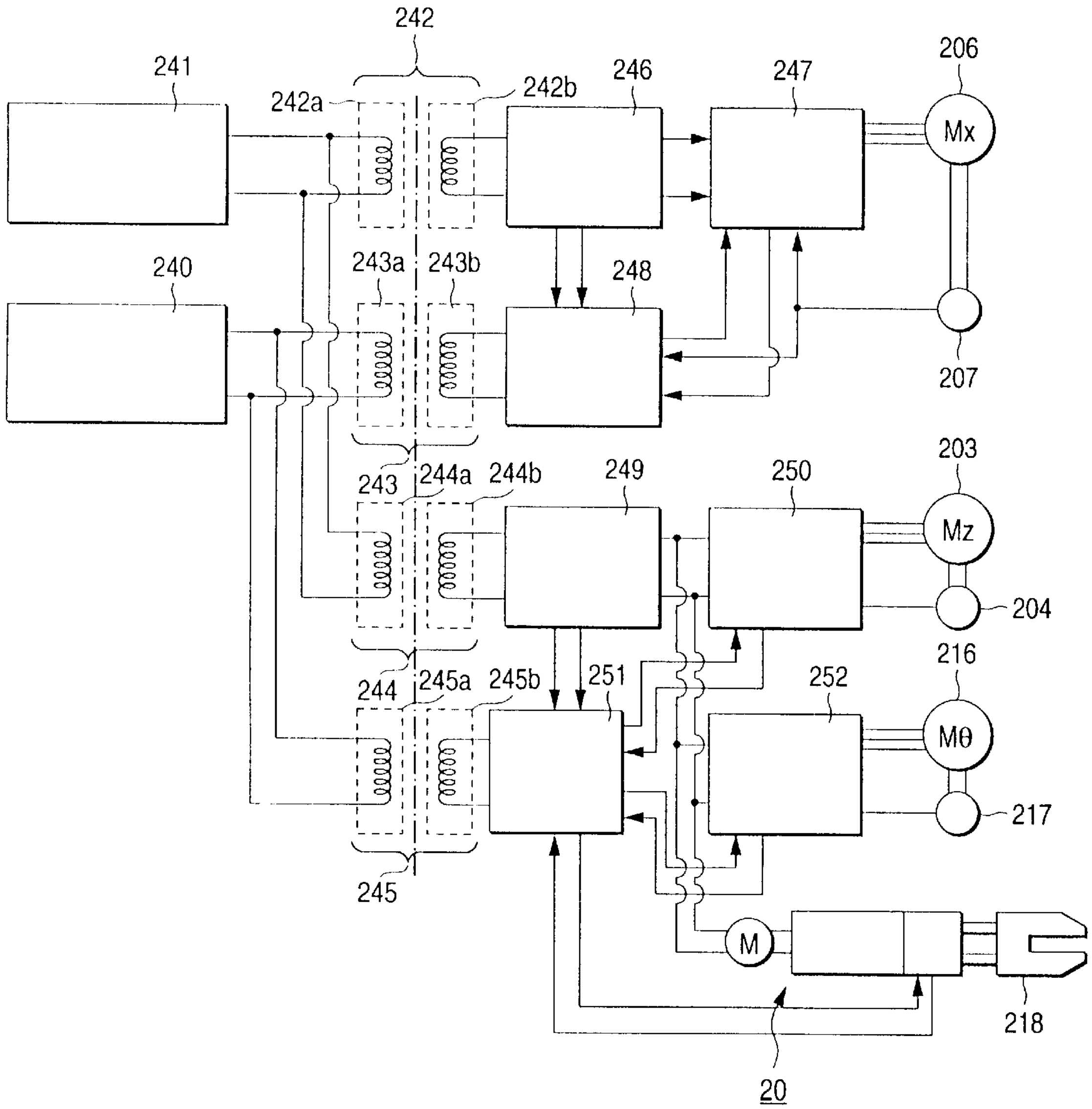
FIG. 32 is an electric circuit diagram showing the direct-driven type loader shown in FIG. 30.
Figure 33:
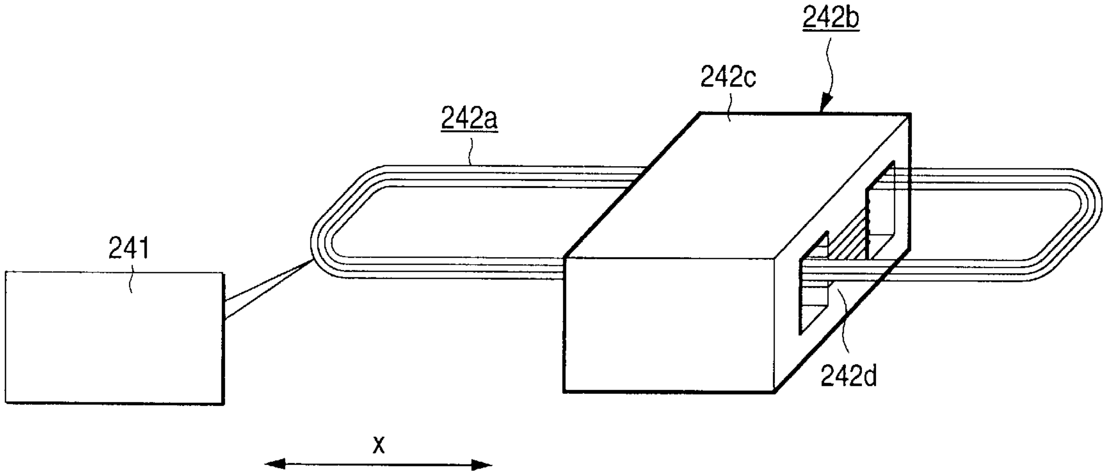
FIG. 33 is a perspective view showing a first power feeding apparatus of the direct-driven type loader shown in FIG. 30.

The power is supplied to the x-axis servomotor 206 from a high frequency inverter 241 (as the high frequency power source) through a first power feeding apparatus 242. The first power feeding apparatus 242, as shown in FIG. 33, is composed of a primary side transmit section 242*a* having a winding wound into a loop shape in the horizontal direction (x-axis direction) and connected to the high frequency inverter 241, and a secondary side transmit section 242*b* composed of a core 242*c* fixed to a movable unit (See FIG. 30) and loosely fitted to the primary side transmit section 242*a* and a winding 242*d* wound around the core 242*c* so as to be opposed to the primary side transmit section (winding) 242*a*. Therefore, when a high frequency voltage generated by the high frequency inverter 241 is applied to the primary side transmit section 242*a* of the first power feeding apparatus 242 (See FIG. 32), another high frequency voltage is generated by the secondary side transmit winding 242*d* due to electromagnetic coupling, in accordance with a winding ratio to the winding 242*d* of the secondary side transmit section 242*b*. That is, the high frequency voltage generated by the high frequency inverter 241 is supplied to the secondary side transmit winding 242*d* by the high frequency electromagnetic induction under non-contact condition. Further, as shown in FIG. 32 (in which the electric circuit of the direct-driven type loader is shown), the high frequency voltage supplied to the secondary side transmit section 242*b* is rectified and further smoothed by a rectify and smooth circuit 246, and after that supplied to the x-axis servomotor 206 via an x-axis controller 247 (as the movable unit means). Part of the dc voltage generated by the rectify and smooth circuit 246 is supplied to a data transmit circuit 248 for controlling the driving operation of the x-axis servomotor 206.

Further, data for controlling the driving operation of the x-axis servomotor 206 is transmitted to a data transmitting apparatus 243 8 (as the control data signal generating means). The first data transmitting apparatus 243 is composed of a primary side transmit section 242*a* and a secondary side transmit section 243*b* in the same way as with the case of the first power feeding apparatus 242. On the same principle as the power transmission of the above-mentioned first power feeding apparatus 242, data signals generated by a data transmit section 240 are transmitted to a data transmit circuit 248 by the high frequency induction under non-contact condition. The data transmit circuit 248 transmits signals to the x-axis servomotor 206 on the basis of the data signals transmitted from the data transmit section 240 through the first data transmit apparatus 243 under non-contact condition, and the signals applied by an encoder 207 for detecting the rotation of the x-axis servomotor 206, to drive the x-axis servomotor 206.

Figure 34:
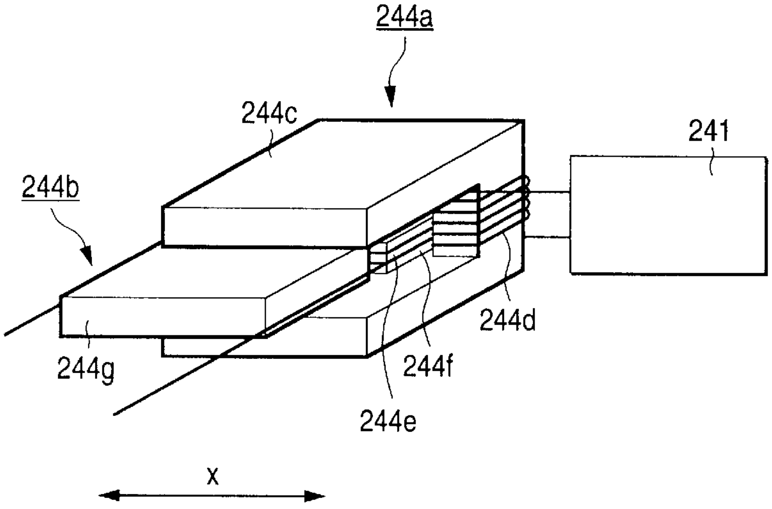
FIG. 34 is a perspective view showing a second power feeding apparatus of the direct-driven type loader shown in FIG. 30.

On the other hand, with respect to the hydraulic source circuit 20 for driving the θ-rotation servomotor 216 and the gripper 218, power is supplied from a second power feeding apparatus 244 under non-contact condition, in the same way as with the case of the x-axis servomotor 206. In the case of the z-axis servomotor 203, the θ-rotation servomotor 206, and the gripper 218, however, since these motors will not activated when the movable unit 202 is being moved, power is supplied only at the work point of the gripper 218 along the x-axis direction. Therefore, the primary side transmit section 244*a* of a second power feeding apparatus 244 is fixed at a predetermined position corresponding to the work point of the gripper 218, and the secondary side transmit section 244*b* of the second power feeding apparatus 244 is fixed to the moving unit 202. As shown in FIG. 34, the second power feeding apparatus 244 is constructed in such a way that a secondary side transmit section 244*b* composed of a core 244e and the winding 244*f* can be passed along the x-axis direction at such a position as to be opposed to a winding 244*d* of the primary side transmit section 244*a* (composed of a core 244*c* and the winding 244*d* connected to the high frequency inverter 241). In other words, as shown in FIG. 34, a support member 244*g* formed of non-magnetic substance is fixed at the front side (on this side) surface of the high frequency magnetic body core 244*e* having the secondary winding 244*f*, and the secondary side transmit section 244*b* is moved in the x-axis direction being supported by this support member 244*g*.

Power is supplied from the secondary side transmit section 244*a* to the secondary side transmit section 244*b*, when the winding 244*d* of the primary side transmit section 244*a* and the winding 244*f* of the secondary side transmit section 244*b* are opposed to each other, so that the high frequency voltage generated by the high frequency inverter 241 is supplied to the secondary side transmit section 244*b* by the high frequency electromagnetic induction under non-contact condition, in the same way as with the case of the fist power feeding apparatus 242 (See FIG. 32). Further, after having been rectified and smoothed by a rectify and smooth circuit 249, the high frequency voltage supplied to the secondary side transmit section 244*b* is supplied to the z-axis servomotor 203 via a z-axis controller 250 or to the θ-rotation servomotor 216, or to the hydraulic source circuit 20. Part of the dc voltage generated by the rectify and smooth circuit 249 is supplied to a data transmit circuit 251 for controlling the operation of the z-axis servomotor 203, the θ-rotation servomotor 216 and the hydraulic source circuit 20. As understood by the above-mentioned description, the z-axis controller 205, and the θ controller 225 constitute the gripper control means.

In the same way as with the case of the power supply, data for controlling the operation of the z-axis servomotor 203, the θ-rotation servomotor 216 and the hydraulic source circuit 20 are transmitted at the wok point of the gripper 218. Therefore, the data transmission to the z-axis servomotor 203, the θ-rotation servomotor 216 and the hydraulic source circuit 20 can be fixed at a predetermined position at which the gripper 218 of the primary side transmit section 245*a* corresponds to the work point of the gripper 218 in the same way as with the case of the second power feeding apparatus 244, and further the secondary side transmit section 245*b* transmits the data signals from the data signal transmit section 240 via the second data transmitting apparatus 245 fixed to the moving unit under non-contact condition.

A secondary data transmitting apparatus 245 is the same in construction as the second power feeding apparatus 244, except that a primary side transmit section 245*a* is connected to the data transmit section 240 and a secondary side transmit section 245*b* is connected to a data transmit section 251, so that the detailed description thereof is omitted herein.

The data transmit circuit 251 transmits signals to the z-axis servomotor 203 to drive the z-axis servomotor 203, on the basis of the data signals transmitted from the data transmit section 240 through the second data transmit apparatus 245 under non-contact condition and the signals applied by the encoder 204 for detecting the rotation of the z-axis servomotor 203. In the same way, the θ-rotation servomotor 216 is driven and further the hydraulic source circuit 20 is activated on the basis of the data signals transmitted from the data transmit section 240 and the signals applied by the encoder 217 for detecting the rotation of the θ-rotation servomotor 216.

Here, the hydraulic source circuit 20 is explained with reference to FIG. 35. In the hydraulic source circuit 20, oil in the hydraulic tank 222 is sucked up by the hydraulic pump 226 driven by the hydraulic motor 221 to generate the hydraulic pressure. Further, the workpiece 1 is clamped or unclamped by moving a rod 218*b* of a hydraulic cylinder 218*a* for the gripper 218 in the forward and rearward directions by the hydraulic pressure. Further, a solenoid valve 223 is provided to switch the moving direction of the rod 218*b*. As the hydraulic tank 222, a volume variable type (or liquid level released type 9) is used to follow the volume change caused by the movement of the rod 218*b*. Further, a check valve 224 and a forward pressure switch 225 for detecting an end of the forward movement of the rod 218*b* are provided in the hydraulic piping communicating between a solenoid valve 223 and a rod forward side hydraulic chamber (oil chamber on the right side in FIG. 35) of a hydraulic cylinder 218*a*. On the other hand, a rearward pressure switch 228 for detecting an end of the rearward movement of the rod 218*b* is provided in the hydraulic piping communicating between the solenoid valve 223 and a rod rearward side hydraulic chamber (oil chamber on the left side in FIG. 35) of a hydraulic cylinder 218*a*. Further, in the hydraulic piping communicating between a hydraulic pump 226 and the solenoid valve 223, a relief valve 227 is provided. Here, the forward pressure switch 226 and the rearward pressure switch 228 can be substituted for a proximity switch (e.g., micro-switch), respectively.

The data signals transmitted from the data transmit section 240 through the second data transmit apparatus 245 under non-contact condition are inputted to the data transmit circuit 251. On the basis of the transmitted data signals, the data transmit circuit 251 controls the solenoid valve 223 and feedbacks the respective pressure switch (225, 228) confirm signals to the data transmit section 240 via the second data transmitting apparatus 245. When the number of the data signals is small, it is possible to transmit the signals by use of high frequency electromagnetic couplings (whose number is the same as the number of the signals) in parallel communication, without using the serial communication by the data transmit circuit 251. On the other hand, the high frequency voltage supplied by the high frequency inverter 241 through the second power feeding apparatus 244 under non-contact condition is rectified and smoothed by a rectify and smooth circuit 249 into dc voltage, and then supplied to the hydraulic pump driving motor 221.

The operation of the direct-driven type loader will be described hereinbelow with reference to FIGS. 30 and 32.

First, the high frequency voltage generated by the high frequency inverter 241 is supplied to the x-axis servomotor

206 via the first power feeding apparatus 242 under non-contact condition, to move the movable unit 202 in the x-axis direction at such a predetermined position corresponding to the work point of the gripper 128, that is, such a position that the secondary side transmit section 244*b* of the second power feeding apparatus 244 is opposed to the primary side transmit section 244*a* and further the secondary side transmit section 245*b* of the second data transmitting apparatus 245 is opposed to the primary side transmit section 245*a*. At this time, the rotation angle of the x-axis servomotor 206 is controlled by the data transmit circuit 248 and the x-axis controller 247 on the basis of the data signals transmitted by the data transmit section 240 and the outputs of the encoder 207 for detecting the rotation of the x-axis servomotor 206.

When the movable unit 202 reaches a predetermined position, the high frequency voltage generated by the high frequency inverter 241 is supplied to the z-axis servomotor 203 and the θ-rotation servomotor 216 through the second power feeding apparatus 244 under non-contact condition, and further the data signals applied by the data transmit section 240 are transmitted to the respective servomotors 206 and 216 under non-contact condition to control the rotation angles of the respective servomotors 206 and 216, so that the gripper 218 can be located at the predetermined position. After the griper 218 has been located, the high frequency voltage generated by the high frequency inverter 241 is supplied to the hydraulic circuit 20 through the second power feeding apparatus 244 under non-contact condition, and further the data signals of the data transmit section 240 are transmitted to the hydraulic source circuit 20 through the second data transmitting apparatus 245 under non-contact condition, to drive the gripper 218 for gripping the workpiece 1.

Figure 35:
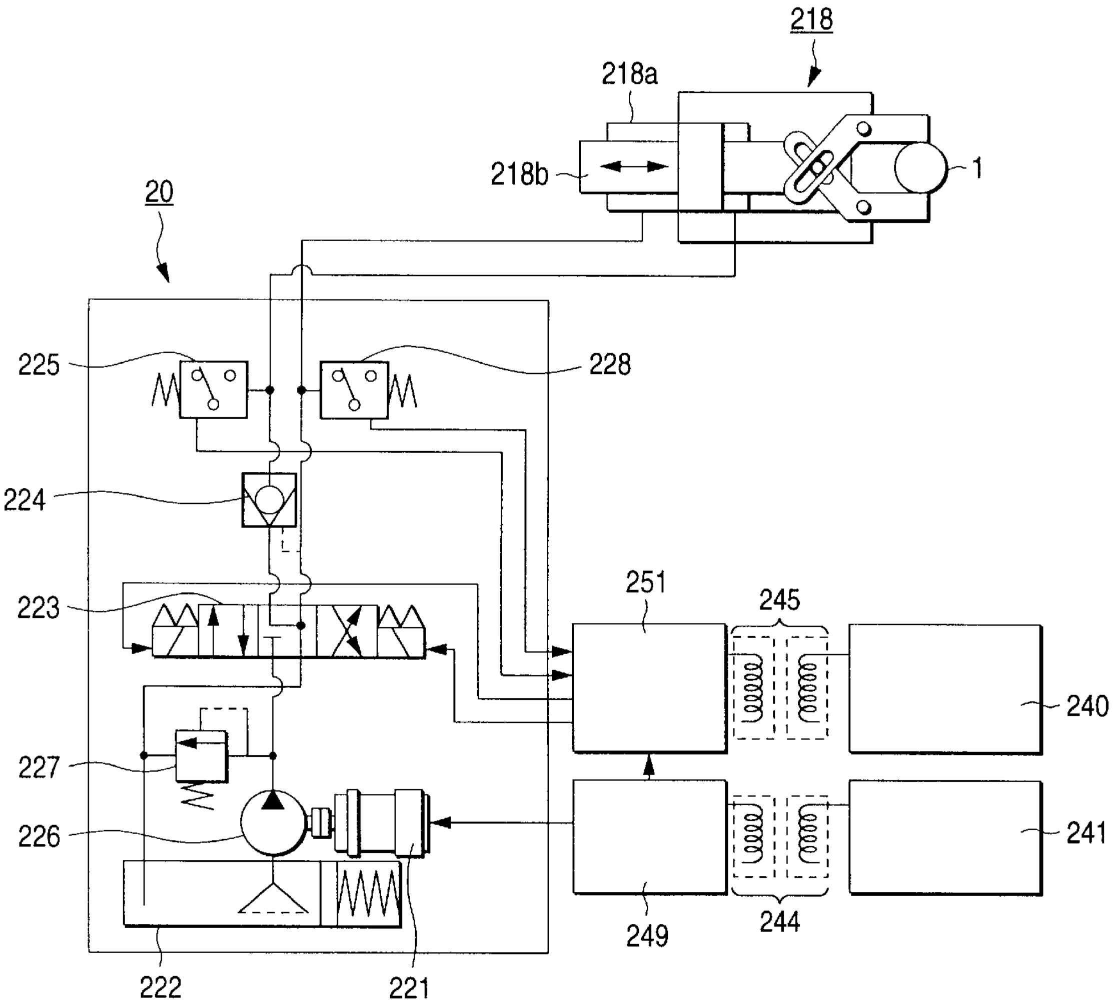
FIG. 35 is a block diagram showing the hydraulic source circuit of direct-driven type loader shown in FIG. 30.

To grip the workpiece 1, as shown in FIG. 35, the high frequency voltage generated by the high frequency inverter 241 is supplied to the rectify and smooth circuit 249 through the second power feeding apparatus 244 under non-contact condition to convert the high frequency voltage into dc voltage, so that the hydraulic pump driving motor 221 is driven. When the hydraulic pump driving motor 221 is driven, the oil in the hydraulic tank 222 is sucked up by the hydraulic pump 226 to generate a hydraulic pressure. After that, since the rod rearward side valve of the solenoid valve 223 is turned on, the signal is transmitted from the data transmit section 240 to the data transmit section 251 through the second data transmitting apparatus 245 under non-contact condition. Therefore, the pressurized oil is supplied to the rod forward side hydraulic chamber of the hydraulic cylinder 218*a*, so that the rod 218*b* moves forward to enable the gripper 218 to grip the workpiece 1. When the rod 218*b* reaches the forward end, the forward pressure switch 225 is turned on, so that the confirm signal is generated. This confirm signal is feed-backed to the data transmit section 240.

After the movement of the rod 218*a* to the forward end has been confirmed, a signal to turn off the solenoid valve 223 is transmitted from the data transmit section 240 to the data transmit section 251. Therefore, although the solenoid valve 224 is turned off, the hydraulic pressure in the hydraulic tank 218*a* can be held by the operation of the check valve 224. Therefore, even if the movable unit 202 is moved under the condition that the workpiece 1 is kept gripped by the gripper 218, the gripper 218 keeps gripping the workpiece 1. Further, the hydraulic pressure generated at this stage can be utilized as the braking force for braking the z-axis servomotor 203 (See FIG. 30) and θ-rotation servomotor (See FIG. 30) both used for location.

On the other hand, when the workpiece 1 is required to be released from gripping, the movable unit 202 is moved to the predetermined position, the hydraulic pump driving motor 221 is driven again. Then, the rod rearward side valve of the solenoid valve 223 is turned on, to move the rod 218*b* of the hydraulic cylinder 218*a* rearward. The rearward movement end of the rod 218*b* can be confirmed by transmitting the signal of the rearward pressure switch 228 from the data transmit circuit 251 to the data transmit section 240 through the second data transmit apparatus 245. The moment this signal is transmitted to the data transmit section 240, the solenoid valve 223 is turned off. After that, the hydraulic pump driving motor 223 is stopped to release the gripping of the workpiece 1.

As described above, since the hydraulic source circuit 20 is mounted on the movable unit 202, the hydraulic piping is required only on the movable unit 202. In addition, since the power is supplied and control data are applied under non-contact condition to the respective servomotors 203, 206 and 216 and the hydraulic source circuit 20 by the respective power feeding apparatus 242 and 244 and the respective data transmitting apparatus 243 and 245, it is possible to eliminate the electric wiring for connecting the high frequency inverter 241 and the data transmit section 240 to the respective servomotors 203, 206 and 216 and the hydraulic source circuit 20. As a result, it is unnecessary to connect the movable unit 202 to the external elements or units through the hydraulic piping and the electric wiring, so that a large-scale installation for supporting these hydraulic piping and electric wiring is not required. Further, even when the movable unit 202 is moved, since the hydraulic piping and the electric wiring are not bent, it is possible to prevent the hydraulic piping and the electric wiring from being damaged due to fatigue, thus improving the reliability of the machine.

In particular, when the x-axis movement mechanism is constructed by the lack-pinion mechanism as shown in FIG. 31(B), it is possible to provide a plurality of movable units on the same travel rails 201 and to control these movable units in cooperation in the range where the movable units do not interfere with each other.

Figure 36:
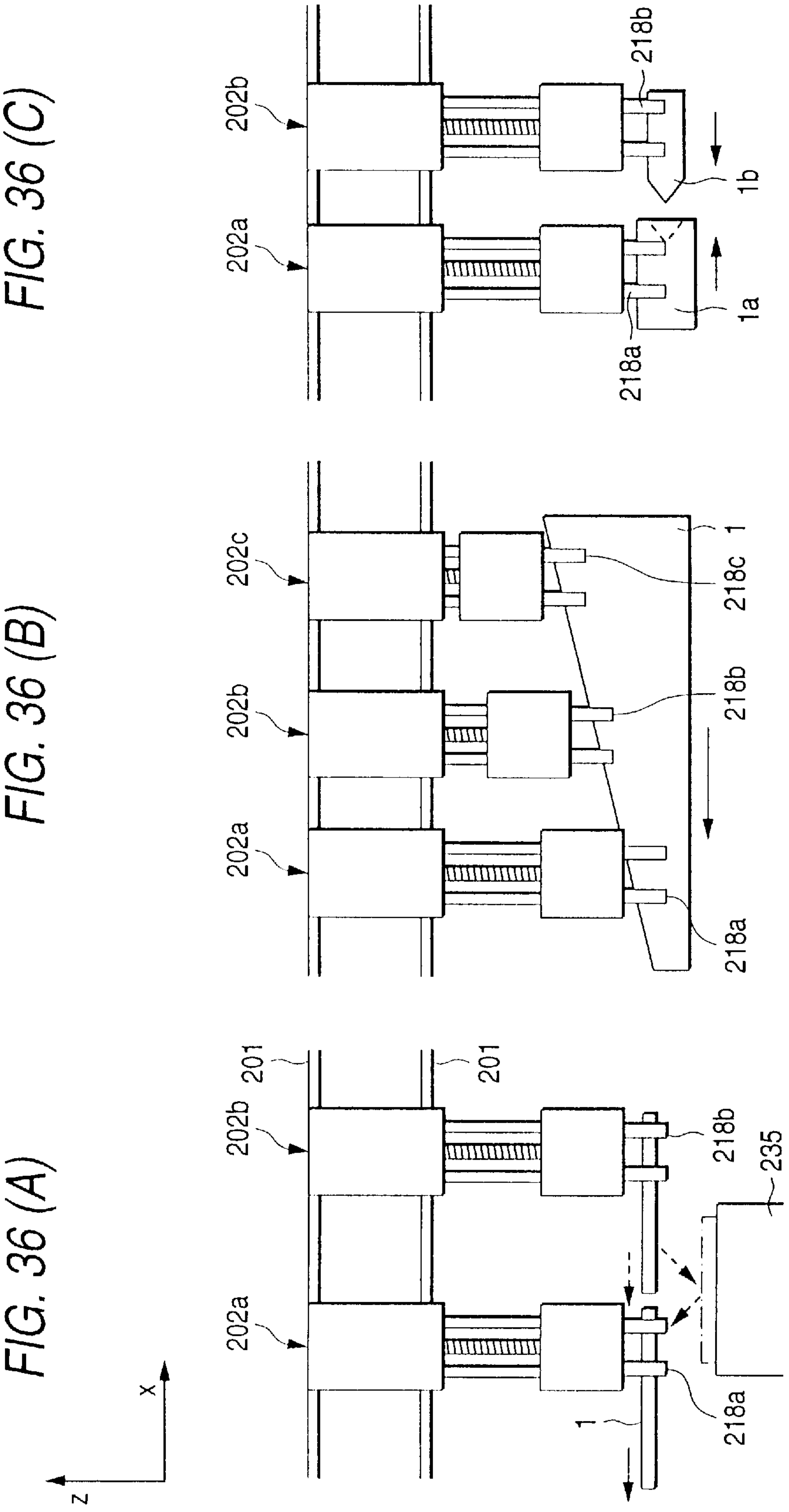
FIG. 36 shows examples when a plurality of moving units are provided in the direct-driven type loader shown in FIG. 30, in which (A) shows a delivery work, (B) shows division works, and (C) shows the cooperation work.

Some examples will be explained with reference to FIG. 36. In FIG. 36(A), two movable units 202*a* and 202*b* are provided on the same travel rail 201. The gripper 218*b* of one of the movable unit 202*b* grips a workpiece 1 and mounts the it on the work table 235, and the gripper 218*a* of the other of the movable unit 202*a* grips another workpiece 1 and carries it to the other place (delivery work). In FIG. 36(B), a large workpiece 1 can be carried, in which one workpiece 1 is gripped and carried by three movable units 202*a*, 202*b* and 202*c* (division work). In this case, since the grippers 218*a*, 218*b* and 218*c* of the respective movable units 202*a*, 202*b* and 202*c* can be determined freely in the z-axis direction, it is particularly effective when the gripped portions of the workpiece 1 is sloped. In FIG. 36(C), the gripper 218*a* of one movable unit 202*a* grips a workpiece la formed with a hole, and the gripper 218*b* of the other movable unit 202*b* grips another workpiece 1*b* formed with a projection (fitted to the hole 1*a*) in such a way that the two workpieces 1*a* and 1*b* are engaged with each other by approaching the respective movable units 202*a* and 202*b*, respectively (cooperation work). As described above, when a plurality the of movable units 202 are mounted on the same travel rail 201, it is possible to perform various different work.

On the other hand, as shown in FIG. 31(A), when the x-axis movement mechanism is constructed by the ball-screw mechanism, although a single movement unit is only provided on the same travel rail 201 and further there exist some problems in that the overall length of the ball screw is limited due to machining limit or the ball screw is vibrated at high speed drive, since the driving source of the movable unit 202 is provided on the fixed side, the first power feeding apparatus 242 and the first data transmitting apparatus 243 can be eliminated.

The present embodiment has been explained by taking the case where the hydraulic source circuit 20 is provided on the movable unit 202. However, it is also possible to provide the hydraulic source circuit 20 on the gripper support member 215. In this case, power is supplied and control data are transmitted to the hydraulic source circuit 20 under non-contact condition by use of a third power feeding apparatus and a third data transmitting apparatus (not shown) similar to the first power feeding apparatus 242 and the first data transmitting apparatus 243.

In more detail, the winding of the primary side transmit section of the third power feeding apparatus connected to the secondary side transmit section 244*b* of the second power feeding apparatus 244 and the winding of the primary side transmit section of the third data transmit apparatus connected to the secondary side transmit section 245*b* of the second power feeding apparatus 245 are wound into a loop shape, respectively in the z-axis direction and further supported by the movable unit 202. On the other hand, the respective secondary side transmit sections are fixed to the gripper support member 215. In this case, it is possible to transmit the power supplied to the second power feeding apparatus 244 and data signals transmitted to the second data transmitting apparatus 245 to the hydraulic source circuit 20 under non-contact condition. As described above, when the hydraulic source circuit 20 is provided on the gripper support member 215, since the hydraulic piping is not bent when the gripper 218 is moved in the z-axis direction, it is possible to lengthen the life of the hydraulic piping. This method is effective in particular when the stroke of the gripper 218 is long.

Further, the hydraulic source circuit 20 can be mounted integral with the gripper 218. In this case, when the gripper 218 is rotated, since the hydraulic source circuit 20 is rotated together with the gripper 218, the hydraulic piping is not twisted, so that the life of the hydraulic piping can be improved. In this example, in addition to the third power feeding apparatus and the third data transmitting apparatus, a fourth power feeding apparatus and a fourth data transmitting apparatus (not shown) for transmitting power and data signals by high frequency electromagnetic induction under non-contact condition are provided on the rotary shaft of the gripper 218. Here, in the rotary type power feeding apparatus and the data transmitting apparatus, the primary side transmit sections thereof are fixed to the gripper support member 215, and the secondary side transmit sections thereof are rotatably provided, respectively.

Figure 37:
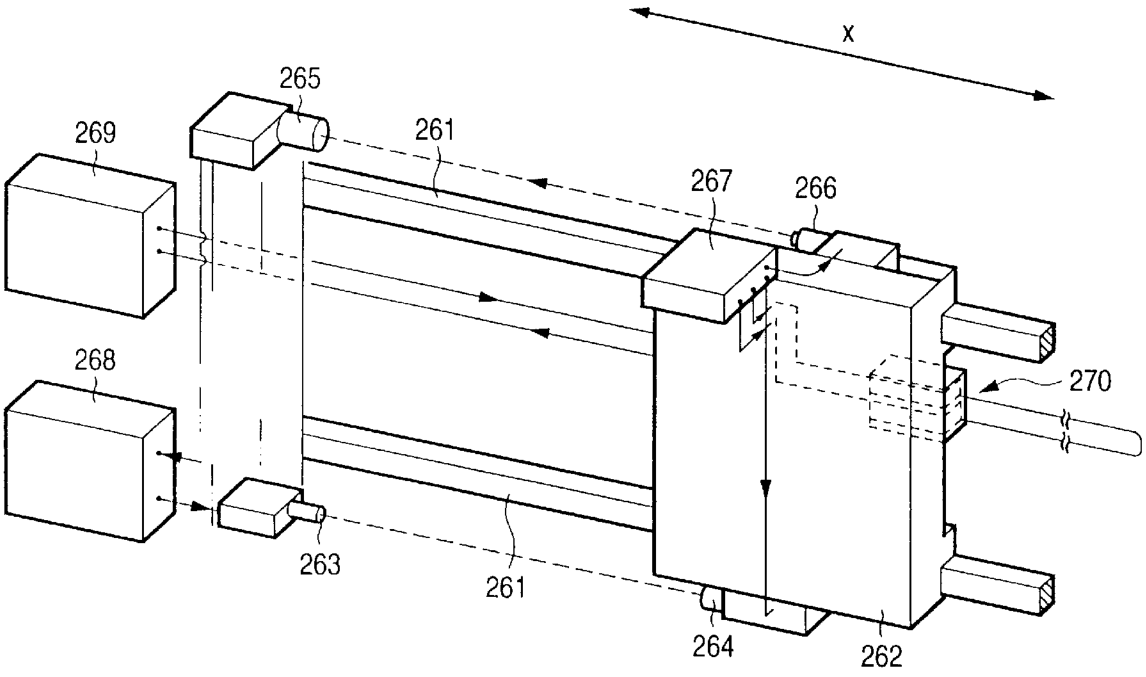
FIG. 37 is an essential perspective view showing a tenth embodiment of the present invention, in which the first data transmitting apparatus of the direct-driven type loader is shown.

FIG. 37 shows a tenth embodiment according to the present invention, in which the direct-driven type loader for transmitting data through optical couplers is shown. Further, in FIG. 37, a simplified movable unit is shown for brevity.

As shown in FIG. 37, a fixed side light emitting element 263 and a fixed side light receiving element 265 are fixed on the travel rail 261. Both the elements 263 and 265 are connected to a data transmit section 268, respectively. On the other hand, a movable side light receiving element 264 for receiving the light emitted from the fixed side light emitting element 263 and a movable side light emitting element 266 for emitting light received by the fixed side light receiving element 265 are fixed to the movable unit 262. These movable side light receiving element 264 and the movable side light emitting element 266 are used to transmit signals for controlling the x-axis servomotor (not shown) via the x-axis controller (not shown), respectively, and connected to the data transmit circuit (not shown) similar to that shown in FIG. 30 (the ninth embodiment). Further, the high frequency voltage generated by the high frequency inverter 269 is supplied to a rectify and smooth circuit 267 via the first power feeding apparatus under non-contact condition, and dc voltage rectified and smoothed by the rectify and smooth circuit 267 is supplied to a movable side light receiving element 264 and a movable side light emitting element 266. Here, the light emitting element is an electricity-light transducing element for transducing an electric signal to an optical signal, and the light receiving element is a light-electricity transducing element for transducing an optical signal to an electric signal. Further, an infrared ray emitting diode or a laser diode can be used as the fixed side light emitting element 263 and the movable side light emitting element 266. The construction other than the above is the same as with the case of that shown in FIG. 30 (the ninth embodiment), so that any detailed description thereof is omitted herein.

On the basis of the above-mentioned construction, the command data and the sequence data for the x-axis servomotor are applied from the data transmit section 268 to the fixed side light emitting element 263, converted into optical pulse signals by the electricity-light transduction of the fixed side light emitting element 263, and emitted from the fixed side light emitting element 263. The optical pulse signals emitted by the fixed side light emitting element 263 are allowed to be incident upon the movable side light receiving element 264, and then transmitted to the data transmit circuit after having been transduced into electric signals. On the other hand, the feedback data of the x-axis servomotor are transmitted from the data transmit circuit to the movable side light emitting element 266, converted into optical pulse signals by the electricity-light transduction of the movable side light emitting element 266, and emitted from the movable side light emitting element 266. The optical pulse signals emitted by the movable side light emitting element 266 are allowed to be incident upon the fixed side light receiving element 265, and then transmitted to the data transmit circuit 268 after having been transduced into electric signals. In other words, data can be transmitted between the data transmit section 268 and the data transmit circuit by optical signals under non-contact condition.

Figure 38:
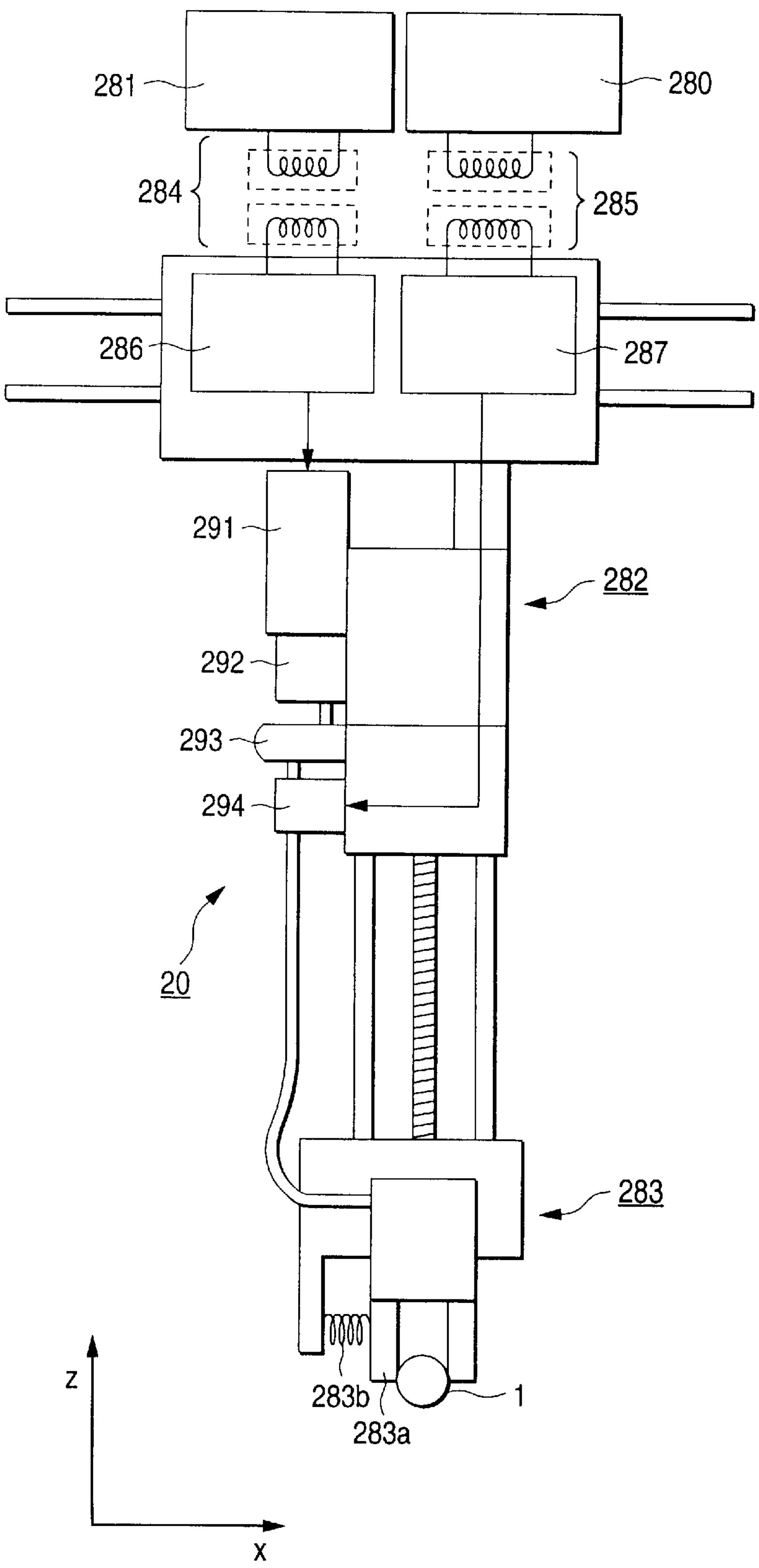
FIG. 38 is a front view showing an eleventh embodiment of the present invention, in which the essential portion of the direct-driven type loader is shown.

FIG. 38 shows an eleventh embodiment, in which the essential portions of the direct-driven type loader are shown.

In the preceding ninth and tenth embodiments (shown in FIGS. 30 and 37), the gripper driven by hydraulic pressure has been described. In the case where the gripping force is small, it is possible to use a gripper driven by pneumatic pressure. In this embodiment, a pneumatic gripper 283 is used as the gripper for clamping the workpiece 1, and the pneumatic source circuit 20 for driving a pneumatic gripper 283 is mounted on a movable unit 283. The pneumatic source circuit 20 is composed of a compressor 292, and a compressor motor 292 for driving the compressor 292 for generating pneumatic pressure, a regulator 293, and an electromagnetic valve 294. When the electromagnetic valve 294 is opened, pneumatic air is supplied to the pneumatic gripper 283 through an air piping. On the other hand, since the pneumatic gripper 283 is urged by an elastic force of a compression spring 283*b* in the direction that a hand section 283*a* is closed, when the pressurized air is supplied from the pneumatic source circuit, the hand section 283*a* is opened against the elastic force of the compression spring 283*b*. To the compressor motor 291, the high frequency voltage generated by the high frequency inverter 281 and supplied through the second power feeding apparatus 284 under non-contact condition is supplied after having been rectified and smoothed by a rectify and smooth circuit 284. Further, the electromagnetic valve 294 is controlled on the basis of data signals transmitted from the data transmit circuit 280 to the data transmit circuit 287 through the second data transmitting apparatus 285 under non-contact condition. The construction other than the above is the same as with the case of the ninth embodiment shown in FIG. 20, so that the detailed description thereof is omitted herein.

On the basis of the above-mentioned construction, when the moving unit 283 is moved to a predetermined position, the compressor motor 291 is driven to generate pneumatic pressure by the compressor 292, and further the electromagnetic valve 294 is opened to supply the pressurized air to the pneumatic gripper 283, so that the hand section 283*a* is opened. Under these conditions, after the pneumatic gripper 283 has been moved in the z-axis direction to the position of the workpiece 1, the compressor motor 291 is stopped and the pressurized air supplied to the pneumatic gripper 283 is releases. Then, the hand section 283*a* is closed by the elastic force of the compression spring 283*b* to clamp the workpiece 1. As described above, since the workpiece 1 is clamped by the elastic force of the compression spring 283*b*, even if the movable unit 282 is moved, it is possible to keep gripping the workpiece 1, so that the workpiece 1 can be carried. When the clamped workpiece 1 is required to be released, the pressurized air is supplied again to the pneumatic pressure to open the hand section 283*a*.

In this embodiment, although an example in which the hand section 283*a* of the pneumatic gripper 283 is kept closed by an elastic force of the compression spring 283*b* has been explained, without being limited only thereto, it is also possible to use a mechanical lock mechanism or to a vacuum pad as the gripper.

Further, a twelfth embodiment of the present invention will be described hereinbelow, in which the locating clamping apparatus used as the aligning means is dependent upon the first and second embodiments shown in FIGS. 2 and 10.

Figure 39:
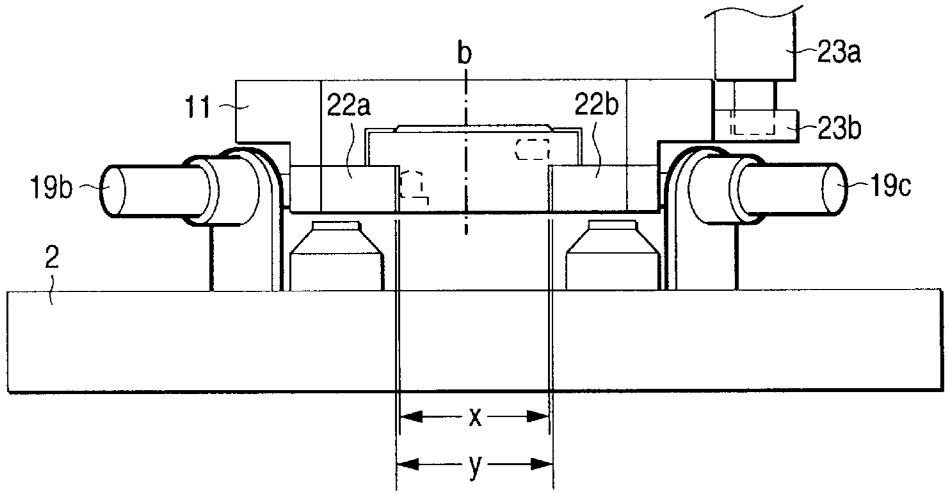
FIG. 39 shows a twelfth embodiment of the present invention, in which a turntable mechanism mounted on a machine tool as the locating and clamping apparatus is shown and in which (A) is a side view thereof and (B)is a plant, partially broken, view thereof.
Figure 39:
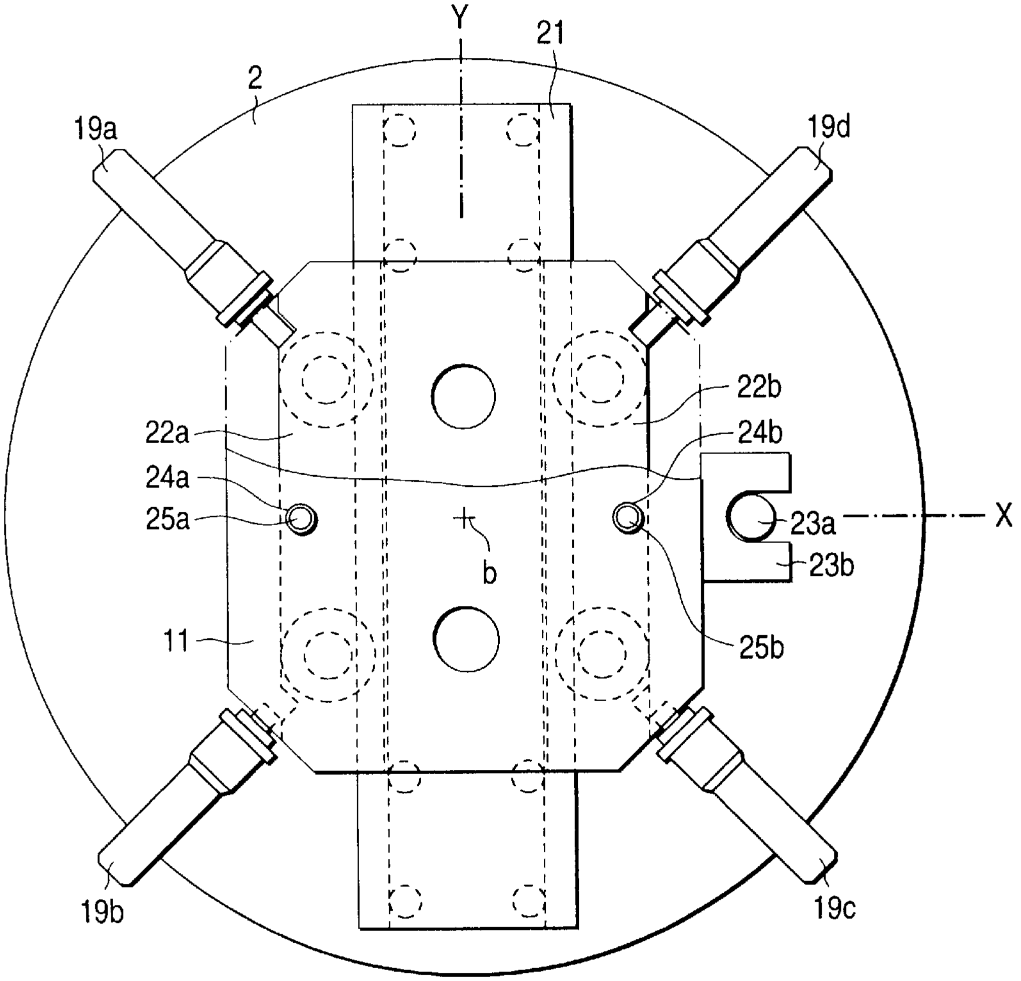

FIG. 39 shows a construction of a turntable and its peripheral element mounted on a machine tool according to the present embodiment, in which FIG. 39(A) is a front view of a pallet, and FIG. 39(B) is a plane, partially broken, view of a rotary table.

In the setup process after the workpiece 1 has been taken out of a pallet table, the workpiece (not shown) is fastened and fixed onto the turn table 2. The pallet 11 to which the workpiece 1 has been fixed is moved, being guided along a rail 21 by a hook of a pusher 23*a* (engaged with a pusher hook 23*b* fixed to the pallet side surface) and a moving mechanism (not shown), onto the turntable 2 of the machine tool. Here, the rail 21 is fixed to the turntable 2 in both the horizontal direction (the right and left direction in FIG. 39(A)) and the vertical direction (in FIG. 39(A)) to clamp the pallet. Further, the width (X) of the rail 21 is determined slightly narrower than a gap between two push plates 22*a* and 22*b*. Here, the push plates 22*a* and 22*b* disposed under the pallet 11 (sliding parts) are made of a metal heat-treated, and fixed to the pallet 11.

The pallet 11 is clamped temporarily by a stopper (not shown) within a "play" between the temporal locating pins 25*a* and 25*b* and two push plates 24*a* and 24*b*. Within this "play", the pallet 11 is moved finely on a two-dimensional plane by a direct-driven actuator for alignment. That is, a direct-driven actuator driven by a motor can be considered for the turntable 2. In this case, four actuators 19*a* to 19*d* are mounted. When the push plates 22*a* and 22*b* are pushed by the ends of these actuators, it is possible to locate the pallet 11 finely to the turntable 2 in both the X and Y (two dimensional) direction. Here, the actual position of the center of the workpiece (controlled variable) can be measured by rotating the turntable 2 and by use of a measure gage 27 mounted on a spindle 26 (described later).

Figure 40:
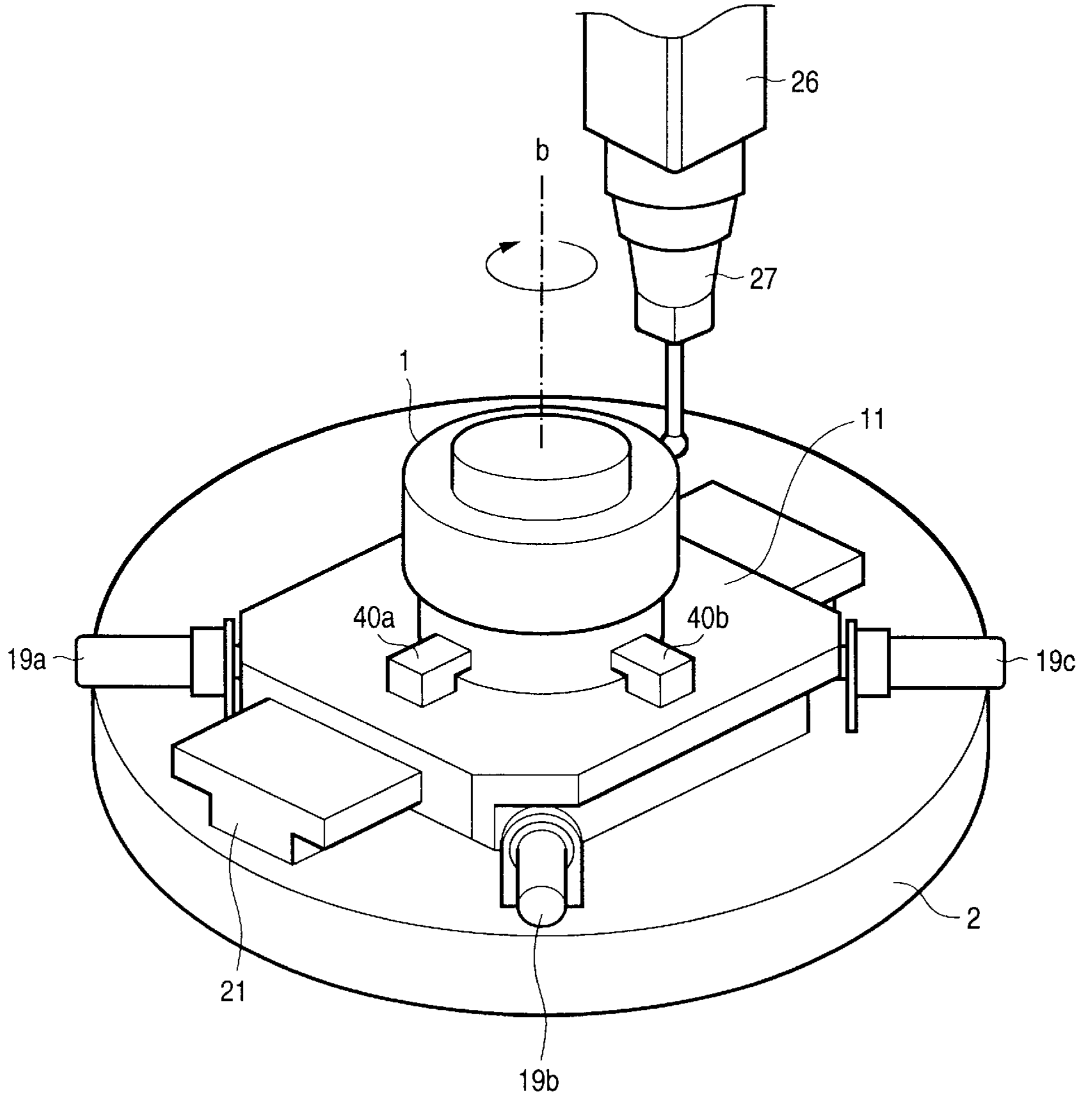
FIG. 40 is a perspective view for assistance in explaining a workpiece central position measuring method in the turntable shown in FIG. 36.

For instance, in the case of the primary machined workpiece 1, the automatic alignment can be executed by measuring the outer diameter of the workpiece 1 finely under on-line control by use of the measure gauge 27 (means for measuring the central position of the machined workpiece) as shown in FIG. 40. Therefore, as the motor for driving the direct-driven actuator, any motors for generating a torque (e.g., a dc motor provided with a reduction gear of a high reduction ratio) can be used, and therefore the position detector attached on an motor end is not necessarily required. Further, the workpiece 1 is fixed onto the pallet by four clampers 40*a* to 40*d*.

When the fine locating operation is being executed by pushing the pallet with the four direct-driven actuators (the motor driven type as shown in FIG. 40), a stable power must be supplied and data must be transmitted to these motors continuously even when the turntable 2 is being rotated repeatedly. On the other hand, when the alignment location has been completed, the pallet 11 itself is fixed to the turntable 2 finally. In this case, generally, a cylinder (not shown) is lowered by the hydraulic pressure supplied from the fixed section through a coupling 100 (See FIG. 25) disposed in the central axis, to pull down the rail 21. Therefore, there exists no problem when such a hydraulic coupling 100 as described above is mounted inside the rotary shaft portion of the turntable 2. When such a construction as above cannot be installed, however, it is necessary to adopt another method of transmitting hydraulic pressure to the turntable 2. For this purpose, as already shown in FIGS. 2 and 10, it is effective to mount the autonomous hydraulic source circuit 20 on the turntable 2 to drive the hydraulic pressure generating pump driving motor 61 on the turntable 2, to generate the hydraulic pressure. In this case, it is necessary to supply power and transmit data to the turntable 2 over the rotating portion thereof.

Figure 41:
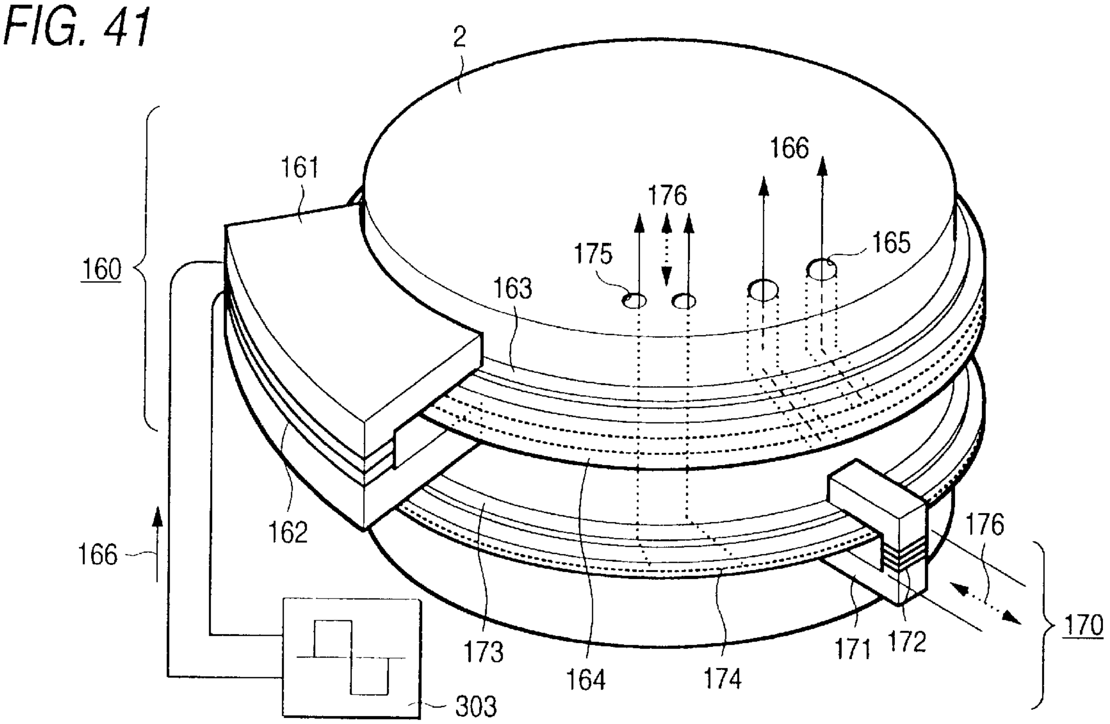
FIG. 41 is a perspective view for assistance in explaining a power data transmitting method in the outer circumference of the turntable shown in FIG. 39 and FIG. 40.

In other words, in the above-mentioned alignment process and further the succeeding pallet fixing process, power and data must be always transmitted from the fixed portion to the turntable 2, irrespective of the rotation of the turntable 2. Therefore, two pot cores 202 and 205 as shown in FIG. 25 are disposed at the central rotary shaft portion of the turntable 2 to transmit power and data by the high frequency electromagnetic induction. Or else, when the central rotary shaft portion of the turntable 2 cannot be utilized, the non-contact power and data can be transmitted to the rotating turntable 2, by utilizing the outer circumferential surface of the turntable 2 as shown in FIG. 41. In FIG. 41, the high frequency voltage supplied by a high frequency inverter 303 of one of the power transmit section 160 is applied to a primary power winding 162 wound around a U-shaped high frequency magnetic core 161. On the other hand, a secondary power winding 164 is wound around the outer circumferential surface of a core 163 formed of a belt-shaped high frequency magnetic substance attached around the upper outer circumferential surface of the turntable 2. Therefore, power can be supplied from the primary power winding 162 to the secondary power winding 164 by the high frequency electromagnetic induction. The induced power 166 is taken out through two power lead holes 165. Further, in the other data transmit section 170, data superposed upon the high frequency voltage supplied by a high frequency inverter (not shown) is applied to a primary data winding 172 wound around a U-shaped high frequency magnetic core 171. On the other hand, a secondary data winding 174 is wound around the outer circumferential surface of a core 173 formed of a belt-shaped high frequency magnetic substance attached around the upper outer circumferential surface of the turntable 2. Therefore, data can be applied from the primary data winding 172 to the secondary data winding 174 by the high frequency electromagnetic induction. The induced data 176 is taken out through two data lead holes 175. Further, the operation data 176 of the turntable 2 are feed-backed from the secondary data winding 174 to the primary data winding 172 in the reverse direction. Further, in this embodiment, the gap between the U-shaped cores 161 and 171 of the high frequency magnetic substance and the vertically opposing belt shaped cores 163 and 173 attached around the outer circumferential surface of the turntable 2 are extremely narrow, respectively. Further, the vertical positional relationship between the power and data cores can be reversed in FIG. 41.

Figure 42:
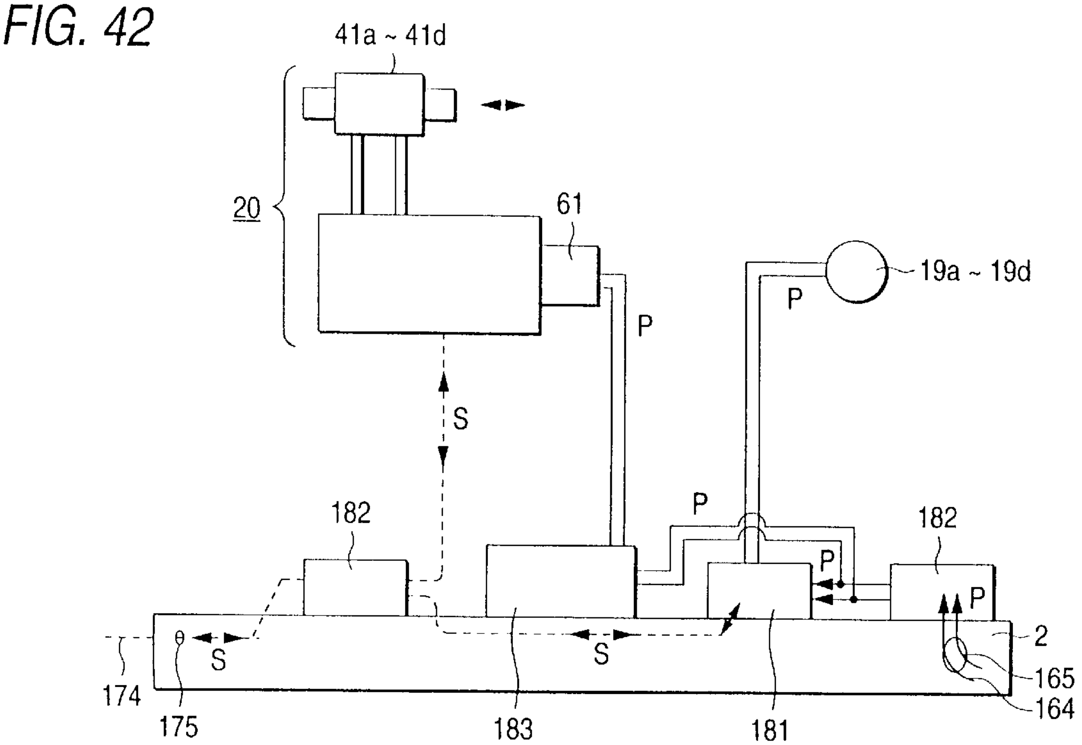
FIG. 42 is a conceptional illustration showing the construction of electric circuits and hydraulic circuits of the hydraulic cylinder.
Figure 43:
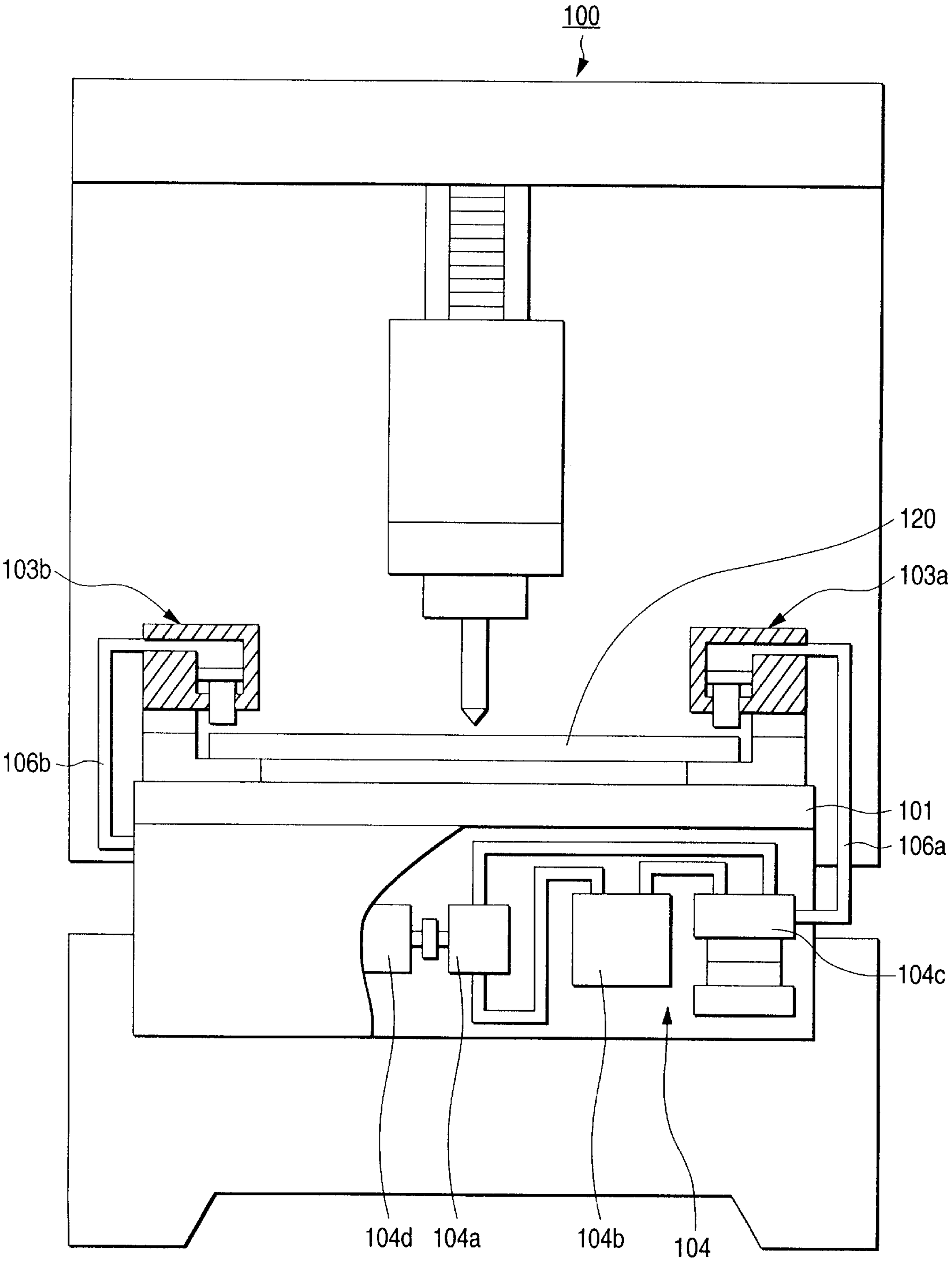
FIG. 43 PRIOR ART
FIG. 43 is a side, partially broken, view showing a first prior art example of the machine tool on which a hydraulic workpiece clamping apparatus actuated by a hydraulic cylinder is mounted.

FIG. 42 shows a block diagram showing the electric and hydraulic circuit constructions mounted on the turntable 2. In this embodiment shown in FIG. 42, the means as shown in FIGS. 25 and 41 are mounted on the turntable 2 as the electric and hydraulic circuits. In more detail, in order to receive the power P to the turntable 2, the rectify and smooth circuit 82 (for rectifying and smoothing the voltage induced by the secondary power winding 164 on the turntable 2 by the high frequency electromagnetic induction) and the control driving circuit 183 for controlling the motor direct-driven actuators 19*a* to 19*d* and the autonomous hydraulic source unit motor 61 are mounted on the turntable 2. Further, in order to receive the transmit data S to the turntable 2, data voltage signals electromagnetically induced by the high frequency electromagnetic induction and obtained by the secondary data winding 174 on the turntable 2 are processed by the data processing circuit 182. Further, the processed data are used as commands and feed-backed data to and from the autonomous hydraulic source circuit 20 and the direct-driven actuator 183. The connection system between these control driving circuit 183 and the respective motors, etc. and the connection system from the autonomous hydraulic source circuit 20 to the respective data are all the same as with the cases shown in FIGS. 25 and 41.

By the way, in the above-mentioned driving operations of the motors and hydraulic actuators, since power and data are transmitted without use of any electrodes and contacts, it is possible to drive and control the rotating elements stably, even under machining atmosphere in which there exist oil, cutting lubricant, chips.

Industrial Utilization Possibility

The present invention has been described as above, so that the following effects can be obtained:

In the invention as defined by claim 1 and claim 2, since the apparatus comprises a non-contact power feeding apparatus for supplying power by the high frequency electromagnetic induction is included and since the hydraulic circuit comprises a solenoid valve interposed between the solenoid valve and the hydraulic cylinder, the non-contact power feeding apparatus can be separated from the hydraulic circuit under the condition that the workpiece is being clamped, so that the apparatus can be used when the jig can be moved freely.

In the invention as defined by claim 3, since the apparatus comprises the hydraulic source according to the present invention and since the hydraulic source circuit is disposed in the movable body, the non-contact power feeding apparatus can be separated from the hydraulic circuit under the condition that the workpiece is being clamped, so that the apparatus can be used when the jig is moved freely. Further, the external piping is not required and the manual valve operation and manual clamping work are unnecessary, thus enabling the setup work of the machine tool freely.

In the invention as defined by claim 4, since the power is supplied and data signals are transmitted from the power feeding unit to the hydraulic source unit under non-contact condition by the high frequency electromagnetic induction, the hydraulic piping and the electric circuits can be eliminated between the power feeding unit and the hydraulic source unit. Further, since the check valve is disposed between the solenoid valve and the hydraulic cylinder, even if the power feeding unit and the hydraulic source unit are separated except the operation start and end of the hydraulic cylinder, it is possible to maintain the hydraulic cylinder under pressurized condition. Further, in the hydraulic source circuit, since the secondary side transmit section, the hydraulic source circuit and the hydraulic cylinder are provided in a single unit structure body, even if the power feeding unit and the hydraulic source unit are separated, there exist no hydraulic piping and electric wiring. As a result, the hydraulic source unit can be moved freely under the condition that the function of the hydraulic actuator is maintained by the hydraulic cylinder.

In the invention as defined by claim 5, since the battery for driving means for applying the high frequency voltage to the primary side transmit section is disposed in the power feeding unit, the power feeding unit can be used as a portable type, so that the apparatus can be used at a heavy structure assembly job site or building job site where there are no hydraulic piping and no electric wiring.

In the invention as defined by claim 6 and claim 7, since the power feeding unit and the hydraulic source unit are removably coupled with each other by use of coupling means, when the hydraulic source unit is used as an end tool of the industrial robot, in particular, any piping and electric wiring are not required for each exchange of the end tool, so that the end tool can be exchanged freely.

In the invention as defined by claim 8 and claim 9, since the primary side transmit section of the power feeding unit is formed by a long and narrow loop-shaped winding so that the hydraulic source unit can be moved along the longitudinal direction of the winding, it is possible to construct the universal jig by which the action points of the hydraulic actuators can be changed freely according to the size and shape of the workpiece.

In the invention as defined by claim 10, since the power feeding unit is provided with frequency converting means and further the hydraulic source unit is provided with a frequency measure circuit and a decoder, it is possible to transmit data signals for controlling the hydraulic circuit of the hydraulic source unit from the primary side transmit section to the secondary side transmit section by superposing the data signals upon power, so that the apparatus construction can be simplified.

In the invention as defined by claims 11 to 14, the pneumatic source circuit including a compressor and a regulator, an electric circuit for driving and controlling the pneumatic source circuit, and another electric circuit for converting the transmitted high frequency power into compressor motor driving power are mounted on the rotary body; and an autonomous pneumatic source section is formed by providing the non-contact power and data transmit section on the basis of the high frequency electromagnetic induction (not subjected to the influence of the environment) at the boundary to the external fixed section. As a result, any external pneumatic piping is not required, and the pneumatic apparatus can be automatized instead of the conventional pneumatic pressure driving method such that the pneumatic couplers and valves are operated manually, thus realizing a novel pneumatic drive and control system. In particular, the pneumatic clamping and chucking of a workpiece on the movable pallet can be realized in the machine tool processing (so far difficult in the conventional technique), thus contributing to the industrial automation.

In the invention as defined by claim 15 and claim 16, since the split-type pot core type transformers having power transmit characteristics symmetrical with respect to the rotary axis of the turntable, power can be supplied and data signals can be transmitted between the rotary section and the fixed section stably under non-contact conditions. Further, since the optical coupling signal transmitting apparatus having electricity-light transducing characteristics symmetrical with respect to the rotary axis of the turntable is provided, it is possible to transmit signals stably between the rotary section and the fixed section under non-contact conditions. As a result, when a plurality of fluid (e.g, hydraulic or pneumatic) actuators are controlled independently on the turntable, the electromagnetic control can be enabled on the turn table, which is so far difficult to put into practice from the structural standpoint of the rotary coupling (because a number of fluid circuits whose number is the same as that of the actuators must be assembled). In other words, since the rotary coupling of the single circuit can be replaced with a plurality of fluid circuits, when the autonomous hydraulic source circuit is mounted on the multi-rotation turntable in combination with the invention as defined by claim 1, any external hydraulic installation and any rotary couplings are not necessary, so that the installation investment can be reduced and the reliability can be improved.

In the invention as defined by claim 17 and claim 18, since the power is supplied and data signals are transmitted under non-contact conditions by the high frequency electromagnetic induction, any electric wiring and any fluid piping are not required among the high frequency power source, the control data generating means and the movable unit. As a result, no installation for supporting these are necessary and further the reliability thereof can be improved, because the piping and wiring arrangement can be prevented from being damaged or broken. The same effect as described above can be obtained when data are transmitted by optical pulse signals in the first data transmitting apparatus. Further, since the hydraulic source circuit is provided with means for keeping the workpiece under gripped condition at the hand section of the gripper, it is possible to carry the workpiece without supplying power to the gripper moving means and the fluid pressure generating means and without transmitting data to the gripper control means and the fluid pressure generating means. In addition, when the movable unit moving means is formed by a lack-pinion mechanism, since any electric wiring and any fluid piping are not required among the high frequency power source, the control data signal generating means and the movable unit, a plurality of movable units can be provided on the same rail to execute a cooperative control by use of these movable units.

In the invention as defined by claim 19 and 20, in the machine tools such as vertical lathe, gear hobbing machine, turning center, etc. in which a center position of the workpiece must be aligned with the turning center of the turntable accurately and precisely (so far made manually by the worker and by spending a long time), it is possible to automatize the setup work such as the alignment and location of the pallet (on which a workpiece is mounted) and the clamping of the workpiece. As a result, a pallet exchanging apparatus for pallet change and pallet pooling (so far considered to automatize the setup work of the conventional machining center) can be used, as it is, for the machine tools such as vertical lathe, gear hobbing machine, turning center, etc. in the same way. Further, since a high precious location is not required for the workpiece when the workpiece is located on and fixed to the pallet at the setup stage, it is possible to save man-hours in the workpiece setup work, automatize the setup work in cooperation of a robot, and realize an unmanned operation at night, etc.

We claim:

1. A hydraulic source comprising:

a power feeding apparatus;

a hydraulic source circuit to supply hydraulic pressure to a hydraulic cylinder;

said power feeding apparatus is a non-contact power feeding apparatus for supplying power;

said hydraulic source circuit includes a hydraulic driving motor, a hydraulic pump, a pressure switch, and a solenoid valve;

said hydraulic driving motor is effective to receive power supplied from said non-contact power feeding apparatus;

said hydraulic pump is driven by said hydraulic driving motor;

said solenoid valve is controlled by said non-contact power feeding apparatus without the use of electrode contacts;

said solenoid valve is interposed between said pump and a check valve; and said pressure switch is interposed in a piping communicating between the check valve and the hydraulic cylinder, for confirming the position of a piston at an uppermost or lowermost end of the hydraulic cylinder.

2. The hydraulic source of claim 1, wherein said hydraulic source circuit is disposed within a movable body.

3. A universal hydraulic source, comprising:

a power feeding unit having a primary side transmit section for feeding a high frequency voltage; and a hydraulic unit for generating hydraulic pressure on the basis of power supplied by the power feeding unit, to actuate a hydraulic actuator for a predetermined work;

said hydraulic unit includes:

a secondary side transmit section for receiving power and transmitted data signals from said power feeding unit under a non-contact condition with said primary side transmit section, by utilization of high frequency electromagnetic induction generated by application of the high frequency voltage;

a hydraulic pump driven by power received from said power feeding unit through said secondary side transmit section;

a solenoid valve interposed between said hydraulic pump and said hydraulic cylinder and controlled on the basis of data signals transmitted from said power feeding unit through said secondary side transmit section; and a check valve interposed between said solenoid valve and said hydraulic cylinder;

said hydraulic unit being disposed within an airtightly closed structure body.

4. The universal hydraulic source of claim 3, wherein the power feeding unit is provided with a battery for driving means for applying the high frequency voltage to the primary side transmit section.

5. A universal hydraulic source comprising:

a power feeding unit having a primary side transmit section for generating a high frequency voltage;

a hydraulic unit for generating hydraulic pressure on the basis of power supplied by the power feeding unit, to actuate a hydraulic actuator for a predetermined work;

said hydraulic unit includes a secondary side transmit section for receiving power and transmitted data signals from the power feeding unit, under non-contact condition with said primary side transmit section, by utilization of high frequency electromagnetic induction generated by the application of the high frequency voltage;

said hydraulic unit is controlled on the basis of power and data signals supplied and transmitted from said power feeding apparatus and said hydraulic cylinder;

said power feeding unit and said hydraulic source unit are provided with coupling means, respectively for coupling said power feeding unit and said hydraulic source unit mechanically and removably in such a way that said primary side transmit section and said secondary side transmit section are arranged so as to be opposed to each other.

6. The universal hydraulic source of claim 5, wherein the hydraulic unit can be coupled to an end of an arm portion of an industrial robot via the coupling means.

7. A universal hydraulic apparatus comprising:

a power feeding unit having a primary side transmit section with a primary side winding for generating a high frequency voltage, fixedly arranged on a base;

a hydraulic source unit to generate hydraulic pressure on the basis of power supplied by said power feeding unit so that a hydraulic actuator can be actuated for a predetermined work, said hydraulic source unit includes a secondary side transmit section for receiving power and transmitted data signals from said power feeding unit, under non-contact condition with the primary side transmit section, by utilization of high frequency electromagnetic induction generated by application of said high frequency voltage;

said hydraulic source circuit is controlled on the basis of power supplied and data signals transmitted from said power feeding apparatus;

said secondary side transmit section includes a secondary side core disposed movably in a longitudinal direction of the primary winding on the base, in such a way that the primary side transmit section is loosely fitted to portions formed in said second side transmit section; and a secondary side winding is wound around said secondary side core so as to be opposed to said primary side winding.

8. The universal hydraulic apparatus of claim 7, wherein additional stage primary and secondary side transmit sections are provided in such a way that a plurality of the primary side windings are disposed on the base;

the hydraulic source unit is coupled to each primary side winding; and power and data signals are generated by each primary side winding by unitization of high frequency electromagnetic induction under non-contact condition.

9. The universal hydraulic apparatus of any of claims 4 to 8, wherein the power feeding unit comprises frequency converting means for converting a frequency of the high frequency voltage applied to the primary side transmit section into several frequencies; and the hydraulic source unit comprises a frequency measure circuit for measuring a frequency of the high frequency voltage received by the secondary side transmit section by the high frequency electromagnetic induction; and a decoder for generating data signals for controlling the hydraulic source unit in corresponding to the frequency of the high frequency voltage measured by the frequency measure circuit.

* * * * *